United States Patent
Kühnemund et al.

(10) Patent No.: US 12,497,653 B2
(45) Date of Patent: Dec. 16, 2025

(54) MULTIPLE READOUT SIGNALS FOR ANALYZING A SAMPLE

(71) Applicant: 10x Genomics, Inc., Pleasanton, CA (US)

(72) Inventors: Malte Kühnemund, Stockholm (SE); Marco Mignardi, Sundyberg (SE)

(73) Assignee: 10x Genomics, Inc., Pleasanton, CA (US)

( * ) Notice: Subject to any disclaimer, the term of this patent is extended or adjusted under 35 U.S.C. 154(b) by 423 days.

(21) Appl. No.: 18/099,865

(22) Filed: Jan. 20, 2023

(65) Prior Publication Data

US 2023/0279475 A1    Sep. 7, 2023

Related U.S. Application Data

(60) Provisional application No. 63/344,978, filed on May 23, 2022, provisional application No. 63/301,987, filed on Jan. 21, 2022.

(51) Int. Cl.
*C12Q 1/6841* (2018.01)
*C12Q 1/6844* (2018.01)
*G01N 21/64* (2006.01)

(52) U.S. Cl.
CPC ......... *C12Q 1/6841* (2013.01); *C12Q 1/6844* (2013.01); *C12Q 2600/16* (2013.01); *G01N 2021/6439* (2013.01)

(58) Field of Classification Search
None
See application file for complete search history.

(56) References Cited

U.S. PATENT DOCUMENTS

| | | | |
|---|---|---|---|
| 4,318,846 A | 3/1982 | Khanna et al. |
| 4,683,195 A | 7/1987 | Mullis et al. |
| 4,683,202 A | 7/1987 | Mullis |
| 4,757,141 A | 7/1988 | Fung et al. |
| 4,800,159 A | 1/1989 | Mullis et al. |
| 4,849,336 A | 7/1989 | Miyoshi et al. |
| 4,965,188 A | 10/1990 | Mullis et al. |

(Continued)

FOREIGN PATENT DOCUMENTS

| | | |
|---|---|---|
| WO | WO 1991/017160 | 11/1991 |
| WO | WO 2014/163886 | 10/2014 |
| WO | WO 2017/079406 | 5/2017 |
| WO | WO 2017/143155 | 8/2017 |
| WO | WO 2018/026873 | 2/2018 |
| WO | WO 2019/199579 | 10/2019 |
| WO | WO 2019/236841 | 12/2019 |

(Continued)

OTHER PUBLICATIONS

Archer et al., "Selective and flexible depletion of problematic sequences from RNA-seq libraries at the cDNA stage," BMC Genomics. (2014) 15(1):401.

(Continued)

*Primary Examiner* — Aaron A Priest
(74) *Attorney, Agent, or Firm* — MORRISON & FOERSTER LLP

(57) ABSTRACT

In some aspects disclosed herein are methods and compositions for detecting analytes such as a plurality of nucleic acid molecules in a biological sample, said method comprising generating and analyzing a first detectable signal and a second detectable signal corresponding to a first target sequence and a second target sequence, respectively. The first and second target sequences can be present and/or expressed at different levels in the biological sample.

20 Claims, 8 Drawing Sheets

(56) References Cited

U.S. PATENT DOCUMENTS

| | | |
|---|---|---|
| 5,066,580 A | 11/1991 | Lee |
| 5,091,519 A | 2/1992 | Cruickshank |
| 5,151,507 A | 9/1992 | Hobbs et al. |
| 5,188,934 A | 2/1993 | Menchen |
| 5,198,537 A | 3/1993 | Huber et al. |
| 5,344,757 A | 9/1994 | Holtke et al. |
| 5,354,657 A | 10/1994 | Boehringer et al. |
| 5,366,860 A | 11/1994 | Bergot et al. |
| 5,512,462 A | 4/1996 | Cheng |
| 5,599,675 A | 2/1997 | Brenner |
| 5,635,352 A | 6/1997 | Urdea et al. |
| 5,688,648 A | 11/1997 | Mathies |
| 5,695,940 A | 12/1997 | Drmanac et al. |
| 5,702,888 A | 12/1997 | Holtke et al. |
| 5,750,341 A | 5/1998 | Macevicz |
| 5,800,996 A | 9/1998 | Lee et al. |
| 5,847,162 A | 12/1998 | Lee et al. |
| 5,990,479 A | 11/1999 | Weiss et al. |
| 6,054,274 A | 4/2000 | Sampson et al. |
| 6,172,218 B1 | 1/2001 | Brenner |
| 6,207,392 B1 | 3/2001 | Weiss et al. |
| 6,251,303 B1 | 6/2001 | Bawendi et al. |
| 6,265,552 B1 | 7/2001 | Schatz |
| 6,291,187 B1 | 9/2001 | Kingsmore et al. |
| 6,306,597 B1 | 10/2001 | Macevicz |
| 6,319,426 B1 | 11/2001 | Bawendi et al. |
| 6,322,901 B1 | 11/2001 | Bawendi et al. |
| 6,323,009 B1 | 11/2001 | Lasken et al. |
| 6,344,329 B1 | 2/2002 | Lizardi et al. |
| 6,368,801 B1 | 4/2002 | Faruqi |
| 6,391,937 B1 | 5/2002 | Beuhler et al. |
| 6,423,551 B1 | 7/2002 | Weiss et al. |
| 6,426,513 B1 | 7/2002 | Bawendi et al. |
| 6,444,143 B2 | 9/2002 | Bawendi et al. |
| 6,534,266 B1 | 3/2003 | Singer |
| 6,576,291 B2 | 6/2003 | Bawendi et al. |
| 6,828,109 B2 | 12/2004 | Kaplan et al. |
| 6,969,488 B2 | 11/2005 | Bridgham et al. |
| 7,057,026 B2 | 6/2006 | Barnes et al. |
| 7,255,994 B2 | 8/2007 | Lao |
| 7,264,929 B2 | 9/2007 | Rothberg et al. |
| 7,473,767 B2 | 1/2009 | Dimitrov |
| 7,534,991 B2 | 5/2009 | Miller et al. |
| 7,555,155 B2 | 6/2009 | Levenson et al. |
| 7,632,641 B2 | 12/2009 | Dirks et al. |
| 7,655,898 B2 | 2/2010 | Miller |
| 7,709,198 B2 | 5/2010 | Luo et al. |
| 7,721,721 B1 | 5/2010 | Kronengold et al. |
| 7,910,304 B2 | 3/2011 | Drmanac |
| 7,914,987 B2 | 3/2011 | Fredriksson et al. |
| 7,941,279 B2 | 5/2011 | Hwang et al. |
| 7,989,166 B2 | 8/2011 | Koch et al. |
| 8,124,751 B2 | 2/2012 | Pierce et al. |
| 8,199,999 B2 | 6/2012 | Hoyt et al. |
| 8,268,554 B2 | 9/2012 | Schallmeiner |
| 8,330,087 B2 | 12/2012 | Domenicali |
| 8,415,102 B2 | 4/2013 | Geiss et al. |
| 8,431,691 B2 | 4/2013 | McKernan et al. |
| 8,460,865 B2 | 6/2013 | Chee et al. |
| 8,462,981 B2 | 6/2013 | Determan et al. |
| 8,481,258 B2 | 7/2013 | Church et al. |
| 8,519,115 B2 | 8/2013 | Webster et al. |
| 8,551,710 B2 | 10/2013 | Bernitz et al. |
| 8,580,504 B2 | 11/2013 | Fredriksson et al. |
| 8,604,182 B2 | 12/2013 | Luo et al. |
| 8,658,361 B2 | 2/2014 | Wu et al. |
| 8,771,950 B2 | 7/2014 | Church et al. |
| 8,951,726 B2 | 2/2015 | Luo et al. |
| 8,986,926 B2 | 3/2015 | Ferree et al. |
| 9,201,063 B2 | 12/2015 | Sood et al. |
| 9,217,178 B2 | 12/2015 | Fedurco et al. |
| 9,273,349 B2 | 3/2016 | Nguyen et al. |
| 9,371,563 B2 | 6/2016 | Geiss et al. |
| 9,371,598 B2 | 6/2016 | Chee |
| 9,376,717 B2 | 6/2016 | Gao et al. |
| 9,512,422 B2 | 12/2016 | Barnard et al. |
| 9,541,504 B2 | 1/2017 | Hoyt |
| 9,551,032 B2 | 1/2017 | Landegren et al. |
| 9,624,538 B2 | 4/2017 | Church et al. |
| 9,714,446 B2 | 7/2017 | Webster et al. |
| 9,714,937 B2 | 7/2017 | Dunaway |
| 9,727,810 B2 | 8/2017 | Fodor et al. |
| 9,778,155 B2 | 10/2017 | Gradinaru et al. |
| 9,783,841 B2 | 10/2017 | Nolan et al. |
| 9,889,422 B2 | 2/2018 | Smith et al. |
| 9,909,167 B2 | 3/2018 | Samik et al. |
| 10,032,064 B2 | 7/2018 | Hoyt |
| 10,059,990 B2 | 8/2018 | Boyden et al. |
| 10,126,242 B2 | 11/2018 | Miller et al. |
| 10,138,509 B2 | 11/2018 | Church et al. |
| 10,179,932 B2 | 1/2019 | Church et al. |
| 10,227,639 B2 | 3/2019 | Levner et al. |
| 10,246,700 B2 | 4/2019 | Dunaway et al. |
| 10,266,888 B2 | 4/2019 | Daugharthy et al. |
| 10,267,808 B2 | 4/2019 | Cai |
| 10,309,879 B2 | 6/2019 | Chen et al. |
| 10,317,321 B2 | 6/2019 | Tillberg et al. |
| 10,364,457 B2 | 7/2019 | Wassie et al. |
| 10,370,698 B2 | 8/2019 | Nolan et al. |
| 10,415,080 B2 | 9/2019 | Dunaway et al. |
| 10,450,599 B2 | 10/2019 | Pierce et al. |
| 10,457,980 B2 | 10/2019 | Cai et al. |
| 10,465,235 B2 | 11/2019 | Gullberg et al. |
| 10,494,662 B2 | 12/2019 | Church et al. |
| 10,495,554 B2 | 12/2019 | Deisseroth et al. |
| 10,501,777 B2 | 12/2019 | Beechem et al. |
| 10,501,791 B2 | 12/2019 | Church et al. |
| 10,510,435 B2 | 12/2019 | Cai et al. |
| 10,526,649 B2 | 1/2020 | Chen et al. |
| 10,545,075 B2 | 1/2020 | Deisseroth et al. |
| 10,550,429 B2 | 2/2020 | Harada et al. |
| 10,580,128 B2 | 3/2020 | Miller |
| 10,640,816 B2 | 5/2020 | Beechem et al. |
| 10,640,826 B2 | 5/2020 | Church et al. |
| 10,669,569 B2 | 6/2020 | Gullberg et al. |
| 10,746,981 B2 | 8/2020 | Tomer et al. |
| 10,774,372 B2 | 9/2020 | Chee et al. |
| 10,774,374 B2 | 9/2020 | Frisén et al. |
| 10,794,802 B2 | 10/2020 | Gradinaru et al. |
| 10,802,262 B2 | 10/2020 | Tomer et al. |
| 10,815,519 B2 | 10/2020 | Hain et al. |
| 10,829,814 B2 | 11/2020 | Fan et al. |
| 10,844,426 B2 | 11/2020 | Daugharthy et al. |
| 10,858,698 B2 | 12/2020 | Church et al. |
| 10,872,679 B2 | 12/2020 | Cai et al. |
| 10,964,001 B2 | 3/2021 | Miller |
| 11,459,603 B2 | 10/2022 | Tyagi et al. |
| 2002/0045045 A1 | 4/2002 | Adams et al. |
| 2003/0013091 A1 | 1/2003 | Dimitrov |
| 2003/0017264 A1 | 1/2003 | Treadway et al. |
| 2005/0100900 A1 | 5/2005 | Kawashima et al. |
| 2006/0188901 A1 | 8/2006 | Barnes et al. |
| 2006/0234261 A1 | 10/2006 | Pierce et al. |
| 2006/0240439 A1 | 10/2006 | Smith et al. |
| 2006/0281109 A1 | 12/2006 | Barr et al. |
| 2007/0166705 A1 | 7/2007 | Milton et al. |
| 2007/0166708 A1 | 7/2007 | Dimitrov et al. |
| 2009/0118128 A1 | 5/2009 | Liu et al. |
| 2010/0015607 A1 | 1/2010 | Geiss et al. |
| 2010/0047924 A1 | 2/2010 | Webster et al. |
| 2010/0055733 A1 | 3/2010 | Lutolf et al. |
| 2010/0112710 A1 | 5/2010 | Geiss et al. |
| 2010/0261026 A1 | 10/2010 | Ferree et al. |
| 2010/0262374 A1 | 10/2010 | Hwang et al. |
| 2011/0059865 A1 | 3/2011 | Smith et al. |
| 2012/0270305 A1 | 10/2012 | Reed et al. |
| 2013/0079232 A1 | 3/2013 | Kain et al. |
| 2013/0260372 A1 | 10/2013 | Buermann et al. |
| 2014/0371088 A1 | 12/2014 | Webster |
| 2016/0024555 A1 | 1/2016 | Church et al. |
| 2016/0108458 A1 | 4/2016 | Frei et al. |
| 2016/0369329 A1 | 12/2016 | Cai et al. |
| 2017/0009278 A1 | 1/2017 | Söderberg et al. |
| 2017/0219465 A1 | 8/2017 | Desseroth et al. |

(56) References Cited

U.S. PATENT DOCUMENTS

| | | |
|---|---|---|
| 2017/0220733 A1 | 8/2017 | Zhuang et al. |
| 2017/0253918 A1 | 9/2017 | Kohman |
| 2018/0052081 A1 | 2/2018 | Kohman |
| 2018/0251833 A1 | 9/2018 | Daugharthy et al. |
| 2019/0032121 A1 | 1/2019 | Daugharthy et al. |
| 2019/0055594 A1 | 2/2019 | Samusik et al. |
| 2019/0106733 A1 | 4/2019 | Kishi et al. |
| 2019/0161796 A1 | 5/2019 | Hauling et al. |
| 2019/0177800 A1 | 6/2019 | Boutet et al. |
| 2019/0194709 A1 | 6/2019 | Church et al. |
| 2019/0367969 A1 | 12/2019 | Belhocine |
| 2019/0376956 A1 | 12/2019 | Bobrow et al. |
| 2020/0224243 A1 | 7/2020 | Desai et al. |
| 2020/0224244 A1 | 7/2020 | Nilsson et al. |
| 2020/0362398 A1 | 11/2020 | Kishi et al. |
| 2020/0393343 A1 | 12/2020 | Kennedy-Darling et al. |
| 2020/0399689 A1 | 12/2020 | Luo et al. |
| 2021/0017587 A1 | 1/2021 | Cai et al. |
| 2021/0115504 A1 | 4/2021 | Cai et al. |
| 2021/0164039 A1 | 6/2021 | Wang et al. |
| 2021/0238662 A1 | 8/2021 | Bava |
| 2021/0238674 A1 | 8/2021 | Bava |
| 2021/0254140 A1 | 8/2021 | Stahl et al. |
| 2021/0262018 A1 | 8/2021 | Bava et al. |
| 2021/0277460 A1 | 9/2021 | Bava |
| 2021/0340618 A1 | 11/2021 | Kuhnemund et al. |
| 2021/0340621 A1 | 11/2021 | Daugharthy et al. |
| 2021/0388423 A1 | 12/2021 | Bava et al. |
| 2021/0388424 A1 | 12/2021 | Bava |
| 2022/0010358 A1 | 1/2022 | Kuhnemund et al. |
| 2022/0049302 A1 | 2/2022 | Daugharthy et al. |
| 2022/0049303 A1 | 2/2022 | Busby et al. |
| 2022/0083832 A1 | 3/2022 | Shah |
| 2022/0084628 A1 | 3/2022 | Shah |
| 2022/0084629 A1 | 3/2022 | Shah |
| 2022/0136049 A1 | 5/2022 | Bava et al. |
| 2022/0186300 A1 | 6/2022 | Bava |
| 2022/0195498 A1 | 6/2022 | Kuhnemund et al. |
| 2022/0213529 A1 | 7/2022 | Kuhnemund et al. |
| 2022/0228200 A1 | 7/2022 | Bava |
| 2023/0097368 A1* | 3/2023 | Glezer ............... C12Q 1/6841 435/5 |
| 2024/0294973 A1* | 9/2024 | Wang .................. C12Q 1/6804 |

FOREIGN PATENT DOCUMENTS

| | | |
|---|---|---|
| WO | WO 2020/076976 | 4/2020 |
| WO | WO 2020/076979 | 4/2020 |
| WO | WO 2020/096687 | 5/2020 |
| WO | WO 2020/099640 | 5/2020 |
| WO | WO 2020/102094 | 5/2020 |
| WO | WO 2020/117914 | 6/2020 |
| WO | WO 2020/123316 | 6/2020 |
| WO | WO 2020/123742 | 6/2020 |
| WO | WO 2020/142490 | 7/2020 |
| WO | WO 2020/163397 | 8/2020 |
| WO | WO 2020/240025 | 12/2020 |
| WO | WO 2020/254519 | 12/2020 |
| WO | WO 2021/067475 | 4/2021 |
| WO | WO 2021/123282 | 6/2021 |
| WO | WO 2021/123286 | 6/2021 |
| WO | WO 2021/138676 | 7/2021 |
| WO | WO 2021/155063 | 8/2021 |
| WO | WO 2021/167526 | 8/2021 |
| WO | WO 2021/168326 | 8/2021 |

OTHER PUBLICATIONS

Baner et al., "Signal amplification of padlock probes by rolling circle replication," Nucleic Acids Res. (1998) 26(22):5073-5078.
Bibikova et al., "Quantitative gene expression profiling in formalin-fixed, paraffin-embedded tissues using universal bead arrays," Am J Pathol. Nov. 2004; 165(5):1799-807.
Bolognesi et al., "Multiplex Staining by Sequential Immunostaining and Antibody Removal on Routine Tissue Sections," J. Histochem. Cytochem. (2017); 65(8): 431-444.
Capodieci et al., "Gene expression profiling in single cells within tissue," Nat Methods. (2005) 2(9): 663-5.
Chemeris et al., "Real-time hybridization chain reaction," Dokl Biochem Biophys. (2008) 419: 53-55.
Chen et al., "Nanoscale imaging of RNA with expansion microscopy," Nat Methods. (2016) 13:679-684.
Chen et al., "RNA imaging. Spatially resolved, highly multiplexed RNA profiling in single cells," Science. (2015) 348(6233): aaa6090. 16 pgs.
Chen et al., "Expansion Microscopy," Science (2015) 347(6221):543-548.
Choi et al., "Programmable in situ amplification for multiplexed imaging of mRNA expression," Nat Biotechnol. (2010) 28(11): 1208-1212.
Choi et al., "Third-generation in situ hybridization chain reaction: multiplexed, quantitative, sensitive, versatile, robust," Development. (2018) 6;145(12): dev165753.
Conze et al., "Single molecule analysis of combinatorial splicing," Nucleic Acids Res. (2010) 38(16): e163.
Dean et al., "Rapid Amplification of Plasmid and Phage DNA Using Phi29 DNA Polymerase and Multiply-Primed Rolling Circle Amplification," Genome Research (2001) 11:1095-1099.
Dirks et al., "Triggered amplification by hybridization chain reaction," Proc Natl Acad Sci USA. (2004) 101(43): 15275-15278.
Eng et al., "Transcriptome-scale super-resolved imaging in tissues by RNA seqFISH," Nature. (2019) 568(7751): 235-239.
Fang et al., "Fluoride-Cleavable Biotinylation Phosphoramidite for 5'-end-Labelling and Affinity Purification of Synthetic Oligonucleotides," Nucleic Acids Res. (2003) 31(2): 708-715.
Faruqi et al., "High-throughput genotyping of single nucleotide polymorphisms with rolling circle amplification," BMC Genomics. (2001) 2:4.
Femino et al., "Visualization of single RNA transcripts in situ," Science. (1998) 280(5363): 585-90.
Frei et al., "Highly multiplexed simultaneous detection of RNAs and proteins in single cells," Nat Methods. (2016) 13(3): 269-275.
Gavrilovic et al., "Automated classification of multicolored rolling circle products in dual-channel wide-field fluorescence microscopy," Cytometry A. (2011) 79(7): 518-27.
Geiss et al., "Direct multiplexed measurement of gene expression with color-coded probe pairs," Nat Biotechnol. (2008) 26(3): 317-25.
Glass et al., "SIMPLE: a sequential immunoperoxidase labeling and erasing method," J Histochem Cytochem. (2009) 57(10); 899-905.
Goh, J.J.L et al. (Jul. 2020, e-pub. Jun. 15, 2020). "Highly Specific Multiplexed RNA Imaging In Tissues With Split-FISH," Nat Methods 17(7):689-693. doi: 10.1038/s41592-020-0858-0. Epub Jun. 15, 2020.
Goransson et al., "A single molecule array for digital targeted molecular analyses," Nucleic Acids Res. 2009 37(1):e7. doi: 10.1093/nar/gkn921.
Gunderson et al. "Decoding randomly ordered DNA arrays." Genome research 14.5 (2004): 870-877.
Gyllborg et al., "Hybridization-based in situ sequencing (HybISS) for spatially resolved transcriptomics in human and mouse brain tissue," Nucleic Acids Res. (2020) 48(19): e112.
Han et al., "Quantum-dot-tagged microbeads for multiplexed optical coding of biomolecules," Nat Biotechnol. (2001) 19(7): 631-5.
Henegariu et al., "Custom fluorescent-nucleotide synthesis as an alternative method for nucleic acid labeling," Nature Biotechnol. (2000) 18:345.
Itzkovitz et al., "Single-molecule transcript counting of stem-cell markers in the mouse intestine," Nat Cell Biol. (2011) 14(1): 106-14.
Itzkovitz et al., "Validating Transcripts with Probes and Imaging Technology," Nat Methods. (2011) 8(4 Suppl): S12-S19.
Jamur et al., "Permeabilization of cell membranes," Method Mol. Biol. (2010) 588: 63-66 (abstract only).
Korlach et al. "Selective aluminum passivation for targeted immobilization of single DNA polymerase molecules in zero-mode

(56) References Cited

OTHER PUBLICATIONS waveguide nanostructures." *Proceedings of the National Academy of Sciences* 105.4 (2008): 1176-1181.

Lagunavicius et al., "Novel application of Phi29 DNA polymerase: RNA detection and analysis in vitro and in situ by target RNA-primed RCA," Rna. (2009) 15(5):765-71.

Lakowicz et al., "Silver particles enhance emission of fluorescent DNA oligomers," Bio Techniques (2003) 34(1); 62-66.

Larsson et al. "In situ detection and genotyping of individual mRNA molecules," Nat Methods. (2010) 7(5):395-397.

Lee et al. "Highly Multiplexed Subcellular RNA Sequencing In Situ", Science (2014) 343(6177):1360-1363.

Levene et al. "Zero-mode waveguides for single-molecule analysis at high concentrations." *science* 299.5607 (2003): 682-686.

Levsky et al., "Fluorescence in situ hybridization: past, present and future," J Cell Sci. (2003) 116(Pt 14): 2833-8.

Levsky et al., "Single-cell gene expression profiling," Science. (2002) 297(5582): 836-40.

Lin et al., "Highly multiplexed imaging of single cells using a high-throughput cyclic immunofluorescence method," Nat Commun. (2015) 6:8390.

Liu et al. Barcoded oligonucleotides ligated on RNA amplified for multiplexed and parallel in situ analyses. Nucleic Acids Res. (2021) 49(10):e58, 15 pages. doi: 10.1093/nar/gkab120.

Lizardi et al., "Mutation detection and single-molecule counting using isothermal rolling-circle amplification," Nat Genet. (1998) 19(3): 225-232.

Lundquist et al. "Parallel confocal detection of single molecules in real time." Optics letters 33.9 (2008): 1026-1028.

Lyamichev et al., "Comparison of the 5' nuclease activities of taq DNA polymerase and its isolated nuclease domain," Proc Natl Acad Sci USA. (1999) 96(11): 6143-6148.

Ma et al., "RNA template-dependent 5' nuclease activity of Thermus aquaticus and Thermus thermophilus DNA polymerases," J Biol Chem. (2000) 275(32): 24693-700.

Maierhorfer et al., "Multicolor deconvolution microscopy of thick biological specimens," Am J Pathol. (2003) 162(2): 373-9.

McGinn et al., "New technologies for DNA analysis—a review of the READNA Project," N Biotechnol. (2016) 33(3): 311-30. doi: 10.1016/j.nbt.2015.10.003.

Meade et al. "Multiplexed DNA detection using spectrally encoded porous SiO2 photonic crystal particles," Anal Chem. (2009) 81(7): 2618-25.

Mitra et al., "Fluorescent in situ sequencing on polymerase colonies," Anal. Biochem. (2003) 320, 55-65.

Moffitt et al., "RNA Imaging with Multiplexed Error-Robust Fluorescence In Situ Hybridization (MERFISH)," Methods in Enzymology, (2016) 572; 1-49.

Mohsen et al., "The Discovery of Rolling Circle Amplification and Rolling Circle Transcription," Acc Chem Res. (2016) 49(11): 2540-2550.

Nagendran et al., "Automated cell-type classification in intact tissues by single-cell molecular profiling," Elife. (2018) 7:e30510.

Nallur et al., "Signal amplification by rolling circle amplification on DNA microarrays," Nucleic Acids Res. (2001) 29(23): e118.

Niu et al., "Fluorescence detection for DNA using hybridization chain reaction with enzyme-amplification," Chem C+A277ommun (Camb). (2010) 46(18): 3089-91.

Payne et al. "In situ genome sequencing resolves DNA sequence and structure in intact biological samples," Science. (2021) 371(6532): eaay3446. doi: 10.1126/science.aay3446. Epub Dec. 31, 2020.

Pirici et al., "Antibody elution method for multiple immunohistochemistry on primary antibodies raised in the same species and of the same subtype," J Histochem Cytochem. (2009) 57(6); 567-75.

Raj et al., "Imaging individual mRNA molecules using multiple singly labeled probes," Nat Methods. (2008) 5(10): 877-879.

Rouhanifard et al. "ClampFISH detects individual nucleic acid molecules using click chemistry-based amplification," Nat Biotechnol. (2018) 17 pages. doi: 10.1038/nbt.4286.

Schweitzer et al. "Immunoassays with rolling circle DNA amplification: A versatile platform for ultrasensitive antigen detection," Proc. Natl Acad. Sci. USA (2000) 97:10113-119.

Schweitzer et al., "Multiplexed protein profiling on microarrays by rolling-circle amplification," Nature Biotech. (2002) 20:359-365.

Shendure et al., "Accurate multiplex polony sequencing of an evolved bacterial genome," Science (2005) 309(5741); 1728-1732.

Song et al., "Hybridization chain reaction-based aptameric system for the highly selective and sensitive detection of protein," Analyst. (2012) 137(6):1396-1401.

Sountoulidis et al., "Scrinshot enables spatial mapping of cell states in tissue sections with single-cell resolution," PLoS Biol. (2020) 18(11):e3000675.

Sun et al., "Composite organic-inorganic nanoparticles as Raman labels for tissue analysis," Nano Lett. (2007) 7(2): 351-6.

Takei et al., (Feb. 2021, e-pub Jan. 27, 2021). "Integrated Spatial Genomics Reveals Global Architecture of Single Nuclei," Nature 590(7845):344-350, 53 pages. doi: 10.1038/s41586-020-03126-2.

Tripathi et al., "Z Probe, An Efficient Tool for Characterizing Long Non-Coding RNA in FFPE Tissues," Noncoding RNA. (2018) 4(3):20.

Tsuneoka et al., "Modified in situ Hybridization Chain Reaction Using Short Hairpin DNAs," Front Mol Neurosci. (2020) 13:75.

Vandernoot et al., "cDNA normalization by hydroxyapatite chromatography to enrich transcriptome diversity in RNA-seq applications," Biotechniques, (2012) 53(6) 373-80.

Wählby et al., "Sequential immunofluorescence staining and image analysis for detection of large numbers of antigens in individual cell nuclei," Cytometry. (2002) 47(1): 32-41.

Wang et al., "Three-dimensional intact-tissue sequencing of single-cell transcriptional states," Science. (2018) 361(6400): eaat5691.

Weibrecht et al., "Simultaneous visualization of both signaling cascade activity and end-point gene expression in single cells," PLoS One. (2011) 6(5): e20148.

Wilson et al., "Encoded microcarriers for high-throughput multiplexed detection," Angew Chem Int Ed Engl. (2006) 18;45(37): 6104-17.

Wu, C. et al. "RollFISh Achieves Robust Quantification of Single-Molecule RNA Biomarkers in Paraffin-Embedded Tumor Tissue Samples," Commun Biol. (2018) 1:(209):1-8. doi: 10.1038/s42003-018-0218-0.

Xia et al. "Multiplexed detection of RNA using MERFISH and branched DNA amplification." Scientific reports 9.1 (2019): 1-13.

Zhao et al., "Advances of multiplex and high throughput biomolecular detection technologies based on encoding microparticles," Sci China Chem. (2011) 54(8):1185.

* cited by examiner

MULTIPLE READOUT SIGNALS FOR ANALYZING A SAMPLE

CROSS-REFERENCE TO RELATED APPLICATIONS

This application claims priority to U.S. Provisional Patent Application No. 63/344,978, filed May 23, 2022, and to U.S. Provisional Patent Application No. 63/301,987, filed Jan. 21, 2022, each of which is herein incorporated by reference in its entirety for all purposes.

FIELD

The present disclosure generally relates to methods and compositions for detection of analytes in a sample, including in situ detection of multiple analytes in sequential cycles in a cell or tissue sample.

BACKGROUND

Methods are available for analyzing nucleic acids present in a biological sample, such as a cell or a tissue. Current methods of oligonucleotide probe-based assay methods for in situ analysis may suffer from low sensitivity, specificity, and/or detection efficiency and may require careful and laborious optimization. For example, signals with small size and/or weak intensity may not reach a threshold of detection, whereas signals with large size and/or high intensity may result in optical overcrowding, especially when the signal spots are in close proximity. In either case, sensitivity can be compromised, reducing the quality of image analysis. There is a need for new and improved methods for in situ assays. The present disclosure addresses these and other needs.

SUMMARY

In some aspects, disclosed herein is a method for analyzing a biological sample, the method comprising, in any suitable order: (a) contacting the biological sample with an encoding probe or probe set (e.g., for smFISH) comprising: (i) a first hybridization region complementary to a first target sequence in the biological sample, (ii) one or more first barcode regions (e.g., a first barcode region comprising one or more smFISH barcodes); (b) contacting the biological sample with a circular probe or circularizable probe or probe set comprising: (i) a second hybridization region complementary to a second target sequence in the biological sample, (ii) one or more second barcode regions (e.g., a second barcode region comprising one or more barcodes for in situ sequencing-by-hybridization or sequencing-by-ligation); (c) contacting the biological sample with a first detectable probe that directly or indirectly binds to a sequence in the one or more first barcode regions; (d) detecting a first signal associated with the first detectable probe; (e) generating a rolling circle amplification (RCA) product in the biological sample using the circular probe or a circularized probe generated from the circularizable probe or probe set as the RCA template; (f) contacting the biological sample with a second detectable probe that hybridizes to the RCA product at a sequence in the one or more second barcode regions or a complementary sequence thereof; and (g) detecting a second signal associated with the second detectable probe, thereby detecting the first target sequence or a portion thereof and the second target sequence or a portion thereof in the biological sample. In some embodiments, the second detectable probe hybridizes to the RCA product at a sequence complementary to a sequence in the one or more second barcode regions.

In any of the embodiments herein, the method can further comprise selecting the first target sequence or a plurality of first target sequences (e.g., from a plurality of target sequences), e.g., for detection by smFISH. In any of the embodiments herein, the method can further comprise providing the encoding probe or probe set. In any of the embodiments herein, the encoding probe or probe set can be or comprise a primary probe that hybridizes to the first target sequence and comprises one or more first barcode regions that do not hybridize to the first target sequence. The barcodes in the one or more first barcode regions can be probed by one or more first detectable probes, e.g., detectable probes for smFISH, and signals associated with the detectable probes can be detected. In some embodiments, the smFISH signals associated with a plurality of first target sequences can be detected at locations in the biological sample, e.g., as puncta or "spots." In some embodiments, each first target sequence of a plurality of first target sequences can be targeted (e.g., hybridized) by one or more encoding probes or probe sets, and sequential hybridization cycles using detectable probes to probe barcodes in the first barcode regions of the encoding probes or probe sets for the plurality of first target sequences can be performed. In some embodiments, smFISH signals detected in the sequential hybridization cycles can be decoded to identify one or more particular first target sequences from the plurality of first target sequences at one or more of the locations in the biological sample.

In any of the embodiments herein, the first target sequence may have an average copy number of no more than about 100 per cell in the biological sample. In some embodiments, the first target sequence is in an RNA having an average copy number of no more than about 100 per cell in the biological sample. In any of the embodiments herein, each of the plurality of first target sequences may have an average copy number of no more than about 100 per cell in the biological sample. In some embodiments, the plurality of first target sequences are first target RNA sequences. In some embodiments, the plurality of first target sequences are first target mRNA sequences. In some embodiments, genes encoding the plurality of first target mRNA sequences are present and/or expressed at a lower level than the plurality of second target mRNA sequences, for example, in a cell or sample of a particular tissue/organ origin, in a cell or sample of a particular type, and/or in a cell or sample in a particular state (e.g., benign versus malignant, undifferentiated versus differentiated, normoxic versus hypoxic, etc.). In some embodiments, each of the first target mRNA sequences is present in the biological sample, on average, at no more than about 5, no more than about 10, no more than about 15, no more than about 20, no more than about 25, no more than about 50, no more than about 75, or no more than about 100 transcript molecules per cell. In some embodiments, the plurality of first target sequences are first target cDNA sequences, and the method further comprises a step of reverse transcribing RNA molecules in the biological sample to generate the first target cDNA sequences.

In any of the embodiments herein, the method can further comprise selecting the second target sequence or a plurality of second target sequences (e.g., from a plurality of target sequences), e.g., for detection using RCA. In any of the embodiments herein, the method can further comprise providing the circular probe or circularizable probe or probe set. In some embodiments, the circular probe or circularizable probe or probe set can be or comprise a primary probe that hybridizes to the second target sequence and comprises one or more second barcode regions that do not hybridize to the second target sequence. In some embodiments, the circular probe or circularizable probe or probe set can be or comprise a secondary probe that (i) hybridizes to a primary probe which hybridizes to the second target sequence and (ii) comprises one or more second barcode regions that do not hybridize to the primary probe. In some embodiments, an RCA product of the circular probe or circularizable probe or probe set can comprise multiple copies of the complement of the one or more second barcode regions. The RCA product can be probed by one or more second detectable probes, e.g., a fluorescently labeled probe or an intermediate probe that hybridizes to a fluorescently labeled probe, and signals associated with the detectable probes can be detected. In some embodiments, signals associated with the RCA products corresponding to a plurality of second target sequences can be detected at locations in the biological sample, e.g., as puncta or "spots." In some embodiments, each second target sequence of a plurality of second target sequences can be targeted (e.g., hybridized) by one or more circular probe or circularizable probes or probe sets, and sequential hybridization cycles using detectable probes to probe barcodes or complement thereof in the RCA products corresponding to the plurality of second target sequences can be performed. In some embodiments, signals detected in the sequential hybridization cycles can be decoded to identify one or more particular second target sequences from the plurality of second target sequences at one or more of the locations in the biological sample.

In any of the embodiments herein, the second target sequence may have an average copy number of at least about 100 per cell in the biological sample. In any of the embodiments herein, each of the plurality of second target sequences may have an average copy number of at least about 100 per cell in the biological sample. In some embodiments, the plurality of second target sequences are second target RNA sequences. In some embodiments, the plurality of second target sequences are second target mRNA sequences. In some embodiments, genes encoding the plurality of second target mRNA sequences are present and/or expressed at a higher level than the plurality of first target mRNA sequences, for example, in a cell or sample of a particular tissue/organ origin, in a cell or sample of a particular type, and/or in a cell or sample in a particular state (e.g., benign versus malignant, undifferentiated versus differentiated, normoxic versus hypoxic, etc.). In some embodiments, each of the second target mRNA sequences is present in the biological sample at, on average, at least or about 125, at least or about 150, at least or about 175, or at least or about 200 transcript molecules per cell. In some embodiments, the plurality of second target sequences are second target cDNA sequences, and the method further comprises a step of reverse transcribing RNA molecules in the biological sample to generate the second target cDNA sequences.

In any of the embodiments herein, the method comprises dividing a plurality of target sequences of interest into two or more groups, wherein a first group comprises the first target sequence or the plurality of first target sequences (e.g., for detection by smFISH) and a second group comprises the second target sequence or the plurality of second target sequences (e.g., for detection using RCA). In some embodiments, the first and second groups do not overlap in target sequence species. In some embodiments, the first and second groups comprise one or more common species of target sequences. For instance, one, two, three, four, five, or more species of target sequences can be in both the first group and the second group. In some embodiments, one or more target sequences in the first group (e.g., for detection by smFISH) are present or expressed at a lower level than one or more target sequences in the second group (e.g., for detection using RCA). In some embodiments, on average, the target sequences in the first group (e.g., for detection by smFISH) are present or expressed at a lower level than the target sequences in the second group (e.g., for detection using RCA).

In some embodiments, contacting the biological sample with an encoding probe or probe set (e.g., for smFISH) in (a) is performed simultaneously with contacting the biological sample with a circular probe or a circularizable probe or probe set in (b). In some embodiments, contacting the biological sample with an encoding probe in (a) is performed before or after contacting the biological sample with a circular or circularizable probe in (b). In some embodiments, the contacting in (a) and (b) is performed simultaneously or in either order.

In some embodiments, the following steps are performed in order: (c) contacting the biological sample with a first detectable probe that directly or indirectly binds to a sequence in the one or more first barcode regions; (d) detecting a first signal associated with the first detectable probe; (e) generating a rolling circle amplification (RCA) product in the biological sample using the circular probe or a circularized probe generated from the circularizable probe or probe set as the RCA template; (f) contacting the biological sample with a second detectable probe that hybridizes to the RCA product at a sequence in the one or more second barcode regions or a complementary sequence thereof; and (g) detecting a second signal associated with the second detectable probe, thereby detecting the first target sequence or a portion thereof and the second target sequence or a portion thereof in the biological sample. In some embodiments, steps (c), (d), (e), (f), and (g) are performed in that order.

In some embodiments, the biological sample is contacted with the encoding probe or probe set and the circular probe or circularizable probe or probe set (simultaneously or in either order), followed by generating the RCA product in step (e). In some embodiments, after the RCA product is generated in step (e), the method comprises: (c) contacting the biological sample with a first detectable probe that directly or indirectly binds to a sequence in the one or more first barcode regions; (d) detecting a first signal associated with the first detectable probe; (f) contacting the biological sample with a second detectable probe that hybridizes to the RCA product at a sequence in the one or more second barcode regions or a complementary sequence thereof; and (g) detecting a second signal associated with the second detectable probe, thereby detecting the first target sequence or a portion thereof and the second target sequence or a portion thereof in the biological sample, wherein (c), (d), (f), and (g) are performed in that order. In some embodiments, after the RCA product is generated in step (e), the method comprises: (f) contacting the biological sample with a second detectable probe that hybridizes to the RCA product at a sequence in the one or more second barcode regions or a complementary sequence thereof; (g) detecting a second signal associated with the second detectable probe; (c) contacting the biological sample with a first detectable probe that directly or indirectly binds to a sequence in the one or more first barcode regions; and (d) detecting a first signal associated with the first detectable probe; thereby detecting the first target sequence or a portion thereof and the second target sequence or a portion thereof in the biological sample, wherein (f), (g), (c), and (d) are performed in that order.

In some embodiments, the contacting in steps (a) and (b) are performed simultaneously or in either order, followed by generating the RCA product in step (e), optionally wherein the remaining steps (c), (d), (f), and (g) are performed in that order. In some embodiments, the remaining steps (c), (d), (f), and (g) are performed in that order. In some embodiments, the remaining steps (f), (g), (c), and (d) are performed in that order.

In any of the embodiments herein, the encoding probe or probe set may not need to be amplified and/or processed by a polymerase for RCA. In some embodiments, the polymerase for RCA is phi29. In any of the embodiments herein, the encoding probe or probe set comprises a modification, optionally wherein the modification is resistant to a 5'→3' polymerase activity and/or a 3'→5' exonuclease activity. In some embodiments, the modification comprises an irreversible terminating group (optionally ddNTP), a reversible terminating group (optionally a 3'-O-blocked reversible terminating group and/or 3'-unblocked reversible terminating group optionally linked to the base), a 3' thiophosphate protection, a phosphorothioate bond, a 2'-modified nucleoside, an inverted deoxythymidine base, and/or a 2'-O-methyl ribonucleotide, optionally wherein the 2'-O-methyl ribonucleotide is a 3' terminal nucleotide of the encoding probe or probe set.

In any of the embodiments herein, the contacting in steps (c) and (f) may be performed simultaneously or in either order. In any of the embodiments herein, the detecting in steps (d) and (g) may be performed simultaneously or in either order. In some embodiments, the method may comprise steps (a), (c), (d), (b), (e), (f), and (g) in that order. In some embodiments, the method may comprise steps (b), (e), (f), (g), (a), (c), and (d) in that order.

In any of the embodiments herein, the encoding probe or probe set may comprise only linear probe(s). In any embodiments herein, the encoding probe or probe set may not need to be circularized within the probe or probe set or with one or more other probes.

In any of the embodiments herein, the encoding probe or probe set may be circularized to generate a circularized encoding probe. In some embodiments, the circularized encoding probe may not need to be used as a template to generate an RCA product. In some embodiments, the method does not comprise generating an RCA product from the circularized encoding probe.

In any of the embodiments herein, the encoding probe or probe set may comprise a 3' overhang and/or a 5' overhang. In some embodiments, the encoding probe or probe set comprises a 3' overhang comprising the one or more first barcode regions. In some embodiments, the 3' overhang is resistant to a 3'>5' exonuclease activity.

In some embodiments, the encoding probe or probe set comprises a 5' overhang comprising the one or more first barcode regions. In some embodiments, the encoding probe or probe set comprises a 3' end that is resistant to a 5'→3' polymerase activity. In some embodiments, the encoding probe or probe set comprises a 3' overhang and a 5' overhang. In some embodiments, the encoding probe or probe set comprises a 3' overhang and a 5' overhang, wherein each overhang comprises one or more first barcode regions. In any of the embodiments herein, the first target sequence may be in a DNA or RNA molecule. In some embodiments, the DNA molecule is a genomic DNA, a cDNA, or a synthetic oligonucleotide probe. In some embodiments, the RNA molecule may be an mRNA, a viral RNA, or a non-coding RNA.

In any of the embodiments herein, the first target sequence may be a contiguous sequence. In any of the embodiments herein, the first target sequence may be a split sequence comprising two or more subsequences. In some embodiments, the two or more subsequences are in multiple oligonucleotide probes that hybridize to a genomic DNA, a cDNA, an mRNA, a viral RNA, or a non-coding RNA. In any of the embodiments herein, the biological sample may be contacted with a plurality of encoding probes each (i) hybridizing to one of multiple first target sequences in a DNA or RNA molecule and (ii) may comprise one or more first barcode sequences in the one or more first barcode regions.

In any of the embodiments herein, the method may use at least about 2, about 5, about 10, about 15, about 20, about 25, about 30, or about 35 distinct encoding probes for the DNA or RNA molecule. In any of the embodiments herein, the biological sample may be contacted with a plurality of first detectable probes each (i) hybridizing to one of a plurality of first barcode sequences in the one or more first barcode regions and (ii) may comprise a fluorescent moiety. In some embodiments, the contacting of the sample with a first detectable probe that directly or indirectly binds to a sequence in the one or more first barcode regions is performed in sequential cycles, and/or the detecting of signals associated with the first detectable probes is performed in sequential cycles. In any of the embodiments herein, the first detectable probe may comprise a fluorescent moiety and it may not need to bind a circularized probe upon hybridization to the encoding probe or probe set. In some embodiments, the fluorescent moiety is cleavable or degradable.

In some embodiments, the method further comprises extinguishing a fluorescent signal of the fluorescent moiety after the detecting a first signal associated with the first detectable probe. In some instances, the method comprises unhybridizing the first detectable probe. In some embodiments, the method comprises removing the unhybridized first detectable probe without unhybridizing the encoding probe or probe set. In some instances, the method comprises removing the fluorescent moiety by enzymatically cleaving, modifying, or degrading the first detectable probe or a portion thereof. In some instances, the method comprises inactivating the first detectable probe by masking, removing, or modifying the fluorescent moiety. In some instances, the method comprises cleaving a linker linking the fluorescent moiety to the first detectable probe. In some instances, the linker comprises a disulfide bond. In some instances, the method comprises chemically or photochemically modifying the fluorescent moiety. In some instances, the method comprises bleaching the fluorescent moiety by a chemical agent. In some instances, the method comprises photobleaching the fluorescent moiety. In some instances, the method comprises permanently and irreversibly extinguishing the fluorescent moiety. In some instances, the method comprises quenching the fluorescent moiety.

In any of the embodiments herein, the first detectable probe may be circularized upon hybridization to the encoding probe or probe set. In some embodiments, the circularized first detectable probe is used as a template to generate an RCA product for detection. In any of the embodiments herein, the method may comprise contacting the biological sample with a plurality of the encoding probes or probe sets for a plurality of distinct first target sequences. In some embodiments, the distinct first target sequences are in genomic DNA, cDNA, mRNA, viral RNA, or non-coding RNA. In some embodiments, the distinct first target sequences are in distinct RNA molecules.

In any of the embodiments herein, the first target sequence may have an average copy number of no more than about 5, no more than about 10, no more than about 15, no more than about 20, no more than about 25, no more than about 30, no more than about 35, no more than about 40, no more than about 45, no more than about 50, no more than about 100, no more than about 200, no more than about 300, or no more than about 400 per cell in the biological sample.

In any of the preceding embodiments, signals associated with the first analyte can be detected in step (d), and the first analyte can be a first nucleic acid molecule comprising the first target sequence. In any of the preceding embodiments wherein the first analyte is a nucleic acid molecule, the first analyte can be at least 100, at least 200, at least 300, at least 400, at least 500, at least 600, at least 700, at least 800, at least 900, or at least 1000 nucleotides in length.

In any of the embodiments herein, two ends of the circularizable probe or probe set may be ligated using DNA-templated ligation, RNA-templated ligation, and/or click chemistry ligation. In some embodiments, the circularizable probe may be a padlock probe.

In any of the embodiments herein, two ends of the circularizable probe or probe set may be ligated using the second target sequence as a template, with or without cleaving a 5' flap and/or with or without gap filling prior to ligation. In any of the embodiments herein, the circularizable probe or probe set may be composed primarily of DNA and the circularized probe comprises no more than four consecutive ribonucleotides. In some embodiments, prior to ligation the circularizable probe or probe set comprises a ribonucleotide at a 3' ligatable end. In any of the embodiments herein, two ends of the circularizable probe or probe set may be ligated using a splint as a template, with or without cleaving a 5' flap and/or with or without gap filling prior to ligation, and wherein the splint may be distinct from the second target sequence.

In some embodiments, the splint hybridizes to a sequence adjacent to the second target sequence, in addition to hybridizing to the two ends of the circularizable probe or probe set. In any of the embodiments herein, the splint or a portion thereof may be used to prime the RCA. In any of the embodiments herein, the method may comprise contacting the circularized probe with a primer that hybridizes to the circularized probe to prime the RCA.

In any of the embodiments herein, the second target sequence may be in a DNA molecule. In some embodiments, the DNA molecule is a genomic DNA, a cDNA, or a synthetic oligonucleotide probe. In any of the embodiments herein, the second target sequence may be in an RNA molecule. In some embodiments, the RNA molecule is an mRNA, a viral RNA, or a non-coding RNA.

In any of the embodiments herein, the second target sequence may be a contiguous sequence. In any of the embodiments herein, the second target sequence may be a split sequence comprising two or more subsequences. In some embodiments, the two or more subsequences are in multiple oligonucleotide probes that hybridize to a genomic DNA, a cDNA, an mRNA, a viral RNA, or a non-coding RNA.

In any of the embodiments herein, the method may comprise using no more than 4 distinct circular probes or circularizable probes or probe sets for a DNA or RNA molecule in the biological sample. In some embodiments, the DNA or RNA molecule is targeted by only one distinct circular probe or circularizable probe or probe set.

In any of the embodiments herein, the RCA product may be a nanoball having a diameter of between about 0.1 µm and about 3 µm. In some embodiments, the RCA product has a diameter of between about 0.1 µm and about 0.5 µm, between about 0.5 µm and about 1 µm, between about 0.8 µm and about 1.3 µm, or between about 1 µm and about 1.5 µm. In some embodiments, the RCA product has a diameter of between about 0.2 µm and about 0.3 µm, or between about 0.3 µm and about 0.4 µm. In any of the embodiments herein, the RCA product may be between about 1 and about 15 kilobases, between about 15 and about 25 kilobases, between about 25 and about 35 kilobases, between about 35 and about 45 kilobases, between about 45 and about 55 kilobases, between about 55 and about 65 kilobases, between about 65 and about 75 kilobases, or more than 75 kilobases in length. In some embodiments, the RCA product is between about 45 and about 70 kilobases in length. In any of the embodiments herein, the RCA product may comprise between about 10 and about 100, between about 100 and about 1,000, between about 1,000 and about 5,000, between about 5,000 and about 10,000, or more than 10,000 copies of a unit sequence corresponding to the circularized probe. In any of the embodiments herein, the RCA may be performed in situ in the biological sample for no more than 3 hours, no more than 2 hours, no more than 1 hour, no more than 30 minutes, or no more than 15 minutes.

In any of the preceding embodiments, signals associated with the second analyte can be detected in step (g), and the second analyte can be a second nucleic acid molecule comprising the second target sequence. In any of the preceding embodiments wherein the second analyte is a nucleic acid molecule, the second analyte may be no more than 500, no more than 400, no more than 300, no more than 200, or nor more than 100 nucleotides in length. In any of the preceding embodiments, the first nucleic acid molecule is longer than the second nucleic acid molecule.

In any of the embodiments herein, the biological sample may be contacted with a plurality of second detectable probes each comprising (i) a second barcode sequence in the one or more second barcode regions and (ii) a fluorescent moiety. In any of the embodiments herein, the biological sample may be contacted with a plurality of second detectable probes each comprising (i) a second barcode sequence in the one or more second barcode regions and (ii) a 3' overhang and/or a 5' overhang comprising a binding sequence for a detection probe comprising a fluorescent moiety. In any of the embodiments herein, the contacting of the biological sample with a second detectable probe that hybridizes to the RCA product at a sequence in the one or more second barcode regions or a complement thereof and the detecting of the second signal associated with the second detectable probe may be performed in sequential cycles.

In any of the embodiments herein, the method may further comprise extinguishing or removing a fluorescent signal of the fluorescent moiety after a second signal associated with the second detectable probe is detected. In some instances, the method may comprise unhybridizing the second detectable probe and/or the detection probe. In some instances, the method may comprise removing the fluorescent moiety by enzymatically cleaving, modifying, or degrading the second detectable probe and/or the detection probe or a portion thereof. In some instances, the method may comprise inactivating the second detectable probe or the detection probe by masking, removing, or modifying the fluorescent moiety. In some instances, the method may comprise cleaving a linker linking the fluorescent moiety to the second detectable probe or the detection probe. In some instances, the linker may comprise a disulfide bond. In some instances, the method may comprise chemically or photochemically modifying the fluorescent moiety. In some instances, the method may comprise bleaching the fluorescent moiety by a chemical agent. In some instances, the method may comprise photobleaching the fluorescent moiety. In some instances, the method may comprise permanently and irreversibly extinguishing the fluorescent moiety. In some instances, the first probe may comprise quenching the fluorescent moiety.

In any of the embodiments herein, the method may comprise contacting the biological sample with a plurality of the circular probes or circularizable probes or probe sets for a plurality of distinct second target sequences. In some embodiments, the distinct second target sequences are in genomic DNA, cDNA, mRNA, viral RNA, or non-coding RNA.

In any of the embodiments herein, the second target sequence may have an average copy number of at least about 50, at least about 100, at least about 200, at least about 300, at least about 400, at least about 500, at least about 1,000, at least about 2,000, at least about 3,000, at least about 4,000, at least about 5,000, at least about 6,000, at least about 7,000, at least about 8,000, at least about 9,000, or at least about 10,000 per cell in the biological sample.

In any of the embodiments herein, the first target sequence may have an average copy number of no more than about 100 per cell in the biological sample, and the second target sequence may have an average copy number of at least about 100 per cell in the biological sample.

In certain embodiments, the first target sequence and the second target sequence may comprise the same sequence or different sequences; and/or the first target sequence and the second target sequence may be in molecules corresponding to the same analyte or distinct analytes. In some embodiments, the analyte or distinct analytes comprise one or more nucleic acid analytes and one or more non-nucleic acid analytes. In some embodiments, the corresponding molecules each comprises a binding moiety conjugated to an reporter oligonucleotide. In some embodiments, the binding moiety is an antibody or antigen binding fragment thereof.

In some embodiments, the first target sequence and the second target sequence are in molecules corresponding to the same analyte, and the method further comprises comparing the detection of the first target sequence and the detection of the second target sequence. In some embodiments, the comparing step comprises calculating the percentage of detected molecules corresponding to the first target sequence that also correspond to the second target sequence. In any of the preceding embodiments, the method may detect at least a first analyte and a second analyte, wherein the first target sequence corresponds to the first analyte and the second target sequence corresponds to the second analyte. In any of the embodiments herein, the method may detect at least a first analyte and a second analyte, wherein for each analyte: steps (a) and (b) may be the same step, and the first target sequence and the second target sequence may at least partially overlap. In any of the embodiments herein, the first target sequence and the second target sequence may be the same sequence corresponding to the analyte. In any of the embodiments herein, the encoding probe or probe set and the circular probe or circularizable probe or probe set may be the same probe or probe set. In some embodiments, the biological sample is contacted with a circular probe or circularizable probe or probe set comprising: (i) a hybridization region complementary to a second target sequence in the biological sample, (ii) one or more barcode regions that can be detected by first and second detectable probes, wherein the second detectable probes hybridize to RCA products generated using circular probe or circularized probe or probe set. In some instances, signals from the first detectable probes are detected prior to generating the RCA product using the circular probe or circularized probe or probe set.

In some embodiments, step (a)/(b) is followed by steps (c) and (d) without RCA of the circular probe or the circularized probe generated from the circularizable probe or probe set.

In some embodiments, signals associated with the first analyte are detected in step (d), and wherein the first analyte has an average copy number of no more than about 5, no more than about 10, no more than about 15, no more than about 20, no more than about 25, no more than about 30, no more than about 35, no more than about 40, no more than about 45, no more than about 50, no more than about 100, no more than about 200, no more than about 300, or no more than about 400 per cell in the biological sample in the biological sample. In some embodiments, steps (c) and (d) are followed by steps (e)-(g) in that order.

In some embodiments, signals associated with the second analyte are detected in step (g), and wherein the second analyte has an average copy number of at least about 500, at least about 1,000, at least about 2,000, at least about 3,000, at least about 4,000, at least about 5,000, at least about 6,000, at least about 7,000, at least about 8,000, at least about 9,000, or at least about 10,000 per cell in the biological sample.

In any of the embodiments herein, signals associated with a third analyte may be detected in both step (d) and step (g).

In any of the embodiments herein, the biological sample may be non-homogenized. In any of the embodiments herein, the biological sample may be selected from the group consisting of a formalin-fixed, paraffin-embedded (FFPE) sample, a frozen tissue sample, and a fresh tissue sample. In any of the embodiments herein, the biological sample may be fixed. In any of the embodiments herein, the biological sample may not need to be fixed.

In any of the embodiments herein, the biological sample may be permeabilized. In any of the embodiments herein, the biological sample may be embedded in a matrix. In any of the embodiments herein, the matrix may comprise a hydrogel. In any of the embodiments herein, the biological sample may be cleared. In any of the embodiments herein, the clearing may comprise contacting the biological sample with a proteinase. In any of the embodiments herein, the biological sample may be crosslinked. In some embodiments, the biological sample is crosslinked to a matrix embedding the biological sample. In any of the embodiments herein, the biological sample may be cleared. In any of the embodiments herein, the biological sample may be a tissue slice between about 1 µm and about 50 µm in thickness. In some embodiments, the tissue slice is between about 5 µm and about 35 µm in thickness.

BRIEF DESCRIPTION OF THE DRAWINGS

The drawings illustrate certain features and advantages of this disclosure. These embodiments are not intended to limit the scope of the appended claims in any manner.

DETAILED DESCRIPTION

Figure 1A:
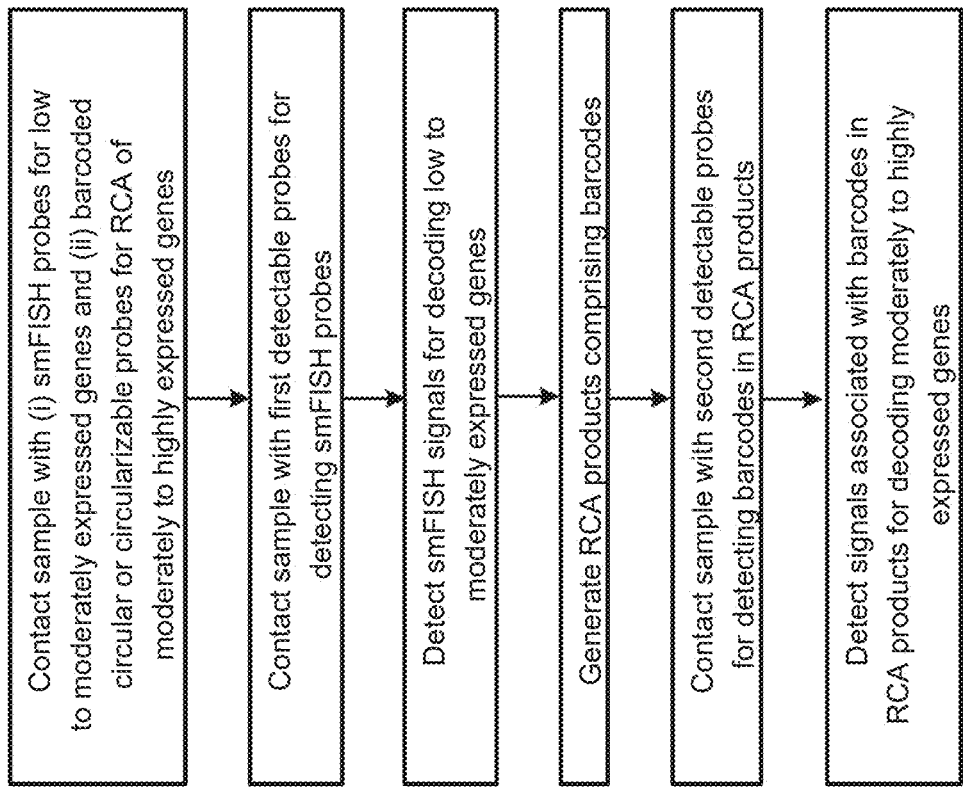
FIGS. 1A-1E show exemplary workflows of the methods disclosed herein for generating and detecting signals associated with smFISH probes and signals associated with amplified (e.g., RCA) products.

All publications, comprising patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. OVERVIEW

In various assays involving in situ detection of analytes (e.g., target nucleic acids such as mRNA, genomic DNA, or cDNA), analyte-associated signals may be generated that fall outside of an optimal range for detection and/or quantification. For example, small and/or low intensity signals may not reach a threshold of detection, whereas large and/or high intensity signals may result in optical overcrowding, especially when signals are in close proximity. In either case, assay sensitivity and/or efficiency can be compromised.

Single molecule fluorescent in situ hybridization (smFISH) assays, such as various multiplexed smFISH assays, are highly sensitive and are suited for the analysis of low-level analytes, such as transcripts of low expressed genes in a sample. However, the throughput (e.g., time to analyze a tissue sample area) can be limited due to dim smFISH signals. For instance, in order to detect weak optical signals under a microscope, high magnification (which is associated with small field of view) and/or long exposure time may be required. In some cases, the high sensitivity of smFISH may constrain which analytes (e.g., genes) can be analyzed. For example, detecting moderately or high expressed genes using smFISH can be challenging due to optical crowding of the smFISH signals. Furthermore, in commonly used smFISH techniques, detection of an individual nucleic acid molecule (e.g., a target RNA transcript) requires multiple short detectably labeled probes (often ~48 20-mer probes) that are complementary to the target nucleic acid molecule hybridize to the target nucleic acid molecule. Typically, the minimum number of smFISH probes for detecting a given target nucleic acid molecule is about 30. Binding of a single detectably labeled probe results in weak signal, but the signal from the combination of all the probes is robust. This feature improves the signal-to-noise ratio because even though a single probe can exhibit off-target binding, such signal is expected to be very weak compared to that of the combined probes hybridized to the target nucleic acid molecule (e.g., target RNA). However, the shorter transcripts may not provide sufficient binding sites to be targeted by the multiple detectably labeled probes, resulting in dimmer signal and more difficulty in detecting short transcripts.

Assays based on rolling circle amplification (RCA) can generate bright signals that can be imaged with low exposure time and wide field objectives, thus increasing the throughput and reducing the time needed to analyze a given sample area. As such, RCA-based techniques can analyze samples faster than smFISH techniques. RCA-based techniques typically only require hybridization of one or a few circular or circularizable probes or probe sets (e.g., padlock probes), because signal amplification is provided by generating an RCA product, a nucleic acid concatemer comprising multiple copies of a barcode sequence or complement thereof. Thus, RCA-based techniques can be used to detect short transcripts that might produce weak or non-detectable signals in a typical smFISH experiment. However, RCA-based techniques may not be as sensitive as smFISH techniques, and can result in dropout for low-level analytes such as low expressed genes.

In some embodiments, provided herein are methods and compositions that involve the use of both smFISH-based and RCA-based techniques, either sequentially or simultaneously, in the same cell and/or on the same biological sample. In some aspects, the present disclosure provides a first probe or probe set for smFISH and a second probe or probe set for RCA, wherein the first probe or probe set comprises a first hybridization region complementary to a first target sequence in the biological sample and the second probe or probe set comprises a second hybridization region complementary to a second target sequence in the biological sample. In some aspects, the first target sequence and the second target sequence are in molecules corresponding to the same analyte. In other aspects, the first target sequence and the second target sequence are in molecules corresponding to distinct analytes. For instance, the first target sequence is in molecules that are present or expressed at a lower level than molecules comprising the second target sequence in a cell, a cell population, a cell sample, or a tissue sample. In another example, the first target sequence is in nucleic acid molecules that are longer than nucleic acid molecules comprising the second target sequence (e.g., the first target sequence is in a longer RNA and the second target sequence is in a relatively shorter RNA). In some embodiments, a first nucleic acid molecule comprises a plurality of first target sequences (e.g., at least about 30 or at least about 40 first target sequences) for hybridization of encoding probes, which can be the same or different first target sequences. In some embodiments, a second target sequence comprises only one or only a few second target sequences (e.g., no more than 10, no more than 5, no more than 4, no more than 3, or no more than 2 second target sequences). In some embodiments, the first target sequence and the second target sequence comprise the same sequence or different sequences. In some embodiments, the first and second target sequences can independently be a genomic DNA, a cDNA, an mRNA, a viral RNA, or a non-coding RNA. In some embodiments, the first and second target sequences can independently be a contiguous sequence or can be a split sequence comprising two or more subsequences. In some embodiments, the two or more subsequences are in multiple oligonucleotide probes that hybridize to a genomic DNA, a cDNA, an mRNA, a viral RNA, or a non-coding RNA.

In some embodiments, the methods and compositions herein involve both high and low expressed genes being detected in the same cell or sample, while reducing or eliminating issues associated with optical overcrowding and/or dropout of analytes. In certain embodiments, low to moderately expressed genes in a cell or biological sample can be targeted and detected using smFISH probes while moderately to highly expressed genes in the same cell or biological sample can be targeted using probes for RCA-based detection.

In some embodiments, the methods and compositions herein involve both shorter RNA transcripts (e.g., RNA transcripts shorter than 500, 400, 300, 200, 100, 90, 80, 70, 60, 50, or 40 nucleotides in length) and longer RNA transcripts (e.g., RNA transcripts longer than 500, 600, 700, 800, 900, 1000, or 1400 nucleotides in length) being detected in the same cell or sample, while reducing or eliminating issues associated with optical overcrowding and/or dropout of analytes lowly expressed or short RNA transcripts. In certain embodiments, longer RNA transcripts can be targeted and detected using smFISH probes while shorter RNA transcripts in the same cell or biological sample can be targeted using probes for RCA-based detection.

The smFISH probes and the circular or circularizable probes for RCA can contact the cell or biological sample simultaneously or in any suitable order. For instance, the probes can be pre-mixed prior to contacting the cell or biological sample. Alternatively, the two probe types can be added to the cell or biological sample separately simultaneously or in either order. One or some or all smFISH probes can be read out first. In some embodiments, once the smFISH probe or probes are read out, one or some or all of the RCA probes can then be ligated (if it is necessary to circularize the probes), amplified by RCA, and then the barcodes in the RCA products can be read out, for instance, using in situ sequencing, such as sequencing-by-ligation, sequencing-by-hybridization, sequencing-by-synthesis, and/or sequencing-by-binding.

In some embodiments, one or some or all of the RCA probes are read out before one or some or all of the smFISH probes are read out. In some embodiments, one or some or all of the smFISH probes are applied to the sample first and read out, followed by applying one or some or all of the RCA probes and reading out the RCA probe(s). In some embodiments, one or some or all of the smFISH probes and one or some or all of the RCA probes are applied to the sample, followed by RCA where the 3' ends of the smFISH probes comprise a protecting/blocking group or base to prevent extension by a polymerase (e.g., Phi29) and/or exonuclease cleavage; one or some or all of the RCA products and one or some or all of the smFISH probes can then be read out in either order. In some embodiments, one or some or all of the RCA products and one or some or all of the smFISH probes can be read out at the same time. In some embodiments, the RCA products and the smFISH probes can be read out in the same detectable probe hybridization cycle, e.g., in different channels. In some embodiments, one or more analytes can be targeted by one or more smFISH probes and/or by one or more RCA probes. In some embodiments, a particular smFISH probe that hybridizes to the first target sequence can be provided as a single probe molecule, or as multiple probe molecules that may but do not need to be connected upon hybridization to the first target sequence. Likewise, a particular circularizable probe or probe set that hybridizes to the second target sequence can be provided as a single probe molecule, or as multiple probe molecules that may be connected upon hybridization to the second target sequence and/or a splint that is distinct from the second target sequence. Any first or second detectable probe disclosed herein can be provided as a single probe molecule, or as multiple probe molecules that may but do not need to be connected upon hybridization to a target sequence for the detectable probe.

In some embodiments, the absolute sensitivity of the RCA probe(s) can be determined based on the overlapping analytes (e.g., genes or transcripts detected by both smFISH and RCA), which can be used to model actual target numbers for the RCA-targeted analytes. For instance, assuming the sensitivity of smFISH detection (e.g., of an overlapping analyte) is 100%, when a sensitivity of 20% is observed in RCA-based detection (e.g., of an overlapping analyte), then all gene counts from the RCA probes can be multiplied by 5 to assume actual target molecule counts. In some aspects, detecting genes or transcripts by both smFISH and RCA includes the use of probes (e.g., encoding probes for smFISH and circular or circularizable probes for RCA) that are designed in a way that they do not share the same hybridization region complementary to the target sequence. In some case, the difference in sensitivity between the detection methods (e.g., calibration coefficient) may be calculated for one or more genes.

In some embodiments, each of a plurality of analytes can be independently targeted by multiple (e.g., about 2, about 5, about 10, about 15, about 20, about 25, about 30, or about 35) circular or circularizable probes. In some embodiments, the circular or circularizable probes are not amplified by RCA prior to contacting detectable probes for smFISH detection of the unamplified circular or circularizable probes targeting a first fraction of the plurality of analytes. In some embodiments, the first fraction comprises one or more of the plurality of analytes present or expressed at a lower level than a second fraction of the plurality of analytes. In some embodiments, the first and second fractions do not overlap. In some embodiments, the first and second fractions partially overlap, e.g., the first and second fractions may comprise one, two, three, or more common analytes (e.g., moderately expressed genes). In some embodiments, prior to RCA, the first fraction (e.g., low to moderately expressed genes) is detected using a multiplexed smFISH readout, whereas the second fraction (e.g., moderately to highly expressed genes) is not detected using the multiplexed smFISH readout. In some embodiments, analytes in the first fraction (and detectable probes for detecting these analytes) are chosen to reduce or minimize optical crowding of smFISH signals, e.g., analytes that may cause optical crowding can be excluded from the first fraction. In some embodiments, fluorescently labeled probes for detecting analytes that may cause optical crowding are not hybridized to the sample such that signals associated with analytes that may cause optical crowding are not detected in the multiplexed smFISH readout. In some embodiments, one or more or all of the unamplified circular or circularizable probes can be amplified and read out. In particular embodiments, after smFISH readout of the first fraction (e.g., low to moderately expressed genes), the unamplified circular or circularizable probes targeting the plurality of analytes are amplified to generate RCA products. In some embodiments, the RCA products corresponding to all of the plurality of analytes are detected using detectable probes. In some embodiments, the RCA products corresponding to one or more analytes of the first fraction (e.g., low to moderately expressed genes) and the RCA products corresponding to one or more analytes of the second fraction (e.g., moderately to highly expressed genes) are detected using detectable probes. In some embodiments, only the RCA products corresponding to the second fraction of the plurality of analytes are detected using detectable probes. In some embodiments, the RCA products corresponding to an overlapping fraction (e.g., one or more of the plurality of analytes) of the first and second fractions are detected using detectable probes. In some embodiments, signals associated with the RCA products corresponding to the overlapping fraction can be compared with smFISH signals corresponding to the overlapping fraction. In some embodiments, signals associated with the RCA products and smFISH signals corresponding to the overlapping fraction can be used to analyze a difference in sensitivity between the smFISH and the RCA readouts.

In some embodiments, the encoding probe or probe set can be a circular probe or circularizable probe or probe set targeting the first target sequence, and the encoding probe or probe set may but does not need to be circularized and/or amplified, e.g., for RCA-based detection of the first target sequence. In some embodiments, the circular probe or circularizable probe or probe set targeting the second target sequence can but does not need to be used as an encoding probe or probe set, e.g., for smFISH detection of the second target sequence. In some embodiments where the encoding probe or probe set is a circular probe or circularizable probe or probe set, the one or more first barcode regions (of the encoding probe or probe set) and the one or more second barcode regions (of the circular probe or circularizable probe or probe set) can be one and the same. In other words, the same barcode region(s) can be used for smFISH detection and/or RCA-based detection. In some embodiments, the smFISH detection and the RCA-based detection are not performed simultaneously, e.g., the smFISH signals can be detected before detecting signals associated with the RCA products. In some embodiments, the smFISH signals are detected using detectable probes that hybridize to sequences in the barcode region(s), whereas the RCA signals are detected using detectable probes that hybridize to the RCA products comprising complements of the same barcode region(s).

II. SAMPLES, ANALYTES, AND TARGET SEQUENCES

A. Samples

A sample disclosed herein can be or derived from any biological sample. Methods and compositions disclosed herein may be used for analyzing a biological sample, which may be obtained from a subject using any of a variety of techniques including, but not limited to, biopsy, surgery, and laser capture microscopy (LCM), and generally includes cells and/or other biological material from the subject. In addition to the subjects described above, a biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample, a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a pre-disposition to a disease, and/or individuals in need of therapy or suspected of needing therapy.

The biological sample can include any number of macromolecules, for example, cellular macromolecules and organelles (e.g., mitochondria and nuclei). The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some embodiments, the biological sample may comprise cells which are deposited on a surface.

Cell-free biological samples can include extracellular polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells. Biological samples can also include fetal cells and immune cells.

Biological samples can include analytes (e.g., protein, RNA, and/or DNA) embedded in a 3D matrix. In some embodiments, amplicons (e.g., rolling circle amplification products) derived from or associated with analytes (e.g., protein, RNA, and/or DNA) can be embedded in a 3D matrix. In some embodiments, a 3D matrix may comprise a network of natural molecules and/or synthetic molecules that are chemically and/or enzymatically linked, e.g., by crosslinking. In some embodiments, a 3D matrix may comprise a synthetic polymer. In some embodiments, a 3D matrix comprises a hydrogel.

In some embodiments, a substrate herein can be any support that is insoluble in aqueous liquid and which allows for positioning of biological samples, analytes, features, and/or reagents (e.g., probes) on the support. In some embodiments, a biological sample can be attached to a substrate. Attachment of the biological sample can be irreversible or reversible, depending upon the nature of the sample and subsequent steps in the analytical method. In certain embodiments, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. Hydrogels are examples of polymers that are suitable for this purpose.

In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay. Except where indicated otherwise, the preparative or processing steps described below can generally be combined in any manner and in any order to appropriately prepare or process a particular sample for and/or analysis.

(i) Tissue Sectioning

A biological sample can be harvested from a subject (e.g., via surgical biopsy, whole subject sectioning) or grown in vitro on a growth substrate or culture dish as a population of cells, and prepared for analysis as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some embodiments, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 µm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 µm. Thicker sections can also be used if desired or convenient, e.g., at least 70, 80, 90, or 100 µm or more. Typically, the thickness of a tissue section is between 1-100 µm, 1-50 µm, 1-30 µm, 1-25 µm, 1-20 µm, 1-15 µm, 1-10 µm, 2-8 µm, 3-7 µm, or 4-6 µm, but as mentioned above, sections with thicknesses larger or smaller than these ranges can also be analyzed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analyzed successively to obtain three-dimensional information about the biological sample.

(ii) Freezing

In some embodiments, the biological sample (e.g., a tissue section as described above) can be prepared by deep freezing at a temperature suitable to maintain or preserve the integrity (e.g., the physical characteristics) of the tissue structure. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than −15° C., less than −20° C., or less than −25° C.

(iii) Fixation and Postfixation

In some embodiments, the biological sample can be prepared using formalin-fixation and paraffin-embedding (FFPE), which are established methods. In some embodiments, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some embodiments, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some embodiments, the methods provided herein comprises one or more post-fixing (also referred to as postfixation) steps. In some embodiments, one or more post-fixing step is performed after contacting a sample with a polynucleotide disclosed herein, e.g., one or more probes such as a circular or padlock probe. In some embodiments, one or more post-fixing step is performed after a hybridization complex comprising a probe and a target is formed in a sample. In some embodiments, one or more post-fixing step is performed prior to a ligation reaction disclosed herein, such as the ligation to circularize a padlock probe.

In some embodiments, one or more post-fixing step is performed after contacting a sample with a binding or labelling agent (e.g., an antibody or antigen binding fragment thereof) for a non-nucleic acid analyte such as a protein analyte. The labelling agent can comprise a nucleic acid molecule (e.g., reporter oligonucleotide) comprising a sequence corresponding to the labelling agent and therefore corresponds to (e.g., uniquely identifies) the analyte. In some embodiments, the labelling agent can comprise a reporter oligonucleotide comprising one or more barcode sequences.

A post-fixing step may be performed using any suitable fixation reagent disclosed herein, for example, 3% (w/v) paraformaldehyde in DEPC-PBS.

(iv) Embedding

As an alternative to paraffin embedding described above, a biological sample can be embedded in any of a variety of other embedding materials to provide structural substrate to the sample prior to sectioning and other handling steps. In some cases, the embedding material can be removed e.g., prior to analysis of tissue sections obtained from the sample. Suitable embedding materials include, but are not limited to, waxes, resins (e.g., methacrylate resins), epoxies, and agar.

In some embodiments, the biological sample can be embedded in a matrix (e.g., a hydrogel matrix). Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some embodiments, the hydrogel is formed such that the hydrogel is internalized within the biological sample.

In some embodiments, the biological sample is immobilized in the hydrogel via cross-linking of the polymer material that forms the hydrogel. Cross-linking can be performed chemically and/or photochemically, or alternatively by any other hydrogel-formation method known in the art.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample consists of cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 μm to about 2 mm.

Additional methods and aspects of hydrogel embedding of biological samples are described for example in Chen et al., *Science* 347 (6221): 543-548, 2015, the entire contents of which are incorporated herein by reference.

(v) Staining and Immunohistochemistry (IHC)

To facilitate visualization, biological samples can be stained using a wide variety of stains and staining techniques. In some embodiments, for example, a sample can be stained using any number of stains and/or immunohistochemical reagents. One or more staining steps may be performed to prepare or process a biological sample for an assay described herein or may be performed during and/or after an assay. In some embodiments, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some embodiments, cells in the sample can be segmented using one or more images taken of the stained sample.

In some embodiments, the stain is performed using a lipophilic dye. In some examples, the staining is performed with a lipophilic carbocyanine or aminostyryl dye, or analogs thereof (e.g, DiI, DiO, DiR, DiD). Other cell membrane stains may include FM and RH dyes or immunohistochemical reagents specific for cell membrane proteins. In some examples, the stain may include but is not limited to, acridine orange, acid fuchsin, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine, or derivatives thereof. In some embodiments, the sample may be stained with haematoxylin and eosin (H&E).

The sample can be stained using hematoxylin and eosin (H&E) staining techniques, using Papanicolaou staining techniques, Masson's trichrome staining techniques, silver staining techniques, Sudan staining techniques, and/or using Periodic Acid Schiff (PAS) staining techniques. PAS staining is typically performed after formalin or acetone fixation. In some embodiments, the sample can be stained using Romanowsky stain, including Wright's stain, Jenner's stain, Can-Grunwald stain, Leishman stain, and Giemsa stain.

In some embodiments, biological samples can be destained. Methods of destaining or discoloring a biological sample are known in the art, and generally depend on the nature of the stain(s) applied to the sample. For example, in some embodiments, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., J. Histochem. Cytochem. 2017; 65 (8): 431-444, Lin et al., Nat Commun. 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

(vi) Isometric Expansion

In some embodiments, a biological sample embedded in a matrix (e.g., a hydrogel) can be isometrically expanded. Isometric expansion methods that can be used include hydration, a preparative step in expansion microscopy, as described in Chen et al., *Science* 347 (6221): 543-548, 2015.

Isometric expansion can be performed by anchoring one or more components of a biological sample to a gel, followed by gel formation, proteolysis, and swelling. In some embodiments, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some embodiments, the isometrically expanded biological sample can be removed from the substrate prior to contacting the substrate with probes disclosed herein.

In general, the steps used to perform isometric expansion of the biological sample can depend on the characteristics of the sample (e.g., thickness of tissue section, fixation, cross-linking), and/or the analyte of interest (e.g., different conditions to anchor RNA, DNA, and protein to a gel).

In some embodiments, proteins in the biological sample are anchored to a swellable gel such as a polyelectrolyte gel. An antibody can be directed to the protein before, after, or in conjunction with being anchored to the swellable gel. DNA and/or RNA in a biological sample can also be anchored to the swellable gel via a suitable linker. Examples of such linkers include, but are not limited to, 6-((Acryloyl)amino) hexanoic acid (Acryloyl-X SE) (available from ThermoFisher, Waltham, MA), Label-IT Amine (available from MirusBio, Madison, WI) and Label X (described for example in Chen et al., Nat. Methods 13:679-684, 2016, the entire contents of which are incorporated herein by reference).

Isometric expansion of the sample can increase the spatial resolution of the subsequent analysis of the sample. The increased resolution in spatial profiling can be determined by comparison of an isometrically expanded sample with a sample that has not been isometrically expanded.

In some embodiments, a biological sample is isometrically expanded to a size at least 2×, 2.1×, 2.2×, 2.3×, 2.4×, 2.5×, 2.6×, 2.7×, 2.8×, 2.9×, 3×, 3.1×, 3.2×, 3.3×, 3.4×, 3.5×, 3.6×, 3.7×, 3.8×, 3.9×, 4×, 4.1×, 4.2×, 4.3×, 4.4×, 4.5×, 4.6×, 4.7×, 4.8×, or 4.9× its non-expanded size. In some embodiments, the sample is isometrically expanded to at least 2× and less than 20× of its non-expanded size.

(vii) Crosslinking and De-Crosslinking

In some embodiments, the biological sample is reversibly cross-linked prior to or during an in situ assay. In some aspects, the analytes, polynucleotides and/or amplification product (e.g., amplicon) of an analyte or a probe bound thereto can be anchored to a polymer matrix. For example, the polymer matrix can be a hydrogel. In some embodiments, one or more of the polynucleotide probe(s) and/or amplification product (e.g., amplicon) thereof can be modified to contain functional groups that can be used as an anchoring site to attach the polynucleotide probes and/or amplification product to a polymer matrix. In some embodiments, a modified probe comprising oligo dT may be used to bind to mRNA molecules of interest, followed by reversible crosslinking of the mRNA molecules.

In some embodiments, the biological sample is immobilized in a hydrogel via cross-linking of the polymer material that forms the hydrogel. Cross-linking can be performed chemically and/or photochemically, or alternatively by any other hydrogel-formation method known in the art. A hydrogel may include a macromolecular polymer gel including a network. Within the network, some polymer chains can optionally be cross-linked, although cross-linking does not always occur.

In some embodiments, a hydrogel can include hydrogel subunits, such as, but not limited to, acrylamide, bis-acrylamide, polyacrylamide and derivatives thereof, poly(ethylene glycol) and derivatives thereof (e.g. PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

In some embodiments, a hydrogel includes a hybrid material, e.g., the hydrogel material includes elements of both synthetic and natural polymers. Examples of suitable hydrogels are described, for example, in U.S. Pat. Nos. 6,391,937, 9,512,422, and 9,889,422, and in U.S. Patent Application Publication Nos. 2017/0253918, 2018/0052081 and 2010/0055733, the entire contents of each of which are incorporated herein by reference.

In some embodiments, the hydrogel can form the substrate. In some embodiments, the substrate includes a hydrogel and one or more second materials. In some embodiments, the hydrogel is placed on top of one or more second materials. For example, the hydrogel can be pre-formed and then placed on top of, underneath, or in any other configuration with one or more second materials. In some embodiments, hydrogel formation occurs after contacting one or more second materials during formation of the substrate. Hydrogel formation can also occur within a structure (e.g., wells, ridges, projections, and/or markings) located on a substrate.

In some embodiments, hydrogel formation on a substrate occurs before, contemporaneously with, or after probes are provided to the sample. For example, hydrogel formation can be performed on the substrate already containing the probes.

In some embodiments, hydrogel formation occurs within a biological sample. In some embodiments, a biological sample (e.g., tissue section) is embedded in a hydrogel. In some embodiments, hydrogel subunits are infused into the biological sample, and polymerization of the hydrogel is initiated by an external or internal stimulus.

In embodiments in which a hydrogel is formed within a biological sample, functionalization chemistry can be used. In some embodiments, functionalization chemistry includes hydrogel-tissue chemistry (HTC). Any hydrogel-tissue backbone (e.g., synthetic or native) suitable for HTC can be used for anchoring biological macromolecules and modulating functionalization. Non-limiting examples of methods using HTC backbone variants include CLARITY, PACT, ExM, SWITCH and ePACT. In some embodiments, hydrogel formation within a biological sample is permanent. For example, biological macromolecules can permanently adhere to the hydrogel allowing multiple rounds of interrogation. In some embodiments, hydrogel formation within a biological sample is reversible.

In some embodiments, additional reagents are added to the hydrogel subunits before, contemporaneously with, and/or after polymerization. For example, additional reagents can include but are not limited to oligonucleotides (e.g., probes), endonucleases to fragment DNA, fragmentation buffer for DNA, DNA polymerase enzymes, dNTPs used to amplify the nucleic acid and to attach the barcode to the amplified fragments. Other enzymes can be used, including without limitation, RNA polymerase, ligase, proteinase K, and DNAse. Additional reagents can also include reverse transcriptase enzymes, including enzymes with terminal transferase activity, primers, and switch oligonucleotides. In some embodiments, optical labels are added to the hydrogel subunits before, contemporaneously with, and/or after polymerization.

In some embodiments, HTC reagents are added to the hydrogel before, contemporaneously with, and/or after polymerization. In some embodiments, a cell labelling agent is added to the hydrogel before, contemporaneously with, and/or after polymerization. In some embodiments, a cell-penetrating agent is added to the hydrogel before, contemporaneously with, and/or after polymerization.

Hydrogels embedded within biological samples can be cleared using any suitable method. For example, electrophoretic tissue clearing methods can be used to remove biological macromolecules from the hydrogel-embedded sample. In some embodiments, a hydrogel-embedded sample is stored before or after clearing of hydrogel, in a medium (e.g., a mounting medium, methylcellulose, or other semi-solid mediums).

In some embodiments, a method disclosed herein comprises de-crosslinking the reversibly cross-linked biological sample. The de-crosslinking does not need to be complete. In some embodiments, only a portion of crosslinked molecules in the reversibly cross-linked biological sample are de-crosslinked and allowed to migrate.

(viii) Tissue Permeabilization and Treatment

In some embodiments, a biological sample can be permeabilized to facilitate transfer of species (such as probes) into the sample. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases). In some embodiments, the biological sample can be incubated with a cellular permeabilizing agent to facilitate permeabilization of the sample. Additional methods for sample permeabilization are described, for example, in Jamur et al., Method Mol. Biol. 588:63-66, 2010, the entire contents of which are incorporated herein by reference. Any suitable method for sample permeabilization can generally be used in connection with the samples described herein.

In some embodiments, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some embodiments, the biological sample can be permeabilized by non-chemical permeabilization methods. Non-chemical permeabilization methods are known in the art. For example, non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some embodiments, DNase and RNase inactivating agents or inhibitors such as proteinase K, and/or chelating agents such as EDTA, can be added to the sample. For example, a method disclosed herein may comprise a step for increasing accessibility of a nucleic acid for binding, e.g., a denaturation step to open up DNA in a cell for hybridization by a probe. For example, proteinase K treatment may be used to free up DNA with proteins bound thereto.

(ix) Selective Enrichment of RNA Species

In some embodiments, where RNA is the analyte, one or more RNA analyte species of interest can be selectively enriched. For example, one or more species of RNA of interest can be selected by addition of one or more oligonucleotides to the sample. In some embodiments, the additional oligonucleotide is a sequence used for priming a reaction by an enzyme (e.g., a polymerase). For example, one or more primer sequences with sequence complementarity to one or more RNAs of interest can be used to amplify the one or more RNAs of interest, thereby selectively enriching these RNAs.

In some aspects, when two or more analytes are analyzed, a first and second probe that is specific for (e.g., specifically hybridizes to) each RNA or cDNA analyte are used. For example, in some embodiments of the methods provided herein, templated ligation is used to detect gene expression in a biological sample. An analyte of interest (such as a protein), bound by a labelling agent or binding agent (e.g., an antibody or epitope binding fragment thereof), wherein the binding agent is conjugated or otherwise associated with a reporter oligonucleotide comprising a reporter sequence that identifies the binding agent, can be targeted for analysis. Probes may be hybridized to the reporter oligonucleotide and ligated in a templated ligation reaction to generate a product for analysis. In some embodiments, gaps between the probe oligonucleotides may first be filled prior to ligation, using, for example, Mu polymerase, DNA polymerase, RNA polymerase, reverse transcriptase, VENT polymerase, Taq polymerase, and/or any combinations, derivatives, and variants (e.g., engineered mutants) thereof. In some embodiments, the assay can further include amplification of templated ligation products (e.g., by multiplex PCR).

Alternatively, one or more species of RNA can be downselected (e.g., removed) using any of a variety of methods. For example, probes can be administered to a sample that selectively hybridize to ribosomal RNA (rRNA), thereby reducing the pool and concentration of rRNA in the sample. Additionally and alternatively, duplex-specific nuclease (DSN) treatment can remove rRNA (see, e.g., Archer, et al, Selective and flexible depletion of problematic sequences from RNA-seq libraries at the cDNA stage, *BMC Genomics*, 15 401, (2014), the entire contents of which are incorporated herein by reference). Furthermore, hydroxyapatite chromatography can remove abundant species (e.g., rRNA) (see, e.g., Vandernoot, V. A., cDNA normalization by hydroxyapatite chromatography to enrich transcriptome diversity in RNA-seq applications, Biotechniques, 53 (6) 373-80, (2012), the entire contents of which are incorporated herein by reference).

A biological sample may comprise one or a plurality of analytes of interest. Methods for performing multiplexed assays to analyze two or more different analytes in a single biological sample are provided.

B. Analytes

The methods and compositions disclosed herein can be used to detect and analyze a wide variety of different analytes. In some aspects, an analyte can include any biological substance, structure, moiety, or component to be analyzed. In some aspects, a target disclosed herein may similarly include any analyte of interest. In some examples, a target or analyte can be directly or indirectly detected. In some aspects, the analytes include one of more target nucleic acids. In some embodiments, an analyte can comprise a nucleic acid which hybridizes to a circular probe disclosed herein. In some embodiments, an analyte can comprise an RNA molecule which hybridizes to a circular probe disclosed herein. In some embodiments, an analyte can bind to a labelling agent comprising a nucleic acid which hybridizes to a circular probe disclosed herein. In some embodiments, an analyte can bind to a labelling agent comprising an RNA molecule which hybridizes to a circular probe disclosed herein.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for analyte detection) to the analytes in the cell or cell compartment or organelle.

The analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g. an affinity binding partner) can be developed. Such a specific binding partner may be a nucleic acid probe (for a nucleic acid analyte) and may lead directly to the generation of a RCA template (e.g. a padlock or other circularizable probe). Alternatively, the specific binding partner may be coupled to a nucleic acid, which may be detected using an RCA strategy, e.g. in an assay which uses or generates a circular nucleic acid molecule which can be the RCA template.

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof, or a lipid or carbohydrate molecule, or any molecule which comprise a lipid or carbohydrate component. The analyte may be a single molecule or a complex that contains two or more molecular subunits, e.g. including but not limited to protein-DNA complexes, which may or may not be covalently bound to one another, and which may be the same or different. Thus in addition to cells or microorganisms, such a complex analyte may also be a protein complex or protein interaction. Such a complex or interaction may thus be a homo- or hetero-multimer. Aggregates of molecules, e.g. proteins may also be target analytes, for example aggregates of the same protein or different proteins. The analyte may also be a complex between proteins or peptides and nucleic acid molecules such as DNA or RNA, e.g. interactions between proteins and nucleic acids, e.g. regulatory factors, such as transcription factors, and DNA or RNA.

(i) Endogenous Analytes

In some embodiments, an analyte herein is endogenous to a biological sample and can include nucleic acid analytes and non-nucleic acid analytes. Methods and compositions disclosed herein can be used to analyze nucleic acid analytes (e.g., using a nucleic acid probe or probe set that directly or indirectly hybridizes to a nucleic acid analyte) and/or non-nucleic acid analytes (e.g., using a labelling agent that comprises a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some embodiments, the analyte is inside a cell or on a cell surface, such as a transmembrane analyte or one that is attached to the cell membrane. In some embodiments, the analyte can be an organelle (e.g., nuclei or mitochondria). In some embodiments, the analyte is an extracellular analyte, such as a secreted analyte. Exemplary analytes include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR. The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In some embodiments described herein, an analyte may be a denatured nucleic acid, wherein the resulting denatured nucleic acid is single-stranded. The nucleic acid may be denatured, for example, optionally using formamide, heat, or both formamide and heat. In some embodiments, the nucleic acid is not denatured for use in a method disclosed herein.

In certain embodiments, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any embodiment described herein, the analyte comprises a target sequence. In some embodiments, the target sequence may be endogenous to the sample, generated in the sample, added to the sample, or associated with an analyte in the sample. In some embodiments, the target sequence is a single-stranded target sequence (e.g., a sequence in a rolling circle amplification product). In some embodiments, the analytes comprise one or more single-stranded target sequences. In one aspect, a first single-stranded target sequence is not identical to a second single-stranded target sequence. In another aspect, a first single-stranded target sequence is identical to one or more second single-stranded target sequence. In some embodiments, the one or more second single-stranded target sequence is comprised in the same analyte (e.g., nucleic acid) as the first single-stranded target sequence. Alternatively, the one or more second single-stranded target sequence is comprised in a different analyte (e.g., nucleic acid) from the first single-stranded target sequence.

(ii) Labelling Agents

In some embodiments, provided herein are methods and compositions for analyzing endogenous analytes (e.g., RNA, ssDNA, and cell surface or intracellular proteins and/or metabolites) in a sample using one or more labelling agents. In some embodiments, an analyte labelling agent may include an agent that interacts with an analyte (e.g., an endogenous analyte in a sample). In some embodiments, the labelling agents can comprise a reporter oligonucleotide that is indicative of the analyte or portion thereof interacting with the labelling agent. For example, the reporter oligonucleotide may comprise a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some embodiments, the analyte labelling agent comprises an analyte binding moiety and a labelling agent barcode domain comprising one or more barcode sequences, e.g., a barcode sequence that corresponds to the analyte binding moiety and/or the analyte. An analyte binding moiety barcode includes to a barcode that is associated with or otherwise identifies the analyte binding moiety. In some embodiments, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some embodiments, the method comprises one or more post-fixing (also referred to as post-fixation) steps after contacting the sample with one or more labelling agents.

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some embodiments, an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some embodiments, an analyte binding moiety includes one or more antibodies or antigen binding fragments thereof. The antibodies or antigen binding fragments including the analyte binding moiety can specifically bind to a target analyte. In some embodiments, the analyte is a protein (e.g., a protein on a surface of the biological sample (e.g., a cell) or an intracellular protein). In some embodiments, a plurality of analyte labelling agents comprising a plurality of analyte binding moieties bind a plurality of analytes present in a biological sample. In some embodiments, the plurality of analytes includes a single species of analyte (e.g., a single species of polypeptide). In some embodiments in which the plurality of analytes includes a single species of analyte, the analyte binding moieties of the plurality of analyte labelling agents are the same. In some embodiments in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some embodiments, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being readily detected, e.g., using sequencing or array technologies.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31 (2): 708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry may be used to couple reporter oligonucleotides to labelling agents. Commercially available kits, such as those from Thunderlink and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some embodiments, the reporter oligonucleotides are releasable from the labelling agent, such as upon application of a stimulus. For example, the reporter oligonucleotide may be attached to the labeling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing, such as an adapter sequence, a unique molecular identifier (UMI) sequence, a sequencer specific flow cell attachment sequence (such as an P5, P7, or partial P5 or P7 sequence), a primer or primer binding sequence, a sequencing primer or primer binding sequence (such as an R1, R2, or partial R1 or R2 sequence).

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some embodiments, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (i.e., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

(iii) Target Sequences

In some embodiments, provided herein are methods and compositions for analyzing one or more analytes, products of an endogenous analyte and/or a labelling agent in a biological sample. In some embodiments, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product such as a rolling circle amplification (RCA) product) thereof is analyzed. In some embodiments, a labelling agent that directly or indirectly binds to an analyte in the biological sample is analyzed. In some embodiments, a product (e.g., a hybridization product, a ligation product, an extension product (e.g., by a DNA or RNA polymerase), a replication product, a transcription/reverse transcription product, and/or an amplification product such as a rolling circle amplification (RCA) product) of a labelling agent that directly or indirectly binds to an analyte in the biological sample is analyzed.

A target sequence for a probe disclosed herein may be comprised in any analyte disclose herein, including an endogenous analyte (e.g., a viral or cellular nucleic acid), a labelling agent, or a product of an endogenous analyte and/or a labelling agent. In some embodiments, a target sequence for a probe disclosed herein comprises one or more ribonucleotides.

In some aspects, one or more of the target sequences includes one or more barcode(s), e.g., at least two, three, four, five, six, seven, eight, nine, ten, or more barcodes. Barcodes can spatially-resolve molecular components found in biological samples, for example, within a cell or a tissue sample. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI"). In some aspects, a barcode comprises about 4, 5, 6, 7, 8, 9, 10, 11, 12, 13, 14, 15, 16, 17, 18, 19, 20, 21, 22, 23, 24, 25, 26, 27, 28, 29, 30, or more than 30 nucleotides.

In some instances, a barcode may be a barcode region. In some embodiments, a barcode comprises two or more sub-barcodes that together function as a single barcode. For example, a polynucleotide barcode can include two or more polynucleotide sequences (e.g., sub-barcodes) that are separated by one or more non-barcode sequences. In some embodiments, the one or more barcode(s) can also provide a platform for targeting functionalities, such as oligonucleotides, oligonucleotide-antibody conjugates, oligonucleotide-streptavidin conjugates, modified oligonucleotides, affinity purification, detectable moieties, enzymes, enzymes for detection assays or other functionalities, and/or for detection and identification of the polynucleotide.

In some embodiments, barcodes or complements thereof (e.g., barcode sequences or complements thereof comprised by the probes disclosed herein or products thereof) can be analyzed (e.g., detected or sequenced) using any suitable method or technique, including those described herein, such as sequencing by synthesis (SBS), sequencing by ligation (SBL), or sequencing by hybridization (SBH). In some instances, barcoding schemes and/or barcode detection schemes as described in RNA sequential probing of targets (RNA SPOTs), single-molecule fluorescent in situ hybridization (smFISH), multiplexed error-robust fluorescence in situ hybridization (MERFISH) or sequential fluorescence in situ hybridization (seqFISH+) can be used. In any of the preceding implementations, the methods provided herein can include analyzing the barcodes by sequential hybridization and detection with a plurality of labelled probes (e.g., detection probes (e.g., detection oligos) or barcode probes). In some instances, the barcode detection steps can be performed as described in hybridization-based in situ sequencing (HybISS). In some instances, probes can be detected and analyzed (e.g., detected or sequenced) as performed in fluorescent in situ sequencing (FISSEQ), or as performed in the detection steps of the spatially-resolved transcript amplicon readout mapping (STARmap) method. In some instances, signals associated with an analyte can be detected as performed in sequential fluorescent in situ hybridization (seqFISH).

In some embodiments, in a barcode sequencing method, barcode sequences are detected for identification of other molecules including nucleic acid molecules (DNA or RNA) longer than the barcode sequences themselves, as opposed to direct sequencing of the longer nucleic acid molecules. In some embodiments, a N-mer barcode sequence comprises $4^N$ complexity given a sequencing read of N bases, and a much shorter sequencing read may be required for molecular identification compared to non-barcode sequencing methods such as direct sequencing. For example, 1024 molecular species may be identified using a 5-nucleotide barcode sequence (4⁵=1024), whereas 8 nucleotide barcodes can be used to identify up to 65,536 molecular species, a number greater than the total number of distinct genes in the human genome. In some embodiments, the barcode sequences contained in the probes or RCA products are detected, rather than endogenous sequences, which can be an efficient readout in terms of information per cycle of sequencing. Because the barcode sequences are pre-determined, they can also be designed to feature error detection and correction mechanisms, see, e.g., U.S. Pat. Pub. 20190055594 and U.S. Pat. Pub. 20210164039, which are hereby incorporated by reference in their entirety.

III. NUCLEIC ACID PROBES

Disclosed herein in some aspects are nucleic acid probes and/or probe sets that are introduced into a cell or used to otherwise contact a biological sample such as a tissue sample. The probes (e.g., the primary probes, e.g., encoding probes or circular or circularizable probes, disclosed herein and/or any detectable probe disclosed herein, e.g., for FISH and/or RCA-based detection) may comprise any of a variety of entities that can hybridize to a nucleic acid, typically by Watson-Crick base pairing, such as DNA, RNA, LNA, PNA, etc. The nucleic acid probe may comprise a targeting sequence that is able to directly or indirectly bind to at least a portion of a target nucleic acid. The nucleic acid probe may be able to bind to a specific target nucleic acid (e.g., an mRNA, or other nucleic acids disclosed herein). In some embodiments, the nucleic acid probes may be detected using a detectable label, and/or by using secondary nucleic acid probes able to bind to the nucleic acid probes. In some embodiments, the nucleic acid probes (e.g., primary probes and/or secondary probes) are compatible with one or more biological and/or chemical reactions. For instance, a nucleic acid probe disclosed herein can serve as a template or primer for a polymerase, a template or substrate for a ligase, a substrate for a click chemistry reaction, and/or a substrate for a nuclease (e.g., endonuclease or exonuclease for cleavage or digestion).

In some embodiments, more than one type of primary nucleic acid probes may be contacted with a sample, e.g., simultaneously or sequentially in any suitable order, such as in sequential probe hybridization/unhybridization cycles. In some embodiments, more than one type of secondary nucleic acid probes may be contacted with a sample, e.g., simultaneously or sequentially in any suitable order, such as in sequential probe hybridization/unhybridization cycles. In some embodiments, the secondary probes may comprise probes that bind to a product of a primary probe targeting an analyte. In some embodiments, more than one type of higher order nucleic acid probes may be contacted with a sample, e.g., simultaneously or sequentially in any suitable order, such as in sequential probe hybridization/unhybridization cycles. In some embodiments, more than one type of detectably labeled nucleic acid probes (e.g., one or more first detectable probes for smFISH readout and/or one or more second detectable probes for RCA readout) may be contacted with a sample, e.g., simultaneously or sequentially in any suitable order, such as in sequential probe hybridization/unhybridization cycles. In some embodiments, the detectably labeled nucleic acid probes can be used for both smFISH readout and for RCA readout. In some embodiments, the detectably labeled probes (e.g., one or more first detectable probes for smFISH readout and/or one or more second detectable probes for RCA readout) may comprise probes that bind to one or more primary probes, one or more secondary probes, one or more higher order probes, one or more intermediate probes between a primary/secondary/higher order probes, and/or one or more detectably or non-detectably labeled probes (e.g., as in the case of a hybridization chain reaction (HCR), a branched DNA reaction (bDNA), or the like). In some embodiments, at least 2, at least 5, at least 10, at least 25, at least 50, at least 75, at least 100, at least 300, at least 1,000, at least 3,000, at least 10,000, at least 30,000, at least 50,000, at least 100,000, at least 250,000, at least 500,000, or at least 1,000,000 distinguishable nucleic acid probes (e.g., primary, secondary, higher order probes, and/or detectably labeled probes) can be contacted with a sample, e.g., simultaneously or sequentially in any suitable order. Between any of the probe contacting steps disclosed herein, the method may comprise one or more intervening reactions and/or processing steps, such as modifications of a target nucleic acid, modifications of a probe or product thereof (e.g., via hybridization, ligation, extension, amplification, cleavage, digestion, branch migration, primer exchange reaction, click chemistry reaction, crosslinking, attachment of a detectable label, activating photo-reactive moieties, etc.), removal of a probe or product thereof (e.g., cleaving off a portion of a probe and/or unhybridizing the entire probe), signal modifications (e.g., quenching, masking, photo-bleaching, signal enhancement (e.g., via FRET), signal amplification, etc.), signal removal (e.g., cleaving off or permanently inactivating a detectable label), crosslinking, de-crosslinking, and/or signal detection.

The target-binding sequence (sometimes also referred to as the targeting region/sequence or the recognition region/sequence) of a probe may be positioned anywhere within the probe. For instance, the target-binding sequence of a primary probe that binds to a target nucleic acid can be 5' or 3' to any barcode sequence in the primary probe. Likewise, the target-binding sequence of a secondary probe (which binds to a primary probe or complement or product thereof) can be 5' or 3' to any barcode sequence in the secondary probe. In some embodiments, the target-binding sequence may comprise a sequence that is substantially complementary to a portion of a target nucleic acid. In some embodiments, the portions may be at least 50%, at least 60%, at least 70%, at least 75%, at least 80%, at least 85%, at least 90%, at least 92%, at least 94%, at least 95%, at least 96%, at least 97%, at least 98%, at least 99%, or 100% complementary.

The target-binding sequence of a primary nucleic acid probe may be determined with reference to a target nucleic acid (e.g., a cellular RNA or a reporter oligonucleotide of a labelling agent for a cellular analyte) that is present or suspected of being present in a sample. In some embodiments, more than one target-binding sequence can be used to identify a particular analyte comprising or associated with a target nucleic acid. The more than one target-binding sequence can be in the same probe or in different probes. For instance, multiple probes can be used, sequentially and/or simultaneously, that can bind to (e.g., hybridize to) different regions of the same target nucleic acid. In other examples, a probe may comprise target-binding sequences that can bind to different target nucleic acid sequences, e.g., various intron and/or exon sequences of the same gene (for detecting splice variants, for example), or sequences of different genes, e.g., for detecting a product that comprises the different target nucleic acid sequences, such as a genome rearrangement (e.g., inversion, transposition, translocation, insertion, deletion, duplication, and/or amplification).

After contacting the nucleic acid probes with a sample, the probes may be directly detected by determining detectable labels (if present), and/or detected by using one or more other probes that bind directly or indirectly to the probes or products thereof. The one or more other probes may comprise a detectable label. For instance, a primary nucleic acid probe can bind to a target nucleic acid in the sample, and a secondary nucleic acid probe can be introduced to bind to the primary nucleic acid probe, where the secondary nucleic acid probe or a product thereof can then be detected using detectable probes (e.g., detectably labeled probes). Higher order probes that directly or indirectly bind to the secondary nucleic acid probe or product thereof may also be used, and the higher order probes or products thereof can then be detected using detectably labeled probes.

In some instances, a secondary nucleic acid probe binds to a primary nucleic acid probe directly hybridized to the target nucleic acid. A secondary nucleic acid probe (e.g., a first detectable probe or a second detectable probe disclosed herein) may contain a recognition sequence able to bind to or hybridize with a primary nucleic acid probe (e.g., an encoding probe for multiplex FISH or a circular probe or circularizable probe disclosed herein) or a product thereof (e.g., an RCA product), e.g., at a barcode sequence or portion(s) thereof of the primary nucleic acid probe or product thereof. In some embodiments, a secondary nucleic acid probe may bind to a combination of barcode sequences (which may be continuous or spaced from one another) in a primary nucleic acid probe, a product thereof, or a combination of primary nucleic acid probes. In some embodiments, the binding is specific, or the binding may be such that a recognition sequence preferentially binds to or hybridizes with only one of the barcode sequences or complements thereof that are present. The secondary nucleic acid probe may also contain one or more detectable labels. If more than one secondary nucleic acid probe is used, the detectable labels may be the same or different.

The recognition sequences may be of any length, and multiple recognition sequences in the same or different secondary nucleic acid probes may be of the same or different lengths. If more than one recognition sequence is used, the recognition sequences may independently have the same or different lengths. For instance, the recognition sequence may be at least 4, at least 5, least 6, least 7, least 8, least 9, at least 10, least 11, least 12, least 13, least 14, at least 15, least 16, least 17, least 18, least 19, at least 20, at least 25, at least 30, at least 35, at least 40, or at least 50 nucleotides in length. In some embodiments, the recognition sequence may be no more than 48, no more than 40, no more than 32, no more than 24, no more than 16, no more than 12, no more than 10, no more than 8, or no more than 6 nucleotides in length. Combinations of any of these are also possible, e.g., the recognition sequence may have a length of between 5 and 8, between 6 and 12, or between 7 and 15 nucleotides, etc. In some embodiments, the recognition sequence is of the same length as a barcode sequence or complement thereof of a primary nucleic acid probe or a product thereof. In some embodiments, the recognition sequence may be at least 50%, at least 60%, at least 70%, at least 75%, at least 80%, at least 85%, at least 90%, at least 92%, at least 94%, at least 95%, at least 96%, at least 97%, at least 98%, at least 99%, or at least 100% complementary to the barcode sequence or complement thereof.

In some embodiments, a nucleic acid probe, such as a primary or a secondary nucleic acid probe, may also comprise 1, 2, 3, 4, 5, 6, 7, 8, 9, 10, 11, 12, 13, 14, 15 or more, 20 or more, 32 or more, 40 or more, or 50 or more barcode sequences. As an illustrative example, a first probe may contain a first target-binding sequence, a first barcode sequence, and a second barcode sequence, while a second, different probe may contain a second target-binding sequence (that is different from the first target-binding sequence in the first probe), the same first barcode sequence as in the first probe, but a third barcode sequence instead of the second barcode sequence. Such probes may thereby be distinguished by determining the various barcode sequence combinations present or associated with a given probe at a given location in a sample.

In some embodiments, the nucleic acid probes disclosed herein may be made using only 2 or only 3 of the 4 bases, such as leaving out all the "G"s and/or leaving out all of the "C"'s within the probe. Sequences lacking either "G"s or "C"'s may form very little secondary structure, and can contribute to more uniform, faster hybridization in certain embodiments.

In some embodiments, a nucleic acid probe disclosed herein may contain a detectable label such as a fluorophore. In some embodiments, one or more probes of a plurality of nucleic acid probes used in an assay may lack a detectable label, while one or more other probes in the plurality each comprises a detectable label selected from a limited pool of distinct detectable labels (e.g., red, green, yellow, and blue fluorophores), and the absence of detectable label may be used as a separate "color." As such, detectable labels are not required in all cases. In some embodiments, a primary nucleic acid probe disclosed herein lacks a detectable label. While a detectable label may be incorporated into an amplification product of a probe, such as via incorporation of a modified nucleotide into an RCA product of a circularized probe, the amplification product itself in some embodiments is not detectably labeled. In some embodiments, a probe that binds to the primary nucleic acid probe or a product thereof (e.g., a secondary nucleic acid probe that binds to a barcode sequence or complement thereof in the primary nucleic acid probe or product thereof) comprises a detectable label and may be used to detect the primary nucleic acid probe or product thereof. In some embodiments, a secondary nucleic acid probe disclosed herein lacks a detectable label, and a detectably labeled probe that binds to the secondary nucleic acid probe or a product thereof (e.g., at a barcode sequence or complement thereof in the secondary nucleic acid probe or product thereof) can be used to detect the second nucleic acid probe or product thereof. In some embodiments, signals associated with the detectably labeled probes (e.g., the first detectable probe which is detectably labelled, the second detectable probe which is detectably labelled, a detectably labeled probe that binds to the first detectable probe which itself is not detectably labelled, or a detectably labeled probe that binds to the second detectable probe which itself is not detectably labelled) can be used to detect one or more barcode sequences in the secondary probe and/or one or more barcode sequences in the primary probe, e.g., by using sequential hybridization of detectably labeled probes, sequencing-by-ligation, and/or sequencing-by-hybridization. In some embodiments, the barcode sequences (e.g., in the secondary probe and/or in the primary probe) are used to combinatorially encode a plurality of analytes of interest. As such, signals associated with the detectably labeled probes at particular locations in a biological sample can be used to generate distinct signal signatures that each corresponds to an analyte in the sample, thereby identifying the analytes at the particular locations, e.g., for in situ spatial analysis of the sample.

In some embodiments, a nucleic acid probe herein comprises one or more other components, such as one or more primer binding sequences (e.g., to allow for enzymatic amplification of probes), enzyme recognition sequences (e.g., for endonuclease cleavage), or the like. The components of the nucleic acid probe may be arranged in any suitable order.

In some aspects, analytes are targeted by primary probes, which are barcoded through the incorporation of one or more barcode sequences (e.g., sequences that can be detected or otherwise "read") that are separate from a sequence in a primary probe that directly or indirectly binds the targeted analyte. In some aspects, the primary probes are in turn targeted by secondary probes, which are also barcoded through the incorporation of one or more barcode sequences that are separate from a recognition sequence in a secondary probe that directly or indirectly binds a primary probe or a product thereof. In some embodiments, a secondary probe may bind to a barcode sequence in the primary probe. In some aspects, tertiary probes and optionally even higher order probes may be used to target the secondary probes, e.g., at a barcode sequence or complement thereof in a secondary probe or product thereof. In some embodiments, the tertiary probes and/or even higher order probes may comprise one or more barcode sequences and/or one or more detectable labels. In some embodiments, a tertiary probe is a detectably labeled probe that hybridizes to a barcode sequence (or complement thereof) of a secondary probe (or product thereof). In some embodiments, through the detection of signals associated with detectably labeled probes in a sample, the location of one or more analytes in the sample and the identity of the analyte(s) can be determined. In some embodiments, the presence/absence, absolute or relative abundance, an amount, a level, a concentration, an activity, and/or a relation with another analyte of a particular analyte can be analyzed in situ in the sample.

In some embodiments, provided herein are probes or probe sets (e.g., encoding probe or probe sets, circularizable probes or probe sets), and assay methods to couple target nucleic acid detection, signal amplification (e.g., through nucleic acid amplification such as RCA, and/or hybridization of a plurality of detectably labeled probes, such as in hybridization chain reactions and the like, e.g., described in Section V), and decoding of the barcodes.

In some aspects, a primary probe, a secondary probe, and/or a higher order probe can be selected from the group consisting of a circular probe, a circularizable probe, and a linear probe. In some embodiments, a circular probe can be one that is pre-circularized prior to hybridization to a target nucleic acid and/or one or more other probes. In some embodiments, a circularizable probe can be one that can be circularized upon hybridization to a target nucleic acid and/or one or more other probes such as a splint. In some embodiments, a linear probe can be one that comprises a target recognition sequence and a sequence that does not hybridize to a target nucleic acid, such as a 5' overhang, a 3' overhang, and/or a linker or spacer (which may comprise a nucleic acid sequence or a non-nucleic acid moiety). In some embodiments, the sequence (e.g., the 5' overhang, 3' overhang, and/or linker or spacer) is non-hybridizing to the target nucleic acid but may hybridize to one another and/or one or more other probes, such as detectably labeled probes.

Specific probe designs can vary depending on the application. For instance, a primary probe, a secondary probe, and/or a higher order probe disclosed herein can comprise a circularizable probe that does not require gap filling to circularize upon hybridization to a template (e.g., a target nucleic acid and/or a probe such as a splint), a gapped circularizable probe (e.g., one that requires gap filling to circularize upon hybridization to a template), an L-shaped probe (e.g., one that comprises a target recognition sequence and a 5' or 3' overhang upon hybridization to a target nucleic acid or a probe), a U-shaped probe (e.g., one that comprises a target recognition sequence, a 5' overhang, and a 3' overhang upon hybridization to a target nucleic acid or a probe), a V-shaped probe (e.g., one that comprises at least two target recognition sequences and a linker or spacer between the target recognition sequences upon hybridization to a target nucleic acid or a probe), a probe or probe set for proximity ligation (such as those described in U.S. Pat. Nos. 7,914,987 and 8,580,504 incorporated herein by reference in their entireties, and probes for Proximity Ligation Assay (PLA) for the simultaneous detection and quantification of nucleic acid molecules and protein-protein interactions), or any suitable combination thereof. In some embodiments, a primary probe, a secondary probe, and/or a higher order probe disclosed herein can comprise a probe that is ligated to itself or another probe using DNA-templated and/or RNA-templated ligation. In some embodiments, a primary probe, a secondary probe, and/or a higher order probe disclosed herein can be a DNA molecule and can comprise one or more other types of nucleotides, modified nucleotides, and/or nucleotide analogues, such as one or more ribonucleotides. In some embodiments, the ligation can be a DNA ligation on a DNA template. In some embodiments, the ligation can be a DNA ligation on an RNA template, and the probes can comprise RNA-templated ligation probes. In some embodiments, a primary probe, a secondary probe, and/or a higher order probe disclosed herein can comprise a padlock-like probe or probe set, such as one described in US 2019/0055594, US 2021/0164039, US 2016/0108458, or US 2020/0224243, each of which is incorporated herein by reference in its entirety. Any suitable combination of the probe designs described herein can be used.

In some embodiments, a primary probe (e.g., an encoding probe or probe set, or a circular probe or circularizable probe or probe set), a secondary probe, and/or a higher order probe disclosed herein can comprise two or more parts. In some cases, a probe can comprise one or more features of and/or be modified based on: a split FISH probe or probe set described in WO 2021/167526A1 or Goh et al., "Highly specific multiplexed RNA imaging in tissues with split-FISH," Nat Methods 17 (7): 689-693 (2020), which are incorporated herein by reference in their entireties; a Z-probe or probe set, such as one described in U.S. Pat. No. 7,709,198 B2, U.S. Pat. No. 8,604,182 B2, U.S. Pat. No. 8,951,726 B2, U.S. Pat. No. 8,658,361 B2, or Tripathi et al., "Z Probe, An Efficient Tool for Characterizing Long Non-Coding RNA in FFPE Tissues," Noncoding RNA 4 (3): 20 (2018), which are incorporated herein by reference in their entireties; an HCR initiator or amplifier, such as one described in U.S. Pat. No. 7,632,641 B2, US 2017/0009278 A1, U.S. Pat. No. 10,450,599 B2, Dirks and Pierce, "Triggered amplification by hybridization chain reaction," PNAS 101 (43): 15275-15278 (2004), Chemeris et al., "Real-time hybridization chain reaction," Dokl. Biochem 419:53-55 (2008), Niu et al., "Fluorescence detection for DNA using hybridization chain reaction with enzyme-amplification," Chem Commun (Camb) 46 (18): 3089-91 (2010), Choi et al., "Programmable in situ amplification for multiplexed imaging of mRNA expression," Nat Biotechnol 28 (11): 1208-12 (2010), Song et al., "Hybridization chain reaction-based aptameric system for the highly selective and sensitive detection of protein," Analyst 137 (6): 1396-401 (2012), Choi et al., "Third-generation in situ hybridization chain reaction: multiplexed, quantitative, sensitive, versatile, robust," Development 145 (12): dev165753 (2018), or Tsuneoka and Funato, "Modified in situ Hybridization Chain Reaction Using Short Hairpin DNAs," Front Mol Neurosci 13:75 (2020), which are incorporated herein by reference in their entireties; a PLAYR probe or probe set, such as one described in US 2016/0108458 A1 or Frei et al., "Highly multiplexed simultaneous detection of RNAs and proteins in single cells," Nat Methods 13 (3): 269-75 (2016), which are incorporated herein by reference in their entireties; a PLISH probe or probe set, such as one described in US 2020/0224243 A1 or Nagendran et al., "Automated cell-type classification in intact tissues by single-cell molecular profiling," eLife 7: e30510 (2018), which are incorporated herein by reference in their entireties; a RollFISH probe or probe set such as one described in Wu et al., "RollFISH achieves robust quantification of single-molecule RNA biomarkers in paraffin-embedded tumor tissue samples," Commun Biol 1, 209 (2018), which is hereby incorporated by reference in its entirety; a MERFISH probe or probe set, such as one described in WO 2020/123742 A1 (PCT/US2019/065857) or Chen et al., "Spatially resolved, highly multiplexed RNA profiling in single cells," Science 348 (6233): aaa6090 (2015), which are incorporated herein by reference in their entireties; or a primer exchange reaction (PER) probe or probe set, such as one described in US 2019/0106733 A1, which is hereby incorporated by reference in its entirety.

In some embodiments, the encoding probe or probe set comprises one or more features and/or is modified to allow for generation and detection of a first signal that does not comprise a nucleic acid amplification step (e.g., the first signal can be an smFISH signal). In some instances, the encoding probe or probe set for smFISH readout for each target comprises probes that directly hybridize to multiple regions (e.g., sequences) of the same transcript. In some embodiments, the circular probe or circularizable probe or probe set comprises one or more features and/or is modified to allow for generation and detection of a second signal that comprises an amplification step (e.g., extension and/or amplification catalyzed by a polymerase).

Any suitable circularizable probe or probe set may be used to generate the RCA template which is used to generate the RCA product. By "circularizable" is meant that the probe or reporter (the RCA template) is in the form of a linear molecule having ligatable ends which may circularized by ligating the ends together directly or indirectly, e.g. to each other, or to the respective ends of an intervening ("gap") oligonucleotide or to an extended 3' end of the circularizable RCA template. A circularizable template may also be provided in two or more parts, namely two or more molecules (e.g. oligonucleotides) which may be ligated together to form a circle. When said RCA template is circularizable it is circularized by ligation prior to RCA. Ligation may be templated using a ligation template. The circularizable RCA template (or template part or portion) may comprise at its respective 3' and 5' ends regions of complementarity to corresponding cognate complementary regions (or binding sites) in the ligation template, which may be adjacent where the ends are directly ligated to each other, or non-adjacent, with an intervening "gap" sequence, where indirect ligation is to take place.

In some embodiments, a nucleic acid probe disclosed herein can be pre-assembled from multiple components, e.g., prior to contacting the nucleic acid probe with a target nucleic acid or a sample. In some embodiments, a nucleic acid probe disclosed herein can be assembled during and/or after contacting a target nucleic acid or a sample with multiple components. In some embodiments, a nucleic acid probe disclosed herein is assembled in situ in a sample. In some embodiments, the multiple components can be contacted with a target nucleic acid or a sample in any suitable order and any suitable combination. For instance, a first component and a second component can be contacted with a target nucleic acid, to allow binding between the components and/or binding between the first and/or second components with the target nucleic acid. Optionally a reaction involving either or both components and/or the target nucleic acid, between the components, and/or between either one or both components and the target nucleic acid can be performed, such as hybridization, ligation, primer extension and/or amplification, chemical or enzymatic cleavage, click chemistry, or any combination thereof. In some embodiments, a third component can be added prior to, during, or after the reaction. In some embodiments, a third component can be added prior to, during, or after contacting the sample with the first and/or second components. In some embodiments, the first, second, and third components can be contacted with the sample in any suitable combination, sequentially or simultaneously. In some embodiments, the nucleic acid probe can be assembled in situ in a stepwise manner, each step with the addition of one or more components, or in a dynamic process where all components are assembled together. One or more removing steps, e.g., by washing the sample such as under stringent conditions, may be performed at any point during the assembling process to remove or destabilize undesired intermediates and/or components at that point and increase the chance of accurate probe assembly and specific target binding of the assembled probe.

In some aspects, the methods provided herein comprise performing rolling circle amplification of a circular probe or a circularized probe generated from a circularizable probe or probe set.

In some embodiments, a probe disclosed herein can comprise a 5' flap which may be recognized by a structure-specific cleavage enzyme, e.g. an enzyme capable of recognizing the junction between a single-stranded 5' overhang and a DNA duplex, and cleaving the single-stranded overhang. It will be understood that the branched three-strand structure which is the substrate for the structure-specific cleavage enzyme may be formed by 5' end of one probe part and the 3' end of another probe part when both have hybridized to a target, as well as by the 5' and 3' ends of a one-part probe. Enzymes suitable for such cleavage include Flap endonucleases (FENS), which are a class of enzymes having endonucleolytic activity and being capable of catalyzing the hydrolytic cleavage of the phosphodiester bond at the junction of single- and double-stranded DNA. Thus, in some embodiment, cleavage of the additional sequence 5' to the first target-specific binding site is performed by a structure-specific cleavage enzyme, e.g. a Flap endonuclease. Suitable Flap endonucleases are described in Ma et al. 2000. *JBC* 275, 24693-24700 and in US 2020/0224244 and may include *P. furiosus* (Pfu), *A. fulgidus* (Afu), *M. jannaschii* (Mja) or *M. thermoautotrophicum* (Mth). In other embodiments an enzyme capable of recognizing and degrading a single-stranded oligonucleotide having a free 5' end may be used to cleave an additional sequence (5' flap) from a structure as described above. Thus, an enzyme having 5' nuclease activity may be used to cleave a 5' additional sequence. Such 5' nuclease activity may be 5' exonuclease and/or 5' endonuclease activity. A 5' nuclease enzyme is capable of recognizing a free 5' end of a single-stranded oligonucleotide and degrading said single-stranded oligonucleotide. A 5' exonuclease degrades a single-stranded oligonucleotide having a free 5' end by degrading the oligonucleotide into constituent mononucleotides from its 5' end. A 5' endonuclease activity may cleave the 5' flap sequence internally at one or more nucleotides. Further, a 5' nuclease activity may take place by the enzyme traversing the single-stranded oligonucleotide to a region of duplex once it has recognized the free 5' end, and cleaving the single-stranded region into larger constituent nucleotides (e.g. dinucleotides or trinucleotides), or cleaving the entire 5' single-stranded region, e.g. as described in Lyamichev et al. 1999. *PNAS* 96, 6143-6148 for Taq DNA polymerase and the 5' nuclease thereof. Preferred enzymes having 5' nuclease activity include Exonuclease VIII, or a native or recombinant DNA polymerase enzyme from *Thermus aquaticus* (Taq), *Thermus thermophilus* or *Thermus flavus*, or the nuclease domain therefrom.

IV. COMBINATION OF PROBE BASED ASSAYS AND GENERATION OF MULTIPLE SIGNALS IN A SAMPLE

In some aspects, provided herein are methods comprising contacting a biological sample with a first probe or probe set (e.g., an encoding probe or probe set) and a second probe or probe set (e.g., a circular probe or circularizable probe or probe set). In some embodiments, the first probe comprises a first hybridization region which is complementary to a first target sequence in the biological sample and the second probe comprises a second hybridization region which is complementary to a second target sequence in the same biological sample. In some aspects, the first and second target sequences are different. In some aspects, the first and second target sequences are in different analytes of interest. In some aspects, the first and second target sequences are in different probe molecules associated with and/or corresponding to different analytes of interest.

In some embodiments, one or more barcode regions are located at one or more locations (e.g., 5' end, 3' end, and/or between the 5' and 3' ends) on the first probe or probe set and/or second probe or probe set. In some embodiments, the one or more barcode regions are target-specific (e.g., a sequence of the barcode region uniquely corresponds to the target nucleic acid or subsequence thereof targeted by the first probe or probe set and/or second probe or probe set). In some embodiments, the one or more barcode regions per se are not target-specific, but a combination of the one or more barcode regions with other barcode(s) or barcode region(s) is target-specific, and the combination can be used to identify the target nucleic acid or subsequence thereof. In certain embodiments, a first detectable probe hybridizes to, or binds directly or indirectly to, the one or more first barcode regions. In certain embodiments, a second detectable probe hybridizes to one or more second barcode regions or complements thereof, or to an RCA product comprising one or more second barcode regions or complements thereof.

In certain embodiments, the first detectable probe can hybridize to the one or more first barcode regions before the circular or circularizable probe contacts the biological sample. In certain embodiments, the first detectable probe can hybridize to the one or more first barcode regions after the circular or circularizable probe contacts the biological sample. In certain embodiments, the first detectable probe can hybridize to the one or more first barcode regions before the second detectable probe hybridizes to the one or more second barcode regions or RCA products comprising complements of the one or more second barcode regions. In certain embodiments, the first detectable probe can hybridize to the one or more first barcode regions after the second detectable probe hybridizes to the one or more second barcode regions or RCA products comprising complements of the one or more second barcode regions.

In certain embodiments, both the signal associated with the first detectable probe and the signal associated with the second detectable probe are detected, simultaneously or in any suitable order. In certain embodiments, the detection of the first and second signals associated with the first and second detectable probes detects the first target sequence or a portion thereof and the second target sequence or a portion thereof, respectively, in the biological sample.

In certain embodiments, the signal associated with the first detectable probe is detected before the circular or circularizable probe contacts the biological sample. In certain embodiments, the signal associated with the first detectable probe is detected after the circular or circularizable probe contacts the biological sample. In certain embodiments, the signal associated with the first detectable probe is detected before the second detectable probe hybridizes to the one or more second barcode regions or RCA products comprising complements of the one or more second barcode regions. In certain embodiments, the signal associated with the first detectable probe is detected after the second detectable probe hybridizes to the one or more second barcode regions or RCA products comprising complements of the one or more second barcode regions. In certain embodiments, the signal associated with the first detectable probe is detected before the signal associated with the second detectable probe is detected. In certain embodiments, the signal associated with the first detectable probe is detected after the signal associated with the second detectable probe is detected.

In certain embodiments, the first target sequence can be a continuous sequence or a split sequence comprising two or more subsequences in the same nucleotide molecule or in different nucleotide molecules. In certain embodiments, the first target sequence can be a continuous sequence in a genomic DNA, a cDNA, an mRNA, a viral RNA, or a non-coding RNA. In certain embodiments, the two or more subsequences are in multiple oligonucleotide probes that hybridize to a genomic DNA, a cDNA, an mRNA, a viral RNA, or a non-coding RNA.

In some embodiments, the encoding probe or probe set comprises probes which are only linear probes (i.e., not circularized). In some embodiments, the encoding probe or probe set comprises probes that may be circularized. In embodiments where the encoding probe is circularized, the circularized encoding probe may but does not need to be used as a template to generate an RCA product. In some embodiments, the encoding probe or probe set is not amplified or processed by a polymerase for RCA. In certain embodiments, the encoding probe comprises a modification to protect the encoding probe from extension or otherwise processing (e.g., cleavage) by the polymerase for RCA, whereas the polymerase can amplify and/or otherwise process the circular or circularizable probe hybridized to the second target sequence. In some embodiments, the modification of the encoding probe confers resistance to 5'→3' polymerase activity and/or a 3'→5' exonuclease activity of the polymerase. In some embodiments, the polymerase for RCA is Phi29.

In some embodiments, the encoding probe or probe set comprises a 3' overhang and/or a 5' overhang. In some aspects, the encoding probe or probe set comprises an overhang which comprises one or more first barcode regions. In some aspects, the encoding probe comprises: (i) a 5' overhang comprising the one or more first barcode regions and optionally a 3' end that is resistant to a 5'→3' polymerase activity, and (ii) a 3' overhang, comprising one or more first barcode regions, optionally wherein the 3' overhang is resistant to a 3'→5' exonuclease activity.

In some embodiments, the encoding probe is provided as a single probe molecule. In certain embodiments, the encoding probe set comprises two or more probe molecules which may but do not need to be connected (e.g., via enzymatic or chemical ligation) to form a single probe molecule. In certain embodiments, the encoding probe set comprises two probe molecules each comprising a sequence that hybridizes to a subsequence of the first target sequence, and the two probe molecules each further comprises a sequence that hybridizes to a subsequence of a splint (e.g., a first detectable probe can serve as the splint). In some embodiments, the splint (e.g., a first detectable probe) hybridizes to the one or more first barcode regions. In some embodiments, the splint (e.g., a first detectable probe) hybridizes to a first barcode region which is a split barcode region. The two or more probe molecules of the encoding probe set can but do not need to be connected (e.g., via enzymatic or chemical ligation) using the first target sequence as a template, with or without gap filling. Likewise, the two or more probe molecules of the encoding probe set can but do not need to be connected (e.g., via enzymatic or chemical ligation) using the splint (e.g., a first detectable probe) as a template, with or without gap filling.

In certain embodiments, upon contacting the biological sample with a plurality first detectable probes, the first detectable probes bind to a sequence in the one or more first barcode regions (e.g., first barcode sequences). In certain embodiments, the first detectable probes are not circularized upon hybridization but are cleavable or degradable. In certain embodiments, the contacting of the biological sample by the first detectable probes and the detection of the first signal associated with the first detectable probe are performed sequentially, e.g., in sequential detectable probe hybridization cycles, wherein in each cycle, the encoding probes hybridized to first target sequences in the biological sample are contacted with one or more first detectable probes.

In certain embodiments, the first detectable probe is not circularized upon hybridization to the encoding probe or probe set. In certain embodiments, the first detectable probe is circularized upon hybridization to the encoding probe or probe set. In certain embodiments, this circularized first detectable probe is not used as a template to generate an RCA product for detection. In certain embodiments, this circularized first detectable probe is used as a template to generate an RCA product for detection.

In certain embodiments, the first detectable probe is provided as a single probe molecule. In certain embodiments, the first detectable probe is provided as multiple probe molecules which may but do not need to be connected (e.g., via enzymatic or chemical ligation) to form a single probe molecule.

In certain embodiments, the first detectable probe comprises a detectable label. In certain embodiments, the first detectable probe comprises a fluorescent moiety. In certain embodiments, a signal associated with the fluorescent moiety can be extinguished by unhybridizing the first detectable probe from the encoding probe or probe set; enzymatically cleaving the fluorescent moiety from the first detectable probe; masking, removing or modifying the fluorescent moiety; cleaving a linker linking the fluorescent moiety to the first detectable probe; chemically or photochemically modifying the fluorescent moiety; bleaching the fluorescent moiety by a chemical agent; photobleaching the fluorescent moiety; permanently and irreversibly extinguishing the fluorescent moiety; or quenching the fluorescent moiety.

In certain embodiments, the first detectable probe does not comprise a detectable label. In certain embodiments, the first detectable probe does not comprise a fluorescent moiety. In certain embodiments, the first detectable probe binds to a detectably labeled probe. In certain embodiments, the first detectable probe hybridizes to a detectably labeled probe comprising a fluorescent moiety.

In certain embodiments, the second probe or probe set can be a circular or circularizable probe or probe set. In certain embodiments, the two ends of the circularizable probe or probe sets are ligated using DNA-templated ligation or RNA-templated ligation. In certain embodiments, the circularizable probe is a padlock probe. In some embodiments, the second probe or probe set comprises a second hybridization region complementary to a second target sequence in the biological sample. In certain embodiments, the second target sequence can be a continuous sequence or a split sequence comprising two or more subsequences in the same nucleotide molecule or in different nucleotide molecules. In certain embodiments, the second target sequence can be a continuous sequence in a genomic DNA, a cDNA, an mRNA, a viral RNA, or a non-coding RNA. In certain embodiments, the two or more subsequences are in multiple oligonucleotide probes that hybridize to a genomic DNA, a cDNA, an mRNA, a viral RNA, or a non-coding RNA.

In some embodiments, the circular or circularizable probe is provided as a single probe molecule. In certain embodiments, the circularizable probe set comprises two or more probe molecules which may be connected (e.g., via enzymatic or chemical ligation) to form a single probe circular molecule. In certain embodiments, the circularizable probe set comprises two probe molecules each comprising a sequence that hybridizes to a subsequence of the second target sequence, and the two probe molecules each further comprises a sequence that hybridizes to a subsequence of a splint. In some embodiments, the splint hybridizes to the one or more second barcode regions. In some embodiments, the splint hybridizes to a second barcode region which is a split barcode region. The circularizable probe or probe set can be connected (e.g., via enzymatic or chemical ligation) using the second target sequence as a template, with or without gap filling. Likewise, the circularizable probe or probe set can be connected (e.g., via enzymatic or chemical ligation) using the splint as a template, with or without gap filling. In some embodiments, the circularizable probe set comprises two or more probe molecules that are connected using the second target sequence as template (e.g., to ligate probe sequences hybridized to the second target sequence) and using one or more splints as template (e.g., to ligate barcode sequences in the probe molecules hybridized to the splint(s)). In some embodiments, the splint can serve as a primer for RCA using the circularized probe as template. In some embodiments, an RCA primer other than the splint can be used to prime the RCA.

In certain embodiments, the circular or circularizable probe or probe set is used to generate an RCA product in the biological sample. In certain embodiments, the RCA product can be detected by a second detectable probe. In certain embodiments, upon contacting the biological sample with a plurality of second detectable probes, the second detectable probes bind to a complementary sequence of the one or more second barcode regions (e.g., second barcode sequences). In certain embodiments, the second detectable probes are not circularized upon hybridization. In certain embodiments, the second detectable probes are cleavable or degradable. In certain embodiments, the contacting of the biological sample by the second detectable probes and the detection of the second signal associated with the second detectable probe are performed sequentially, e.g., in sequential detectable probe hybridization cycles, wherein in each cycle, the RCA products in the biological sample are contacted with one or more second detectable probes.

In certain embodiments, the second detectable probe is not circularized upon hybridization to the RCA product. In certain embodiments, the second detectable probe is circularized upon hybridization to the RCA product. In certain embodiments, this circularized second detectable probe is not used as a template to generate an RCA product for detection. In certain embodiments, this circularized second detectable probe is used as a template to generate an RCA product for detection.

In certain embodiments, the second detectable probe is provided as a single probe molecule. In certain embodiments, the second detectable probe is provided as multiple probe molecules which may but do not need to be connected (e.g., via enzymatic or chemical ligation) to form a single probe molecule.

In certain embodiments, the second detectable probe comprises a detectable label. In certain embodiments, the second detectable probe comprises a fluorescent moiety. In certain embodiments, a signal associated with the fluorescent moiety can be extinguished by unhybridizing the second detectable probe from the RCA product; enzymatically cleaving the fluorescent moiety from the second detectable probe; masking, removing or modifying the fluorescent moiety; cleaving a linker linking the fluorescent moiety to the second detectable probe; chemically or photochemically modifying the fluorescent moiety; bleaching the fluorescent moiety by a chemical agent; photobleaching the fluorescent moiety; permanently and irreversibly extinguishing the fluorescent moiety; or quenching the fluorescent moiety.

In certain embodiments, the second detectable probe does not comprise a detectable label. In certain embodiments, the second detectable probe does not comprise a fluorescent moiety. In certain embodiments, the second detectable probe binds to a detectably labeled probe. In certain embodiments, the second detectable probe hybridizes to a detectably labeled probe comprising a fluorescent moiety.

In some embodiments, the biological sample is contacted with smFISH probes (the encoding probes) and probes for RCA-based detection (the circular or circularizable probes). Following the addition of these probes, the first detectable probes can then contact the biological sample to detect smFISH signals, followed by the generation of the RCA products, the contacting of the second detectable probes, and the detection of the signals for decoding the RCA products. An exemplary workflow is shown in FIG. 1A.

Figure 1B:
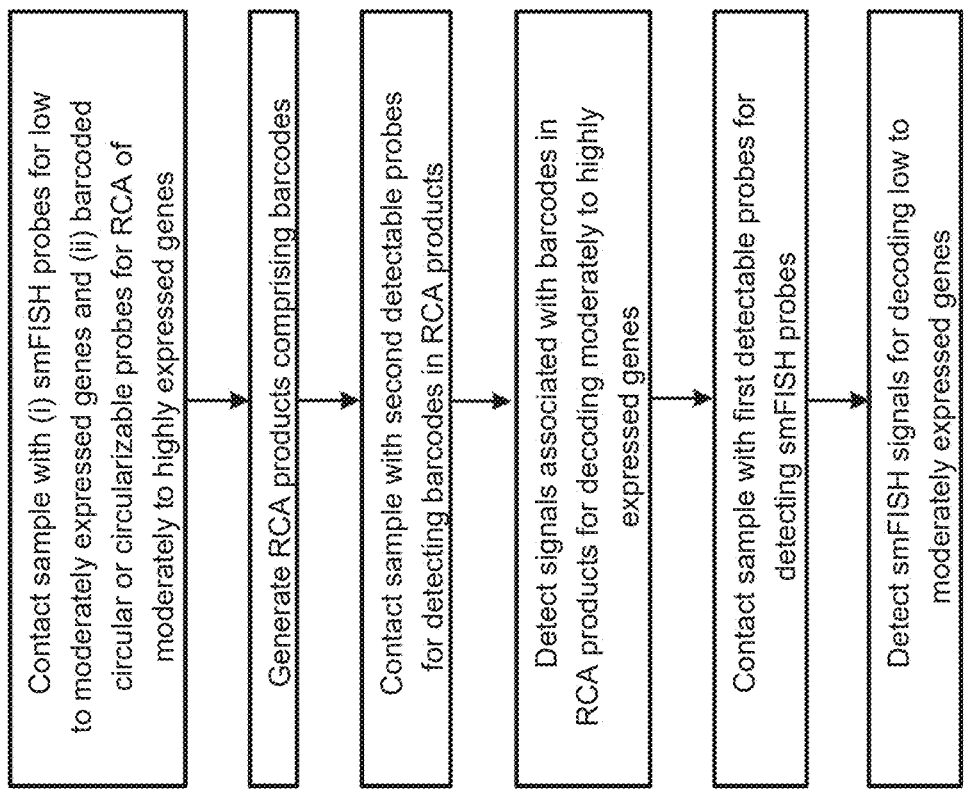

In some embodiments, the biological sample is contacted with smFISH probes (the encoding probes) and probes for RCA-based detection (the circular or circularizable probes). Following the addition of these probes, the RCA products are generated, followed by the contacting of the second detectable probes with the sample, and the detection of the signals for decoding the RCA products. Then the first detectable probes can contact the biological sample to detect smFISH signals. An exemplary workflow is shown in FIG. 1B.

In some embodiments, the biological sample is contacted with smFISH probes (the encoding probes). Following the addition of these probes, the first detectable probes can then contact the biological sample to detect smFISH signals.

Figure 1C:
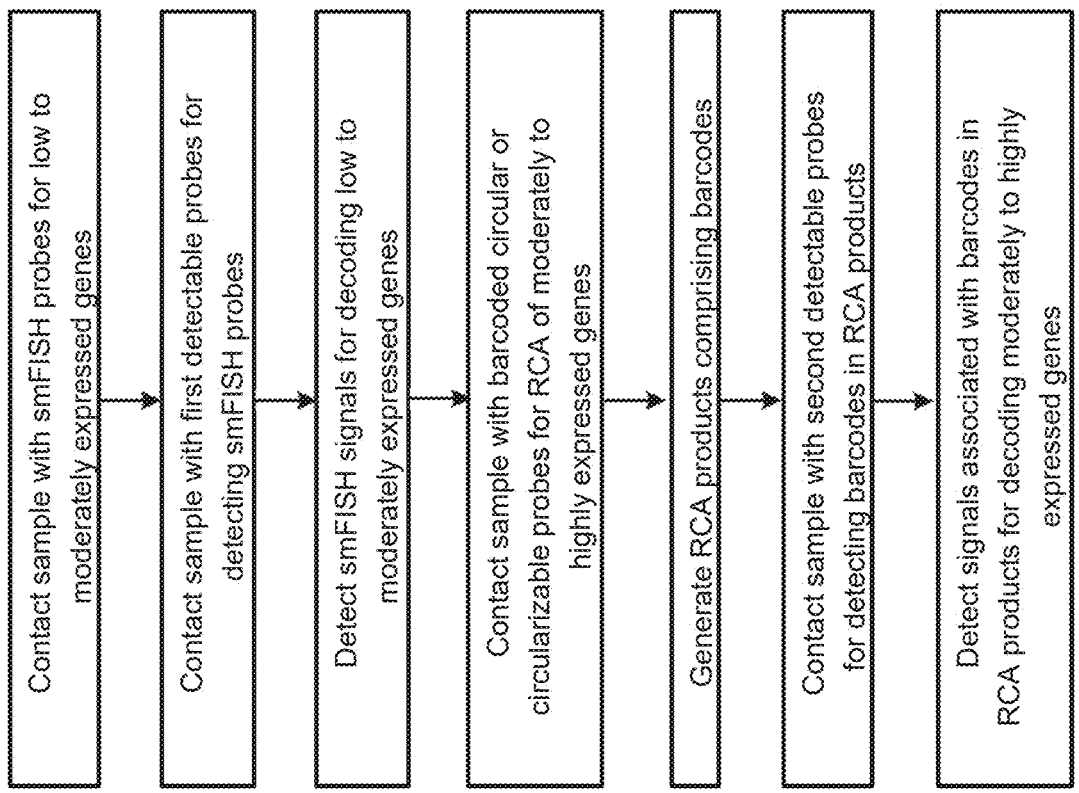

Then, the biological sample is contacted with probes for RCA-based detection (the circular or circularizable probes), followed by the generation of the RCA products, the contacting of the second detectable probes, and the detection of the signals for decoding the RCA products. An exemplary workflow is shown in FIG. 1C.

Figure 1D:
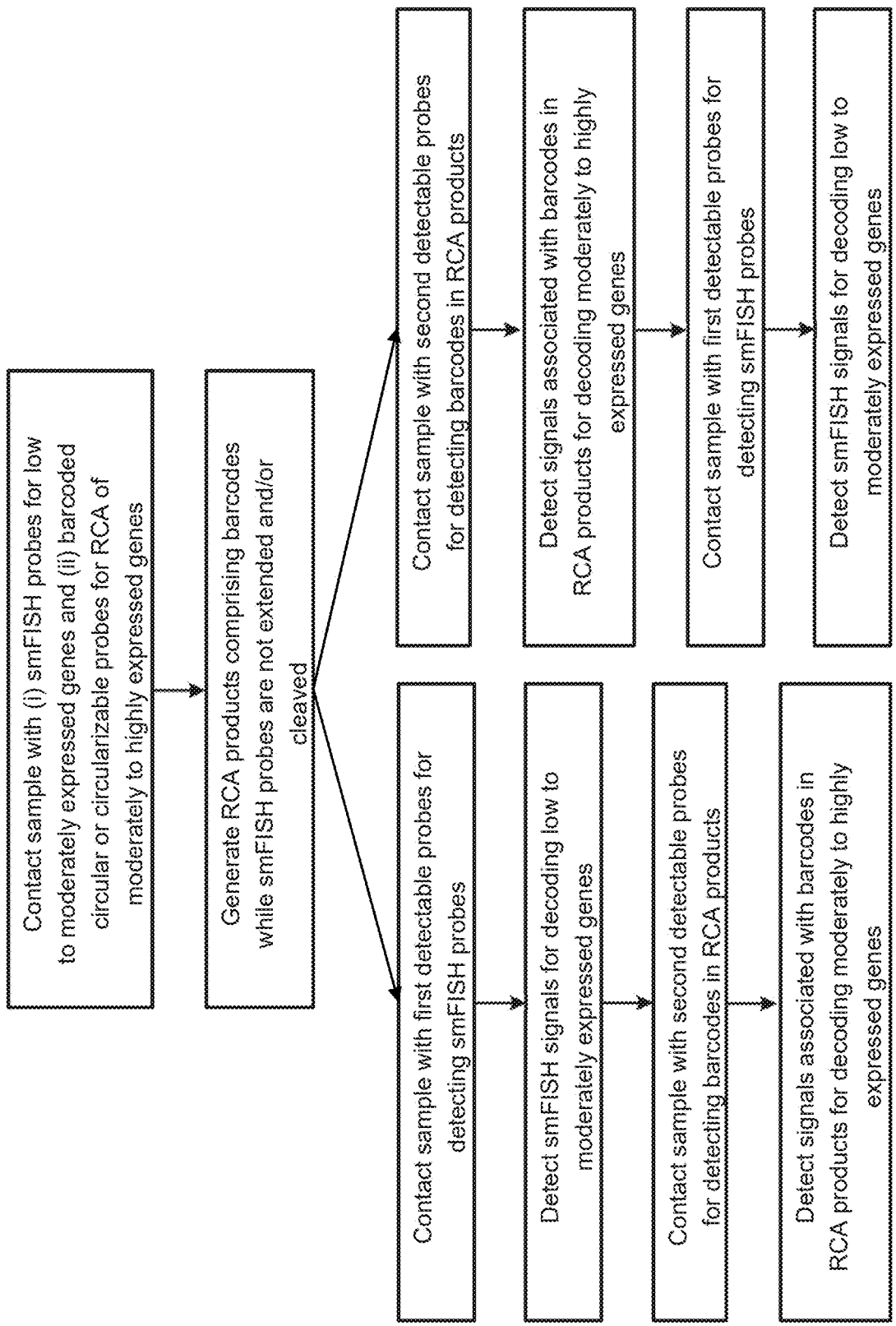

In some embodiments, the biological sample is contacted with smFISH probes (the encoding probes) and probes for RCA-based detection (the circular or circularizable probes). Following the addition of these probes, the RCA products are generated. Then, smFISH signals can be read out first, followed by reading out signals associated the RCA products, or vice versa. Exemplary workflows are shown in FIG. 1D.

Figure 1E:
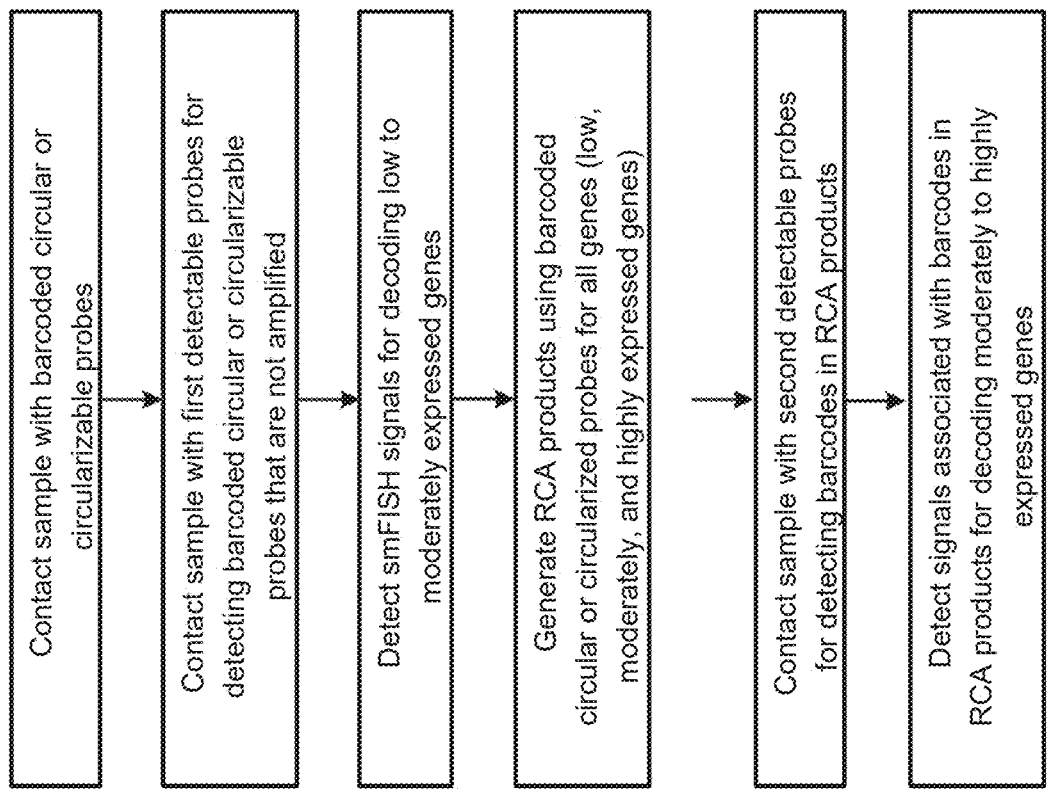

In some embodiments, the biological sample is contacted with barcoded circular or circularizable probes, followed by contacting the biological sample with first detectable probes for detecting the barcoded circular or circularizable probes that are not amplified via smFISH readout. The smFISH signals are detected and can be used to decode a first fraction of analytes (e.g., low to moderately expressed genes). Then, RCA products for all analytes (e.g., low, moderately, and highly expressed genes) can be generated using the barcoded circular or circularizable probes. The sample can be contacted with second detectable probes for detecting barcodes in the RCA products, and signals associated with barcodes in the RCA products can be used to decode moderately to highly expressed genes. An exemplary workflow is shown in FIG. 1E.

The contacting of the biological sample by the encoding probe and the circular or circularizable probe can occur in any suitable order. Similarly, the contacting of the biological sample by the first detectable probe and the second detectable probe can occur in any suitable order provided the first detectable probe contacts the biological sample after the encoding probe and the second detectable probe contacts the biological sample after the circular or circularizable probe. Similarly, the detecting of the first or second signal associated with the detecting probes can be performed in any suitable order provided that the detecting of the first detectable probe takes place after the contacting of the biological sample with the encoding probe and the first detectable probe and that the detecting of the second detectable probe takes place after the contacting of the biological sample with the circular or circularizable probe and the second detectable probe. Exemplary work flow diagrams of the process can be seen in FIGS. 1A-1E.

Figure 3:
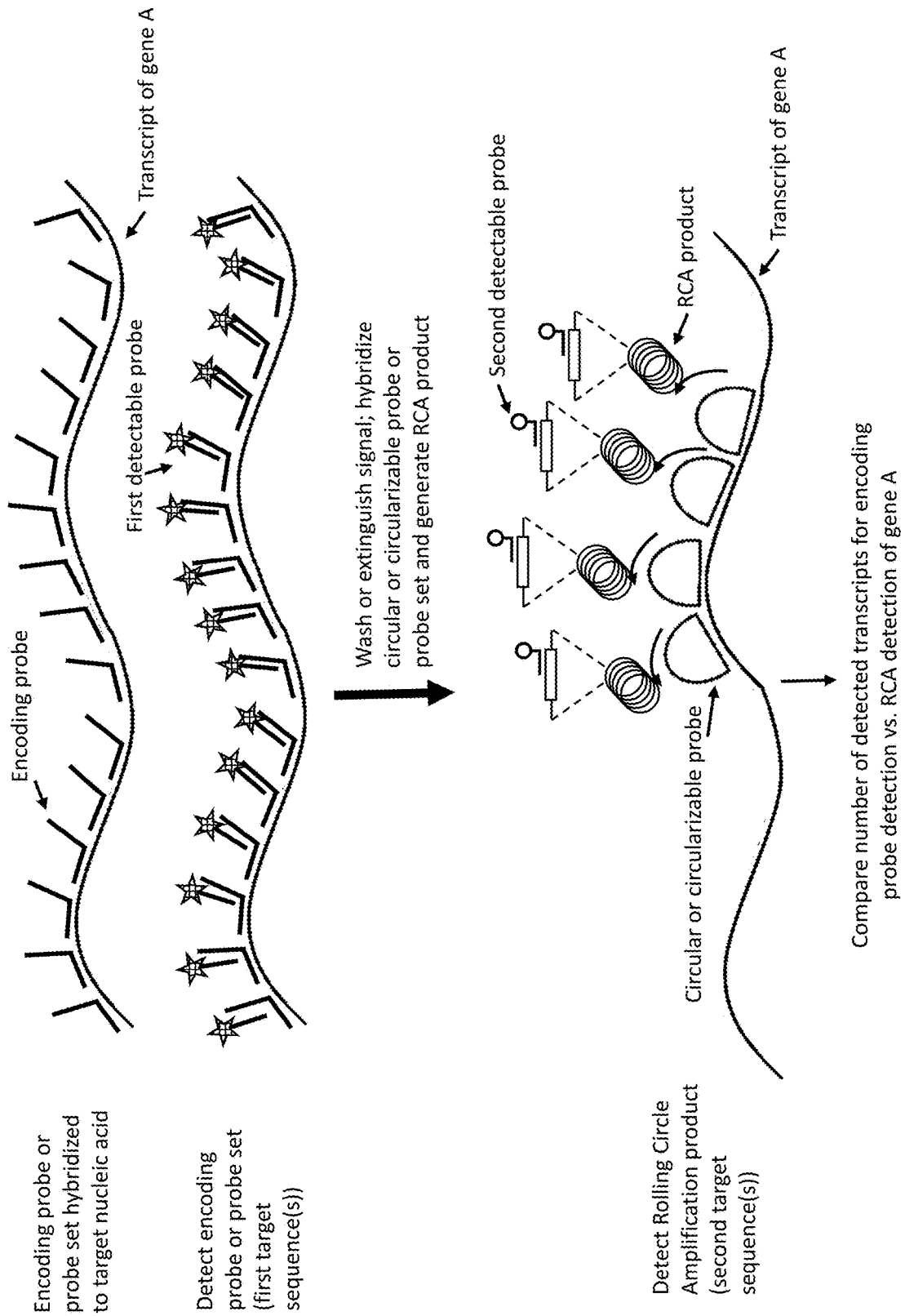
FIG. 3 shows an exemplary method for detecting a target nucleic acid molecule by both smFISH detection (encoding probes) and RCA-based detection (circular or circularizable probe(s)). Signals associated with the RCA products and smFISH signals corresponding to molecules of the same analyte (e.g., RNA transcripts of the same gene) can be used to analyze a difference in sensitivity between the smFISH and the RCA readouts.

In some embodiments, the method comprises detecting a species of analyte by both RCA and smFISH. For example, in some embodiments, a first set of analytes is detected by smFISH, a second set of analytes is detected by RCA. The first and second sets can overlap, so that at least some analytes are detected by both smFISH and RCA (e.g., as illustrated in FIG. 3). FIG. 3 shows an exemplary method for detecting a target nucleic acid molecule by both smFISH detection (encoding probes) and RCA-based detection (circular or circularizable probe(s)). Signals associated with the RCA products and smFISH signals corresponding to molecules of the same analyte (e.g., RNA transcripts of the same gene) can be used to analyze a difference in sensitivity between the smFISH and the RCA readouts. In some embodiments, the encoding probes or probe sets are complementary to first target sequences that overlap with the second target sequence(s) for the circular or circularizable probe(s) or probe set(s) in the target nucleic acid molecule. The first target sequences or a subset thereof can overlap completely or partially with the second target sequences. In some embodiments, the encoding probe is removed from the target nucleic acid (e.g., using one or more wash steps) before contacting the biological sample with the circular probe(s) or circularizable probe(s) or probe set(s). In some embodiments, the target sequences for the encoding probes or probe sets and the target sequences for the circular probe(s) or circularizable probe(s) or probe set(s) are different (e.g., non-overlapping) sequences in the target nucleic acid molecule. In some embodiments, the encoding probes or probe sets and the circular probe(s) or circularizable probe(s) or probe set(s) are capable of hybridizing to the same target nucleic acid molecule simultaneously.

Figure 4:
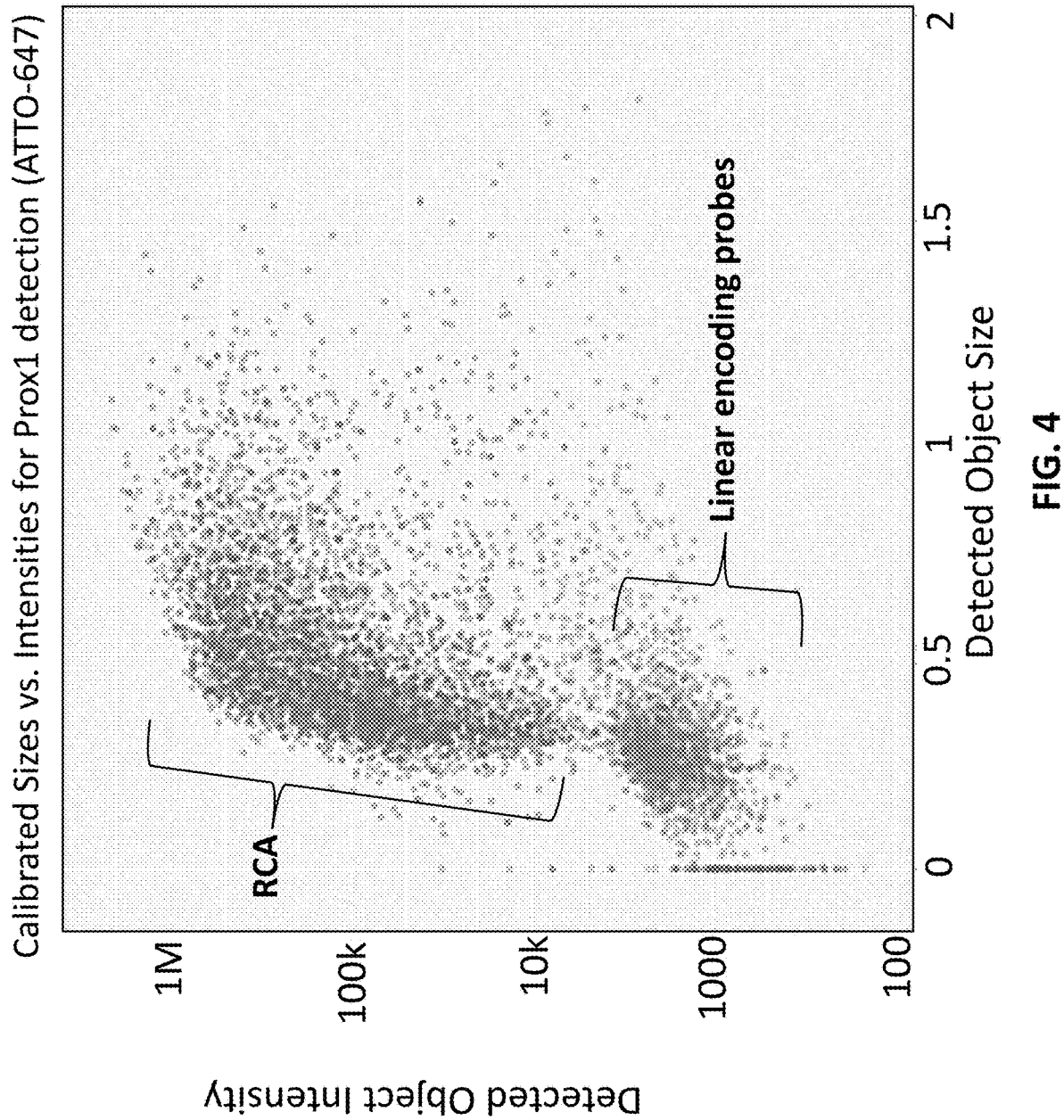
FIG. 4 shows results demonstrating detected object (e.g., signal puncta) intensity and size for RCA and smFISH using linear encoding probes performed on the same biological sample.

Example 2 provides data comparing smFISH and RCA-based detection of RNA transcripts for the same gene. As shown in FIG. 4, RCA-based detection provides higher signal intensity compared to smFISH. On the other hand, smFISH provides greater sensitivity (greater number or density of detected transcripts). In some aspects, the present methods combine the sensitivity of smFISH (e.g., for lowly abundant transcripts) with the benefits of RCA (e.g., greater signal intensity and/or detection of shorter transcripts). In some embodiments, when smFISH and RCA are performed on the same sample, the number of detected target sequences (e.g., detected transcripts) for RCA is multiplied by a correction coefficient to account for the greater sensitivity of smFISH. In some embodiments, the correction coefficient is between or between about any of 1.1 and 1.5, 1.1 and 2, 1.2 and 2, 1.3 and 2, 1.5 and 3, or 2 and 3. In some embodiments, the correction coefficient is determined by comparing the number of detected transcripts or the detected transcript density for a gene detected using both smFISH and RCA. In some embodiments, the transcripts detected using both smFISH and RCA are of a moderately expressed gene.

In some embodiments, smFISH (encoding probes or probe sets) is used to detect transcripts of one or more genes that have low expression in the biological sample. In any of the embodiments herein, genes that have low expression in the biological sample can be genes detected at a mean count of 1-5 transcripts per cell by single cell RNA sequencing of the biological sample, or genes detected at a mean count of 1-5 transcripts per cell by smFISH or RCA-based detection. In some embodiments, RCA-based detection is used to detect transcripts of one or more genes that have high expression in the biological sample. In any of the embodiments herein, genes that have high expression can be genes detected at a mean count of more than 20 transcripts per cell by single cell RNA sequencing, or genes detected at a mean count of more than 20 transcripts per cell by smFISH or RCA-based detection. In some embodiments, both smFISH and RCA-based detection is used to detect transcripts of one or more genes that have medium expression in the biological sample. In any of the embodiments herein, genes that have medium expression can be genes detected at a mean count of 5-20 transcripts per cell by single cell RNA sequencing of the biological sample, or genes detected at a mean count of 5-20 transcripts per cell by smFISH or RCA-based detection. In some embodiments, the number of transcripts detected by RCA and by smFISH for the same gene is compared to determine a correction coefficient (e.g., multiplying the RCA-based transcript count by a factor of 1.4 to account for 70% detection efficiency for RCA compared to smFISH of the same transcript). In some embodiments, all RCA transcript counts are multiplied by the correction coefficient, including transcript counts for genes detected only via RCA-based detection.

In some aspects, disclosed herein is a method for analyzing a biological sample, the method comprising, in any suitable order: (a) contacting the biological sample with an encoding probe or probe set (e.g., for smFISH) comprising: (i) a first hybridization region complementary to a first target sequence in the biological sample, (ii) one or more first barcode regions (e.g., a first barcode region comprising one or more smFISH barcodes); (b) contacting the biological sample with a circular probe or circularizable probe or probe set comprising: (i) a second hybridization region complementary to a second target sequence in the biological sample, (ii) one or more second barcode regions (e.g., a second barcode region comprising one or more barcodes for in situ sequencing-by-hybridization or sequencing-by-ligation).

In some embodiments, the encoding probe or probe set (e.g., for smFISH) and the circular probe or circularizable probe or probe set (e.g., for RCA) can be contacted with the biological sample in any suitable order. For instance, the two types of probes can be added separately (e.g., each probe is provided in a separate solution) to contact the biological sample, but the contact can be simultaneous and optionally followed by a step of removing probe molecules that do not hybridize to the first or second target sequence in the biological sample. In other examples, the two types of probes can be pre-combined (e.g., pre-mixed in the same solution) and added together to the biological sample, optionally followed by a step of removing probe molecules that do not hybridize to the first or second target sequence in the biological sample. In still other examples, the biological sample contacts the encoding probe or probe set (e.g., for smFISH), optionally followed by a step of removing probe molecules that do not hybridize to the first target sequence in the biological sample, and then the biological sample contacts the circular probe or circularizable probe or probe set (e.g., for RCA), optionally followed by a step of removing probe molecules that do not hybridize to the second target sequence in the biological sample. In yet other examples, the biological sample contacts the circular probe or circularizable probe or probe set (e.g., for RCA), optionally followed by a step of removing probe molecules that do not hybridize to the second target sequence in the biological sample, and then the biological sample contacts the encoding probe or probe set (e.g., for smFISH), optionally followed by a step of removing probe molecules that do not hybridize to the first target sequence in the biological sample.

In some embodiments, the encoding probe or probe set (e.g., for smFISH) is read out, e.g., sequentially and/or multiplexed through multiple cycles. In some embodiments, once one or more or all of the encoding probes or probe sets are read out, the circular probe or circularizable probe or probe set (e.g., for RCA) can be amplified and read out. In some instances, detection of the encoding probe or probe set (e.g., for smFISH) is followed by a step of removing the encoding probe or probe set molecules from the biological sample, and then the biological sample is contacted with the circular probe or circularizable probe or probe set (e.g., for RCA). For instance, the circular probe or a circularized probe generated from the circularizable probe can be amplified by RCA and the barcodes in the RCA products can be read out using any suitable decoding scheme.

In some embodiments, after both probe types are hybridized, the method comprises contacting the biological sample with a first detectable probe that directly or indirectly binds to a sequence in the one or more first barcode regions; followed by detecting a first signal associated with the first detectable probe; followed by generating a rolling circle amplification (RCA) product in the biological sample using the circular probe or a circularized probe generated from the circularizable probe or probe set as the RCA template; followed by contacting the biological sample with a second detectable probe that hybridizes to the RCA product at a sequence in the one or more second barcode regions or a complementary sequence thereof; and followed by detecting a second signal associated with the second detectable probe, thereby detecting the first target sequence or a portion thereof and the second target sequence or a portion thereof in the biological sample.

In some embodiments, after both probe types are hybridized, the method comprises generating a rolling circle amplification (RCA) product in the biological sample using the circular probe or a circularized probe generated from the circularizable probe or probe set as the RCA template. The circularizable probe or probe set can be circularized using any suitable method (e.g., enzymatic ligation and/or chemical ligation) by connecting two ends of the same probe or by connecting an end of a probe to an end of another probe in the probe set. In some embodiments, one or more 3' ends of the encoding probe or probe set (e.g., for smFISH) can be modified to contain one or more protecting/blocking groups or bases to prevent processing by an enzyme, such as extension catalyzed by a polymerase (e.g., Phi29) and/or cleavage by an exonuclease, such that during the RCA reaction the encoding probe or probe set is not extended by the polymerase and/or cleaved (e.g., by the polymerase having a 3'→5' exonuclease activity). In some embodiments, once the RCA product is generated, the encoding probe or probe set (e.g., for smFISH) is read out, e.g., sequentially and/or multiplexed through multiple cycles, followed by reading out one or more barcodes or complements thereof in the RCA product using any suitable decoding scheme.

In some embodiments, the encoding probe or probe set is modified to be resistant to a 5'→3' polymerase activity and/or a 3'→5' exonuclease activity, optionally wherein the modification comprises an irreversible terminating group (optionally ddNTP), a reversible terminating group (optionally a 3'-O-blocked reversible terminating group and/or 3'-unblocked reversible terminating group optionally linked to the base), a 3' thiophosphate protection, a phosphorothioate bond, a 2'-modified nucleoside, an inverted deoxythymidine base, and/or a 2'-O-methyl ribonucleotide. In some embodiments, the 2'-O-methyl ribonucleotide is a 3' terminal nucleotide of the encoding probe or probe set. In some embodiments, the 3' terminal 2'-O-methyl ribonucleotide can be a mismatch that does not hybridize with the first target sequence, such that the 3' terminal 2'-O-methyl ribonucleotide can prevent 3'→5' exonuclease activity of the polymerase (e.g., Phi29).

In some embodiments, after both probe types are hybridized, the method comprises generating a rolling circle amplification (RCA) product in the biological sample using the circular probe or a circularized probe generated from the circularizable probe or probe set as the RCA template; followed by contacting the biological sample with a first detectable probe that directly or indirectly binds to a sequence in the one or more first barcode regions; followed by detecting a first signal associated with the first detectable probe; followed by contacting the biological sample with a second detectable probe that hybridizes to the RCA product at a sequence in the one or more second barcode regions or a complementary sequence thereof; and followed by detecting a second signal associated with the second detectable probe, thereby detecting the first target sequence or a portion thereof and the second target sequence or a portion thereof in the biological sample.

In some embodiments, after both probe types are hybridized, the method comprises generating a rolling circle amplification (RCA) product in the biological sample using the circular probe or a circularized probe generated from the circularizable probe or probe set as the RCA template; followed by contacting the biological sample with a second detectable probe that hybridizes to the RCA product at a sequence in the one or more second barcode regions or a complementary sequence thereof; followed by detecting a second signal associated with the second detectable probe; followed by contacting the biological sample with a first detectable probe that directly or indirectly binds to a sequence in the one or more first barcode regions; and followed by detecting a first signal associated with the first detectable probe, thereby detecting the first target sequence or a portion thereof and the second target sequence or a portion thereof in the biological sample.

In some embodiments, after both probe types are hybridized and the RCA product is generated, the biological sample is contacted with (i) a first detectable probe that directly or indirectly binds to a sequence in the one or more first barcode regions and (ii) a second detectable probe that hybridizes the RCA product at a sequence complementary to a sequence in the one or more second barcode regions. The contacting of the biological sample with the first and second detectable probes can be performed simultaneously or in either order. In some embodiments, the method further comprises, simultaneously or in either order: detecting a first signal associated with the first detectable probe and detecting a second signal associated with the second detectable probe.

In some aspects, disclosed herein is a method for analyzing a biological sample, the method comprising: contacting the biological sample with an encoding probe or probe set (e.g., for smFISH) comprising: (i) a first hybridization region complementary to a first target sequence in the biological sample, (ii) one or more first barcode regions (e.g., a first barcode region comprising one or more smFISH barcodes); followed by contacting the biological sample with a first detectable probe that directly or indirectly binds to a sequence in the one or more first barcode regions; followed by detecting a first signal associated with the first detectable probe; followed by contacting the biological sample with a circular probe or circularizable probe or probe set comprising: (i) a second hybridization region complementary to a second target sequence in the biological sample, (ii) one or more second barcode regions (e.g., a second barcode region comprising one or more barcodes for in situ sequencing-by-hybridization or sequencing-by-ligation); followed by generating a rolling circle amplification (RCA) product in the biological sample using the circular probe or a circularized probe generated from the circularizable probe or probe set as the RCA template; followed by contacting the biological sample with a second detectable probe that hybridizes to the RCA product at a sequence complementary to a sequence in the one or more second barcode regions; and followed by detecting a second signal associated with the second detectable probe, thereby detecting the first target sequence or a portion thereof and the second target sequence or a portion thereof in the biological sample.

In some aspects, disclosed herein is a method for analyzing a biological sample, the method comprising: contacting the biological sample with a circular probe or circularizable probe or probe set comprising: (i) a second hybridization region complementary to a second target sequence in the biological sample, (ii) one or more second barcode regions (e.g., a second barcode region comprising one or more barcodes for in situ sequencing-by-hybridization or sequencing-by-ligation); followed by generating a rolling circle amplification (RCA) product in the biological sample using the circular probe or a circularized probe generated from the circularizable probe or probe set as the RCA template; followed by contacting the biological sample with a second detectable probe that hybridizes to the RCA product at a sequence complementary to a sequence in the one or more second barcode regions; followed by detecting a second signal associated with the second detectable probe; followed by contacting the biological sample with an encoding probe or probe set (e.g., for smFISH) comprising: (i) a first hybridization region complementary to a first target sequence in the biological sample, (ii) one or more first barcode regions (e.g., a first barcode region comprising one or more smFISH barcodes); followed by contacting the biological sample with a first detectable probe that directly or indirectly binds to a sequence in the one or more first barcode regions; and followed by detecting a first signal associated with the first detectable probe, thereby detecting the first target sequence or a portion thereof and the second target sequence or a portion thereof in the biological sample.

In some embodiments, the encoding probe or probe set is circularized to generate a circularized encoding probe, optionally within the probe or probe set or with one or more other probes. In some embodiments, the circularized encoding probe is not used as a template to generate an RCA product. In some embodiments, a circularized probe can be detected using smFISH readout, then the same circularized probe can be amplified and the amplification product (e.g., RCA product) can be detected. In some embodiments, the circularized encoding probe can be detected by a detectable probe to detect smFISH signal(s). In some embodiments, after the smFISH signal detection, the circularized encoding probe can be amplified by RCA, and the RCA product can be detected, for instance, to measure absolute sensitivity of the RCA-based detection compared to the smFISH detection. In some embodiments, signal detection using an smFISH readout provides the number of puncta (e.g., signal spots corresponding to analytes) and locations of these puncta, and the RCA-based detection may provide the same puncta and their locations. The signals can be compared and used to analyze potential diffusion of the RCA products, for instance, if an RCA product is detected at a different location, e.g., compared to a corresponding smFISH signal.

Figure 2:
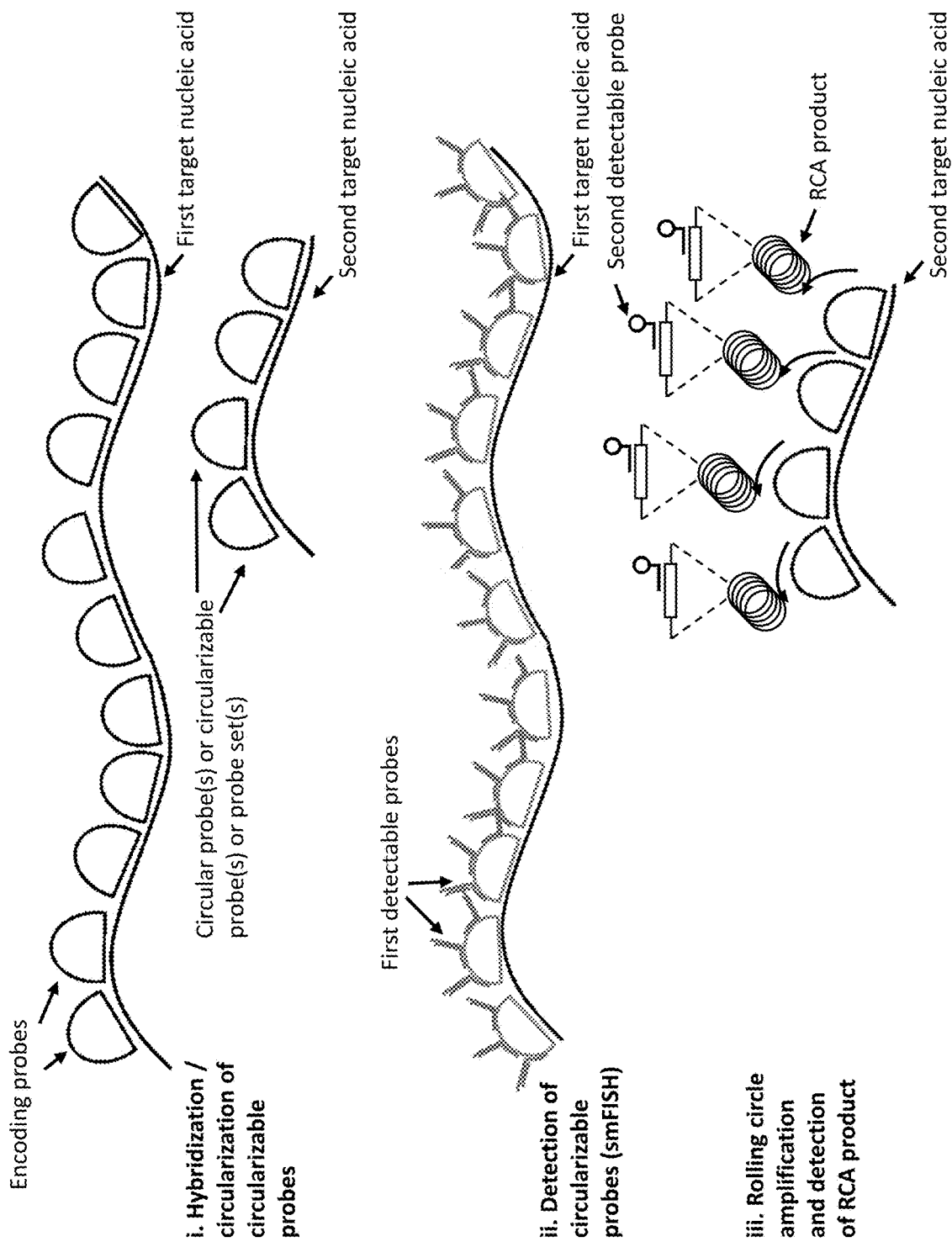
FIG. 2 shows an exemplary method for detecting a first nucleic acid molecule using encoding probes (smFISH) and detecting a second nucleic acid molecule by detecting one or more RCA products.

In some embodiments, a plurality of encoding probes or probe sets are hybridized to a plurality of first target sequences in a first target nucleic acid molecule, as shown in FIG. 2. The first target sequences can be sequences that tile the first target nucleic acid molecule, and can comprise sequences that are the same or different. In some embodiments, the first target nucleic acid molecule comprises between about 30 and about 50, between about 30 and about 45, between about 40 and about 50, between about 40 and about 45, or between about 45 and about 50 first target sequences. In some embodiments, the first target nucleic acid molecule comprises about 45, 46, 47, or 48 first target sequences. In some embodiments, one or more of the first target sequences can be a repeated sequence in the first target nucleic acid molecule. In some embodiments, the first target sequences that tile the first target nucleic acid molecule are all different sequences. The encoding probes or probe sets can be circularizable probes as shown in FIG. 2, or can be linear probes (e.g., smFISH probes) comprising one or more overhang regions that do not hybridize to the first target nucleic acid. The one or more overhang regions can comprise one or more barcodes for hybridization to first detectable probes. In some embodiments, the method comprises hybridizing one or more circular probe(s) or circularizable probe(s) or probe set(s) to one or more second target sequences in a second target nucleic acid. In some embodiments, the second target nucleic acid molecule comprises 1, 2, 3, 4, 5, 6, 7, 8, 9, or 10 second target sequences. In some embodiments, the second target nucleic acid molecule comprises between about 4 and about 8 second target sequences. In some embodiments, the method comprises a ligation step, in which the circularizable probe(s) hybridized to the second target nucleic acid are circularized. Optionally, both the circularizable probes and the circularizable encoding probes are circularized. In some embodiments, the encoding probe (e.g., the circularized or linear encoding probe) can be detected by first detectable probes to detect smFISH signal(s). In some embodiments, the circularizable probe(s) hybridized to the second target sequences in the second target nucleic acid molecule cannot be detected by hybridization of a detectable probe to detect smFISH signal(s). For example, the second target nucleic acid may not be hybridized by sufficient circularizable probes to provide sufficient copies of a barcode sequence for detection of smFISH signal(s). In some embodiments, the method comprises performing rolling circle amplification of the circularized probe(s) hybridized to the second target nucleic acid. In some embodiments, the encoding probes (e.g., circularized encoding probes) can also be amplified by rolling circle amplification. In some embodiments, the method comprises contacting the sample with second detectable probes to detect the rolling circle amplification product(s) of the circular probe(s) or circularized probe(s) generated from the circularizable probe(s) or probe set(s).

In some embodiments, the method comprises detecting the encoding probes for a first nucleic acid (e.g., a first transcript) by smFISH (hybridization of detectable probes to the encoding probes), followed by detecting an RCA product of a circularizable probe that hybridizes to a second nucleic acid (e.g., a second transcript) by hybridization of detectable probes to the RCA product. In some embodiments, the first nucleic acid molecule is longer than the second nucleic acid molecule. In some embodiments, an RCA product is generated for the second nucleic acid molecule but not for the first nucleic acid molecule (e.g., the encoding probes are not circularized, or do not comprise a priming region bound by an RCA primer). In some embodiments, an RCA product is generated for both the second nucleic acid molecule and the first nucleic acid molecule, optionally after detecting the first nucleic acid molecule by smFISH. In some embodiments, after generating the RCA product, the sample is contacted with detectable probes complementary to a complement of a barcode sequence of the circularizable probe but not with detectable probes complementary to a complement of a barcode sequence of the encoding probes, thereby detecting only the RCA product(s) of the circularizable probes and not RCA products of the encoding probes.

In some embodiments, the method comprises contacting the sample with encoding probes complementary to at least or at least about 20, 25, 30, 35, 40, 41, 42, 43, 44, 45, 46, 47, 48, 49, or 50 first target sequences in a first nucleic acid molecule in the biological sample. Any two adjacent first target sequences of the multiple first target sequences in the same first nucleic acid molecule can be non-overlapping or partially overlapping, and the sequence overlap can be about 1, about 5, about 10, about 15, about 20, or more nucleotides in length or in a range between any of the aforementioned values. In some embodiments, the method comprises contacting the sample with between or between about 30 and 50 encoding probes complementary to partially overlapping or non-overlapping first target sequences in a first target nucleic acid molecule. In some embodiments, the method comprises contacting a sample with no more than 1, 2, 3, 4, 5, 6, or 10 circularizable probes complementary to sequences of a given second target nucleic acid. In some embodiments, the first nucleic acid molecule is at least or at least about any of 500, 600, 700, 800, 900, 1000, or 1400 nucleotides in length. In some embodiments, the second nucleic acid molecule is shorter than any one of 500, 400, 300, 200, 100, 90, 80, 70, 60, 50, or 40 nucleotides in length. In some embodiments, the second nucleic acid molecule is between 20 and 600, between 20 and 500, between 20 and 200, between 40 and 600, between 40 and 500, between 40 and 200, between 40 and 100, between 100 and 500, or between 100 and 200 nucleotides in length.

In some embodiments, the first detectable probe complementary to the barcode sequence in the encoding probe and the second detectable probe complementary to the a barcode sequence in the rolling circle amplification product of a circularizable probe can be contacted with the sample simultaneously. Thus, in some aspects, the method avoids performing a wash step between smFISH detection of first target nucleic acid molecules and RCA detection of second target nucleic acid molecules.

In some aspects, the methods disclosed herein comprise a plurality of probes that hybridize to the target nucleic acid. In some aspects, the methods disclosed herein comprise at least about 3, at least about 5, at least about 10, at least about 15, at least about 20, at least about 25, at least about 30, or at least about 35 probes that hybridize to the target nucleic acid, where each probe comprises a hybridization region that hybridizes to a target sequence of the target nucleic acid.

In some embodiments, a nucleic acid probe disclosed herein may comprise 1, 2, 3, 4, 5, 6, 7, 8, 9, 10, 11, 12, 13, 14, 15 or more, 20 or more, 32 or more, 40 or more, or 50 or more barcode sequences. The barcode sequences may be positioned anywhere within the nucleic acid probe. If more than one barcode sequences are present, the barcode sequences may be positioned next to each other, and/or interspersed with other sequences. In some embodiments, two or more of the barcode sequences may also at least partially overlap. In some embodiments, two or more of the barcode sequences in the same probe do not overlap. In some embodiments, all of the barcode sequences in the same probe are separated from one another by at least a phosphodiester bond (e.g., they may be immediately adjacent to each other but do not overlap), such as 1, 2, 3, 4, 5, 6, 7, 8, 9, 10 or more nucleotides apart.

The barcode sequences, if present, may be of any length. If more than one barcode sequence is used, the barcode sequences may independently have the same or different lengths, such as at least 5, at least 10, at least 15, at least 20, at least 25, at least 30, at least 35, at least 40, at least 50 nucleotides in length. In some embodiments, the barcode sequence may be no more than 120, no more than 112, no more than 104, no more than 96, no more than 88, no more than 80, no more than 72, no more than 64, no more than 56, no more than 48, no more than 40, no more than 32, no more than 24, no more than 16, or no more than 8 nucleotides in length. Combinations of any of these are also possible, e.g., the barcode sequence may be between 5 and 10 nucleotides, between 8 and 15 nucleotides, etc.

The barcode sequence may be arbitrary or random. In certain cases, the barcode sequences are chosen so as to reduce or minimize homology with other components in a sample, e.g., such that the barcode sequences do not themselves bind to or hybridize with other nucleic acids suspected of being within the cell or other sample. In some embodiments, between a particular barcode sequence and another sequence (e.g., a cellular nucleic acid sequence in a sample or other barcode sequences in probes added to the sample), the homology may be less than 10%, less than 8%, less than 7%, less than 6%, less than 5%, less than 4%, less than 3%, less than 2%, or less than 1%. In some embodiments, the homology may be less than 20, 19, 18, 17, 16, 15, 14, 13, 12, 11, 10, 9, 8, 7, 6, 5, 4, 3, or 2 bases, and in some embodiments, the bases are consecutive bases.

In some embodiments, the number of distinct barcode sequences in a population of probes (e.g., the primary probes for smFISH) is less than the number of distinct targets (e.g., nucleic acid analytes and/or protein analytes) of the nucleic acid probes, and yet the distinct targets may still be uniquely identified from one another, e.g., by encoding a probe with a different combination of barcode sequences. However, not all possible combinations of a given set of barcode sequences need be used. For instance, each probe may contain 1, 2, 3, 4, 5, 6, 7, 8, 9, 10, 11, 12, 13, 14, 15, etc. or more barcode sequences. In some embodiments, a population of nucleic acid probes may each contain the same number of barcode sequences, although in other cases, there may be different numbers of barcode sequences present on the various probes.

In some embodiments, a method disclosed herein comprises multiplexed analysis of a biological sample comprising consecutive cycles of detectable probe hybridization, fluorescence imaging, and signal removal. Exemplary detectable reactive reagents and methods are described in U.S. Pat. No. 6,828,109, US 2019/0376956, WO 2019/236841, WO 2020/102094, WO 2020/163397, and WO 2021/067475, all of which are incorporated herein by reference in their entireties.

In some embodiments, a method disclosed herein comprises nucleic acid sequencing, including in situ sequencing in a sample, which typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequencing are described, for example, in Mitra et al., (2003) Anal. Biochem. 320, 55-65, and Lee et al., (2014) Science, 343 (6177), 1360-1363. In addition, examples of methods and systems for performing in situ sequencing are described in US 2016/0024555, US 2019/0194709, and in U.S. Pat. Nos. 10,138,509, 10,494,662 and 10,179,932. Exemplary techniques for in situ sequence detection comprise, but are not limited to, STARmap (described for example in Wang et al., (2018) *Science,* 361 (6499) 5691), MERFISH (described for example in Moffitt, (2016) *Methods in Enzymology,* 572, 1-49), hybridization-based in situ sequencing (HybISS) (described for example in Gyllborg et al., Nucleic Acids Res (2020) 48 (19): e112, and FISSEQ (described for example in US 2019/0032121).

In some embodiments, sequencing can be performed by sequencing-by-synthesis (SBS). In some embodiments, a sequencing primer is complementary to sequences at or near the one or more barcode(s). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/005986, US 2005/0100900, U.S. Pat. No. 9,217,178, US 2009/0118128, US 2012/0270305, US 2013/0260372, and US 2013/0079232.

In some embodiments, sequence analysis of the target and/or barcoded probes can be performed by sequential hybridization (e.g., sequencing by hybridization and/or sequential in situ fluorescence hybridization). Sequential fluorescence hybridization can involve sequential hybridization of detection probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, all of which are incorporated herein by reference.

In some embodiments, sequencing can be performed using single molecule sequencing by ligation. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al. Science (2005), 309:1728-1732, and in U.S. Pat. Nos. 5,599,675; 5,750,341; 6,969,488; 6,172,218; and 6,306,597.

In some embodiments, nucleic acid hybridization can be used for sequencing or sequence detection. These methods utilize labeled nucleic acid decoder probes that are complementary to at least a portion of a barcode sequence. Multiplex decoding can be performed with pools of many different probes with distinguishable labels. Non-limiting examples of nucleic acid hybridization sequencing are described for example in U.S. Pat. No. 8,460,865, and in Gunderson et al., *Genome Research* 14:870-877 (2004).

In some embodiments, real-time monitoring of DNA polymerase activity can be used during sequencing. For example, nucleotide incorporations can be detected through fluorescence resonance energy transfer (FRET), as described for example in Levene et al., *Science* (2003), 299, 682-686, Lundquist et al., *Opt. Lett.* (2008), 33, 1026-1028, and Korlach et al., *Proc. Natl. Acad. Sci. USA* (2008), 105, 1176-1181.

(a) Hybridization and Ligation

In some embodiments, a hybridization product is formed comprising the pairing of substantially complementary or complementary nucleic acid sequences. In some embodiments, the hybridization product or complex is formed comprising at least two different molecules or three different molecules. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

Various probes and probe sets (e.g., encoding probe or probe set; circular probe or circularizable probe or probe set as described herein) can be hybridized to an endogenous analyte and/or a labelling agent (e.g., reporter oligonucleotide) and each probe may comprise one or more barcode sequences or regions. In some instances, various probes and probe sets can be hybridized to a target-specific adapter region and may comprise one or more barcode sequences or regions.

In some embodiments, provided herein is a probe or probe set capable of DNA-templated ligation, such as from a cDNA molecule. See, e.g., U.S. Pat. No. 8,551,710, which is hereby incorporated by reference in its entirety. In some embodiments, provided herein is a probe or probe set capable of RNA-templated ligation. See, e.g., U.S. Pat. Pub. 2020/0224244 which is hereby incorporated by reference in its entirety. In some embodiments, the ligation involves chemical ligation. In some embodiments, the ligation involves template dependent ligation. In some embodiments, the ligation involves template independent ligation. In some embodiments, the ligation involves enzymatic ligation.

In some embodiments, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as *E. coli* DNA ligase, Tth DNA ligase, *Thermococcus* sp. (strain 9° N) DNA ligase (9° N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some embodiments, the ligase is a T4 RNA ligase. In some embodiments, the ligase is a splintR ligase. In some embodiments, the ligase is a single stranded DNA ligase. In some embodiments, the ligase is a T4 DNA ligase. In some embodiments, the ligase is a ligase that has an DNA-splinted DNA ligase activity. In some embodiments, the ligase is a ligase that has an RNA-splinted DNA ligase activity.

In some embodiments, the ligation herein is a direct ligation. In some embodiments, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, e.g., separated by one or more intervening nucleotides or "gaps". In some embodiments, said ends are not ligated directly to each other, but instead occurs either via the intermediacy of one or more intervening (so-called "gap" or "gap-filling" (oligo) nucleotides) or by the extension of the 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo) nucleotide(s) which are complementary to a splint, padlock probe, or target nucleic acid. The gap may be a gap of 1 to 60 nucleotides or a gap of 1 to 40 nucleotides or a gap of 3 to 40 nucleotides. In specific embodiments, the gap may be a gap of about 1, 2, 3, 4, 5, 6, 7, 8, 9 or 10 or more nucleotides, of any integer (or range of integers) of nucleotides in between the indicated values. In some embodiments, the gap between said terminal regions may be filled by a gap oligonucleotide or by extending the 3' end of a polynucleotide. In some cases, ligation involves ligating the ends of the probe to at least one gap (oligo) nucleotide, such that the gap (oligo) nucleotide becomes incorporated into the resulting polynucleotide. In some embodiments, the ligation herein is preceded by gap filling. In other embodiments, the ligation herein does not require gap filling.

In some embodiments, ligation of the polynucleotides produces polynucleotides with melting temperature higher than that of unligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature ($T_m$) of the DNA strands. This selectively reduces the concentration of annealed mismatched substrates (expected to have a slightly lower $T_m$ around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some embodiments, the ligation herein is a proximity ligation of ligating two (or more) nucleic acid sequences that are in proximity with each other, e.g., through enzymatic means (e.g., a ligase). In some embodiments, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

(b) Primer Extension and Amplification

In some embodiments, a product that is a primer extension product can be generated using the various probes and probe sets (e.g., circular probe or circularizable probe or probe set) described herein.

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence. A primer extension reaction generally refers to any method where two nucleic acid sequences become linked (e.g., hybridized) by an overlap of their respective terminal complementary nucleic acid sequences (for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

In some embodiments, an amplification product of one or more polynucleotides, for instance, a circular probe or circularizable probe or probe set is generated. In some embodiments, the amplifying is achieved by performing rolling circle amplification (RCA). In other embodiments, a primer that hybridizes to the circular probe or circularized probe is added and used as such for amplification. In some embodiments, the RCA comprises a linear RCA, a branched RCA, a dendritic RCA, or any combination thereof. In some embodiments, the amplification is performed at a temperature between or between about 20° C. and about 60° C. In some embodiments, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C. In some embodiments, upon addition of a DNA polymerase in the presence of appropriate dNTP precursors and other cofactors, a primer is elongated to produce multiple copies of the circular template. This amplification step can utilize isothermal amplification or non-isothermal amplification. In some embodiments, after the formation of the hybridization complex and association of the amplification probe, the hybridization complex is rolling-circle amplified to generate a cDNA nanoball (e.g., amplicon) containing multiple copies of the cDNA. Techniques for rolling circle amplification (RCA) are known in the art such as linear RCA, a branched RCA, a dendritic RCA, or any combination thereof. (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49 (11): 2540-2550; Schweitzer et al. Proc. Natl Acad. Sci. USA 97:101 13-1 19, 2000; Faruqi et al, BMC Genomics 2:4, 2000; Nallur et al, Nucl. Acids Res. 29: el 18, 2001; Dean et al. Genome Res. 11:1095-1099, 2001; Schweitzer et al, Nature Biotech. 20:359-365, 2002; U.S. Pat. Nos. 6,054,274, 6,291,187, 6,323,009, 6,344,329 and 6,368,801). Exemplary polymerases for use in RCA comprise DNA polymerase such phi29 ((29) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some embodiments, the polymerase is phi29 DNA polymerase. In some embodiments, rolling circle amplification products can be generated using a polymerase selected from the group consisting of Phi29 DNA polymerase, Phi29-like DNA polymerase, M2 DNA polymerase, B103 DNA polymerase, GA-1 DNA polymerase, phi-PRD1 polymerase, Vent DNA polymerase, Deep Vent DNA polymerase, Vent (exo-) DNA polymerase, KlenTaq DNA polymerase, DNA polymerase I, Klenow fragment of DNA polymerase I, DNA polymerase III, T3 DNA polymerase, T4 DNA polymerase, T5 DNA polymerase, T7 DNA polymerase, Bst polymerase, rBST DNA polymerase, N29 DNA polymerase, TopoTaq DNA polymerase, T7 RNA polymerase, SP6 RNA polymerase, T3 RNA polymerase, and a variant or derivative thereof. In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some aspects, the amplification products comprises a modified nucleotide, such as an amine-modified nucleotide. In some embodiments, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification. In some aspects, the polynucleotides and/or amplification product (e.g., amplicon) can be anchored to a polymer matrix. For example, the polymer matrix can be a hydrogel. In some embodiments, one or more of the polynucleotide probe(s) can be modified to contain functional groups that can be used as an anchoring site to attach the polynucleotide probes and/or amplification product to a polymer matrix. Exemplary modification and polymer matrix that can be employed in accordance with the provided embodiments comprise those described in, for example, WO 2014/163886, WO 2017/079406, US 2016/0024555, US 2018/0251833 and US 2017/0219465. In some examples, the scaffold also contains modifications or functional groups that can react with or incorporate the modifications or functional groups of the probe set or amplification product. In some examples, the scaffold can comprise oligonucleotides, polymers or chemical groups, to provide a matrix and/or support structures. The amplification products may be immobilized within the matrix generally at the location of the nucleic acid being amplified, thereby creating a localized colony of amplicons. The amplification products may be immobilized within the matrix by steric factors. The amplification products may also be immobilized within the matrix by covalent or noncovalent bonding. In this manner, the amplification products may be considered to be attached to the matrix. By being immobilized to the matrix, such as by covalent bonding or cross-linking, the size and spatial relationship of the original amplicons is maintained. By being immobilized to the matrix, such as by covalent bonding or cross-linking, the amplification products are resistant to movement or unraveling under mechanical stress. In some aspects, the amplification products are copolymerized and/or covalently attached to the surrounding matrix thereby preserving their spatial relationship and any information inherent thereto. For example, if the amplification products are those generated from DNA or RNA within a cell embedded in the matrix, the amplification products can also be functionalized to form covalent attachment to the matrix preserving their spatial information within the cell thereby providing a subcellular localization distribution pattern. In some embodiments, the provided methods involve embedding the one or more polynucleotide probe sets and/or the amplification products in the presence of hydrogel subunits to form one or more hydrogel-embedded amplification products. In some embodiments, the hydrogel-tissue chemistry described comprises covalently attaching nucleic acids to in situ synthesized hydrogel for tissue clearing, enzyme diffusion, and multiple-cycle sequencing while an existing hydrogel-tissue chemistry method cannot. In some embodiments, to enable amplification product embedding in the tissue-hydrogel setting, amine-modified nucleotides are comprised in the amplification step (e.g., RCA), functionalized with an acrylamide moiety using acrylic acid N-hydroxysuccinimide esters, and copolymerized with acrylamide monomers to form a hydrogel. In some embodiments, a product herein includes a molecule or a complex generated in a series of reactions, e.g., hybridization, ligation, extension, replication, transcription/reverse transcription, and/or amplification (e.g., rolling circle amplification), in any suitable combination, generated using the probes described herein. For example, a product comprising a target sequence for a probe disclosed herein may be a hybridization complex formed of a cellular nucleic acid in a sample and an exogenously added nucleic acid probe. The exogenously added nucleic acid probe may comprise an overhang that does not hybridize to the cellular nucleic acid but hybridizes to another probe. The exogenously added nucleic acid probe may be optionally ligated to a cellular nucleic acid molecule or another exogenous nucleic acid molecule (e.g. the two portions of the target-specific adapter region may be ligated). In other examples, a product comprising a target sequence for a probe disclosed herein may be an RCA product of a circularizable probe or probe set which can be hybridized by a detectable probe.

V. DETECTION AND ANALYSIS

In some aspects, after formation of a hybridization complex comprising nucleic acid probes and/or probe sets (e.g., encoding probes) described in Section III and further processing (e.g., ligation, rolling circle amplification of a circularizable probe or probe set) as described in Section II and Section IV, the method further includes detection of the probe or probe set hybridized to the target nucleic acid (e.g., detection of an encoding probe or probe set) or any products generated therefrom or a derivative thereof (e.g., detection of an RCA product of the circularizable probe or probe set).

In any of the embodiments herein, the method can comprise imaging the biological sample to detect a ligation product or a circularized probe or product thereof. In any of the embodiments herein, a sequence of the ligation product, rolling circle amplification product, or other generated product can be analyzed in situ in the biological sample. In any of the embodiments herein, the imaging can comprise detecting a signal associated with a fluorescently labeled probe that directly or indirectly binds to a rolling circle amplification product of the circularized probe. In any of the embodiments herein, the sequence of the sequence of the ligation product, rolling circle amplification product, or other generated product can be analyzed by sequential hybridization, sequencing by hybridization, sequencing by ligation, sequencing by synthesis, sequencing by binding, or a combination thereof. In some cases, a spatially barcoded analyte (or a product or derivative thereof) can be released from an array prior to analysis.

In any of the embodiments herein, a sequence associated with the target nucleic acid or the circular probe(s) can comprise one or more barcode sequences or complements thereof. In any of the embodiments herein, the sequence of the rolling circle amplification product can comprise one or more barcode sequences or complements thereof. In any of the embodiments herein, a ligated first-second probe can comprise one or more barcode sequences or complements thereof. In any of the embodiments herein, the one or more barcode sequences can comprise a barcode sequence corresponding to the target nucleic acid. In any of the embodiments herein, the one or more barcode sequences can comprise a barcode sequence corresponding to the sequence of interest, such as variant(s) of a single nucleotide of interest.

In any of the embodiments herein, the detecting step can comprise contacting the biological sample with one or more detectably-labeled probes that directly or indirectly hybridize to the rolling circle amplification product, and dehybridizing the one or more detectably-labeled probes from the rolling circle amplification product. In any of the embodiments herein, the contacting and dehybridizing steps can be repeated with the one or more detectably-labeled probes and/or one or more other detectably-labeled probes that directly or indirectly hybridize to the rolling circle amplification product.

In some instances, the present disclosure relates to methods and compositions for encoding and detecting analytes in a temporally sequential manner for in situ analysis of an analyte in a biological sample, e.g., a target nucleic acid in a cell in an intact tissue. In some aspects, provided herein is a method for detecting the detectable probes (e.g., first or second detectable probes), thereby generating a signal signature. In some instances, the signal signature corresponds to an analyte of the plurality of analytes. In some instances, the methods described herein are based, in part, on the development of a multiplexed biological assay and readout, in which a sample is first contacted with a plurality of nucleic acid probes comprising one or more probe types (e.g., an encoding probe or probe set and/or a circular probe or circularizable probe or probe set), allowing the probes to directly or indirectly bind target analytes, which may then be optically detected (e.g., directly or indirectly by detectable probes) in a temporally-sequential manner. In some aspects, the method comprises sequential hybridization of detectable probes to create a spatiotemporal signal signature or code that identifies the analyte. For example, a signal signature may be generated from a plurality of fluorescently labeled probes that hybridizes to an intermediate probe associated with a circular or circularized probe.

In any of the embodiments herein, the detecting step can comprise contacting the biological sample with one or more first detectable probes that directly hybridize to the encoding probe or probe set. In some instances, the detecting step can comprise contacting the biological sample with one or more first detectable probes that indirectly hybridize to the encoding probe or probe set. In any of the embodiments herein, the detecting step can comprise contacting the biological sample with one or more first detectable probes that directly or indirectly hybridize to the circular probe or circularizable probe or probe set. In any of the embodiments herein, the detecting step can comprise contacting the biological sample with one or more first detectable probes that hybridize to the circular probe or circularizable probe or probe set (prior to performing an amplification reaction). In any of the embodiments herein, the detecting step can comprise second detectable probe that directly or indirectly hybridize to the rolling circle amplification product generated using the circular probe or circularizable probe or probe set.

In any of the embodiments herein, the detecting step can comprise contacting the biological sample with one or more intermediate probes that directly or indirectly hybridize to the rolling circle amplification product, wherein the one or more intermediate probes are detectable using one or more detectably-labeled probes. In any of the embodiments herein, the detecting step can further comprise dehybridizing the one or more intermediate probes and/or the one or more detectably-labeled probes from the rolling circle amplification product. In any of the embodiments herein, the contacting and dehybridizing steps can be repeated with the one or more intermediate probes, the one or more detectably-labeled probes, one or more other intermediate probes, and/or one or more other detectably-labeled probes.

Methods for binding and identifying a target nucleic acid that use various probes or oligonucleotides have been described in, e.g., US2003/0013091, US2007/0166708, US2010/0015607, US2010/0261026, US2010/0262374, US2010/0112710, US2010/0047924, and US2014/0371088, each of which is incorporated herein by reference in its entirety. Detectably-labeled probes can be useful for detecting multiple target nucleic acids and be detected in one or more hybridization cycles (e.g., sequential hybridization assays, or sequencing by hybridization).

In some embodiments, the detecting can comprise binding an intermediate probe directly or indirectly to the primary probe or probe set, binding a detectably labeled probe directly or indirectly to a detection region of the intermediate probe, and detecting a signal associated with the detectably labeled probe. In some embodiments, the method comprises detecting a rolling circle amplification product (RCP) generated using a circular or circularized primary probe or probe set as a template. In some embodiments, the method comprises detecting a rolling circle amplification product (RCP) generated using a circular or circularized probe or probe that binds to a primary probe or probe set as a template. In some embodiments, detecting the RCP comprises binding an intermediate probe directly or indirectly to the RCP, binding a detectably labeled probe directly or indirectly to a detection region of the intermediate probe, and detecting a signal associated with the detectably labeled probe. In some embodiments, the method can comprise performing one or more wash steps to remove unbound and/or nonspecifically bound intermediate probe molecules from the primary probes or the products of the primary probes.

In some embodiments, the detecting can comprise: detecting signals associated with detectably labeled probes that are hybridized to barcode regions or complements thereof in the RCA product, and/or detecting signals associated with detectably labeled probes that are hybridized to intermediate probes which are in turn hybridized to the barcode regions or complements thereof. In some embodiments, the detectably labeled probes can be fluorescently labeled. In any of the embodiments herein, detecting the barcode sequences or complements thereof can further comprise: contacting the test biological sample with the universal pool of detectably labeled probes and a second pool of intermediate probes, wherein the intermediate probes of the second pool of intermediate probes comprise hybridization regions complementary to the barcode sequences or complements thereof and reporter regions complementary to a detectably labeled probe of the universal pool of detectably labeled probes; and detecting complexes formed between the barcode sequences or complements thereof, the intermediate probes of the second pool of intermediate probes, and the detectably labeled probes.

In any of the embodiments herein, each barcode sequence or complement thereof can be assigned a sequence of signal codes that identifies the barcode sequence or complement thereof, and detecting the barcode sequences or complements thereof can comprise decoding the barcode sequences or complements thereof by detecting the corresponding sequences of signal codes detected from sequential hybridization, detection, and removal of sequential pools of intermediate probes and the universal pool of detectably labeled probes.

In some embodiments, the detection may be spatial, e.g., in two or three dimensions. In some embodiments, the detection may be quantitative, e.g., the amount or concentration of a primary nucleic acid probe (and of a target nucleic acid) may be determined. In some embodiments, the primary probes, secondary probes, higher order probes, and/or detectably labeled probes may comprise any of a variety of entities able to hybridize a nucleic acid, e.g., DNA, RNA, LNA, and/or PNA, etc., depending on the application.

In some embodiments, a method disclosed herein may also comprise one or more signal amplification components. In some embodiments, the present disclosure relates to the detection of nucleic acids sequences in situ using probe hybridization and generation of amplified signals associated with the probes, wherein background signal is reduced and sensitivity is increased. In some embodiments, the RCA product generated using a method disclosed herein can be detected in with a method that comprises signal amplification. In some embodiments, signal amplification may comprise use of the encoding probe or probe set and/or circular probe or circularizable probe or probe set.

Exemplary signal amplification methods include targeted deposition of detectable reactive molecules around the site of probe hybridization, targeted assembly of branched structures (e.g., bDNA or branched assay using locked nucleic acid (LNA)), programmed in situ growth of concatemers by enzymatic rolling circle amplification (RCA) (e.g., as described in US 2019/0055594 incorporated herein by reference), hybridization chain reaction, assembly of topologically catenated DNA structures using serial rounds of chemical ligation (clampFISH), signal amplification via hairpin-mediated concatemerization (e.g., as described in US 2020/0362398 incorporated herein by reference), e.g., primer exchange reactions such as signal amplification by exchange reaction (SABER) or SABER with DNA-Exchange (Exchange-SABER). In some embodiments, a non-enzymatic signal amplification method may be used.

The detectable reactive molecules may comprise tyramide, such as used in tyramide signal amplification (TSA) or multiplexed catalyzed reporter deposition (CARD)-FISH. In some embodiments, the detectable reactive molecule may be releasable and/or cleavable from a detectable label such as a fluorophore. In some embodiments, a method disclosed herein comprises multiplexed analysis of a biological sample comprising consecutive cycles of probe hybridization, fluorescence imaging, and signal removal, where the signal removal comprises removing the fluorophore from a fluorophore-labeled reactive molecule (e.g., tyramide). Exemplary detectable reactive reagents and methods are described in U.S. Pat. No. 6,828,109, US 2019/0376956, WO 2019/236841, WO 2020/102094, WO 2020/163397, and WO 2021/067475, all of which are incorporated herein by reference in their entireties.

In some embodiments, hybridization chain reaction (HCR) can be used for signal amplification. HCR is an enzyme-free nucleic acid amplification based on a triggered chain of hybridization of nucleic acid molecules starting from HCR monomers, which hybridize to one another to form a nicked nucleic acid polymer. This polymer is the product of the HCR reaction which is ultimately detected in order to indicate the presence of the target analyte. HCR is described in detail in Dirks and Pierce, 2004, PNAS, 101 (43), 15275-15278 and in U.S. Pat. Nos. 7,632,641 and 7,721,721 (see also US 2006/00234261; Chemeris et al, 2008 Doklady Biochemistry and Biophysics, 419, 53-55; Niu et al, 2010, 46, 3089-3091; Choi et al, 2010, Nat. Biotechnol. 28 (11), 1208-1212; and Song et al, 2012, Analyst, 137, 1396-1401). HCR monomers typically comprise a hairpin, or other metastable nucleic acid structure. In the simplest form of HCR, two different types of stable hairpin monomer, referred to here as first and second HCR monomers, undergo a chain reaction of hybridization events to form a long nicked double-stranded DNA molecule when an "initiator" nucleic acid molecule is introduced. The HCR monomers have a hairpin structure comprising a double stranded stem region, a loop region connecting the two strands of the stem region, and a single stranded region at one end of the double stranded stem region. The single stranded region which is exposed (and which is thus available for hybridization to another molecule, e.g. initiator or other HCR monomer) when the monomers are in the hairpin structure may be known as the "toehold region" (or "input domain"). The first HCR monomers each further comprise a sequence which is complementary to a sequence in the exposed toehold region of the second HCR monomers. This sequence of complementarity in the first HCR monomers may be known as the "interacting region" (or "output domain"). Similarly, the second HCR monomers each comprise an interacting region (output domain), e.g. a sequence which is complementary to the exposed toehold region (input domain) of the first HCR monomers. In the absence of the HCR initiator, these interacting regions are protected by the secondary structure (e.g. they are not exposed), and thus the hairpin monomers are stable or kinetically trapped (also referred to as "metastable"), and remain as monomers (e.g. preventing the system from rapidly equilibrating), because the first and second sets of HCR monomers cannot hybridize to each other. However, once the initiator is introduced, it is able to hybridize to the exposed toehold region of a first HCR monomer, and invade it, causing it to open up. This exposes the interacting region of the first HCR monomer (e.g. the sequence of complementarity to the toehold region of the second HCR monomers), allowing it to hybridize to and invade a second HCR monomer at the toehold region. This hybridization and invasion in turn opens up the second HCR monomer, exposing its interacting region (which is complementary to the toehold region of the first HCR monomers), and allowing it to hybridize to and invade another first HCR monomer. The reaction continues in this manner until all of the HCR monomers are exhausted (e.g. all of the HCR monomers are incorporated into a polymeric chain). Ultimately, this chain reaction leads to the formation of a nicked chain of alternating units of the first and second monomer species. The presence of the HCR initiator is thus required in order to trigger the HCR reaction by hybridization to and invasion of a first HCR monomer. The first and second HCR monomers are designed to hybridize to one another are thus may be defined as cognate to one another. They are also cognate to a given HCR initiator sequence. HCR monomers which interact with one another (hybridize) may be described as a set of HCR monomers or an HCR monomer, or hairpin, system.

An HCR reaction could be carried out with more than two species or types of HCR monomers. For example, a system involving three HCR monomers could be used. In such a system, each first HCR monomer may comprise an interacting region which binds to the toehold region of a second HCR monomer; each second HCR may comprise an interacting region which binds to the toehold region of a third HCR monomer; and each third HCR monomer may comprise an interacting region which binds to the toehold region of a first HCR monomer. The HCR polymerization reaction would then proceed as described above, except that the resulting product would be a polymer having a repeating unit of first, second and third monomers consecutively. Corresponding systems with larger numbers of sets of HCR monomers could readily be conceived. Branching HCR systems have also been devised and described (see, e.g., WO 2020/123742 incorporated herein by reference), and may be used in the methods herein.

In some embodiments, similar to HCR reactions that use hairpin monomers, linear oligo hybridization chain reaction (LO-HCR) can also be used for signal amplification. In some embodiments, provided herein is a method of detecting an analyte in a sample comprising: (i) performing a linear oligo hybridization chain reaction (LO-HCR), wherein an initiator is contacted with a plurality of LO-HCR monomers of at least a first and a second species to generate a polymeric LO-HCR product hybridized to a target nucleic acid molecule, wherein the first species comprises a first hybridization region complementary to the initiator and a second hybridization region complementary to the second species, wherein the first species and the second species are linear, single-stranded nucleic acid molecules; wherein the initiator is provided in one or more parts, and hybridizes directly or indirectly to or is comprised in the target nucleic acid molecule; and (ii) detecting the polymeric product, thereby detecting the analyte. In some embodiments, the first species and/or the second species may not comprise a hairpin structure. In some embodiments, the plurality of LO-HCR monomers may not comprise a metastable secondary structure. In some embodiments, the LO-HCR polymer may not comprise a branched structure. In some embodiments, performing the linear oligo hybridization chain reaction comprises contacting the target nucleic acid molecule with the initiator to provide the initiator hybridized to the target nucleic acid molecule. In any of the embodiments herein, the target nucleic acid molecule and/or the analyte can be an RCA product.

In some embodiments, detection of nucleic acids sequences in situ includes combination of RCA with an assembly for branched signal amplification. In some embodiments, the assembly complex comprises an amplifier hybridized directly or indirectly (via one or more oligonucleotides) to a sequence of the RCA product. In some embodiments, the assembly includes one or more amplifiers each including an amplifier repeating sequence. In some aspects, the one or more amplifiers is labeled. Described herein is a method of using the aforementioned assembly, including for example, using the assembly in multiplexed error-robust fluorescent in situ hybridization (MERFISH) applications, with branched DNA amplification for signal readout. In some embodiments, the amplifier repeating sequence is about 5-30 nucleotides, and is repeated N times in the amplifier. In some embodiments, the amplifier repeating sequence is about 20 nucleotides, and is repeated at least two times in the amplifier. In some aspects, the one or more amplifier repeating sequence is labeled. For exemplary branched signal amplification, see e.g., U.S. Pat. Pub. No.

US20200399689A1 and Xia et al., Multiplexed Detection of RNA using MERFISH and branched DNA amplification. Scientific Reports (2019), each of which is fully incorporated by reference herein.

In some embodiments, the RCA product can be detected in with a method that comprises signal amplification by performing a primer exchange reaction (PER). In various embodiments, a primer with domain on its 3' end binds to a catalytic hairpin, and is extended with a new domain by a strand displacing polymerase. For example, a primer with domain 1 on its 3' ends binds to a catalytic hairpin, and is extended with a new domain 1 by a strand displacing polymerase, with repeated cycles generating a concatemer of repeated domain 1 sequences. In various embodiments, the strand displacing polymerase is Bst. In various embodiments, the catalytic hairpin includes a stopper which releases the strand displacing polymerase. In various embodiments, branch migration displaces the extended primer, which can then dissociate. In various embodiments, the primer undergoes repeated cycles to form a concatemer primer. In various embodiments, a plurality of concatemer primers is contacted with a sample comprising RCA products generated using methods described herein. In various embodiments, the RCA product may be contacted with a plurality of concatemer primers and a plurality of labeled probes. see e.g., U.S. Pat. Pub. No. US20190106733, which is incorporated herein by reference, for exemplary molecules and PER reaction components.

In some embodiments, the methods comprise sequencing all or a portion of the amplification product, such as one or more barcode sequences present in the amplification product.

In some embodiments, the product or derivative of a first and second probe ligated together after hybridizing to the target nucleic acid can be analyzed by sequencing. In some embodiments, the analysis and/or sequence determination comprises sequencing all or a portion of the amplification product or the probe(s) and/or in situ hybridization to the amplification product or the probe(s). In some embodiments, the sequencing step involves sequencing by hybridization, sequencing by ligation, and/or fluorescent in situ sequencing, hybridization-based in situ sequencing and/or wherein the in situ hybridization comprises sequential fluorescent in situ hybridization. In some embodiments, the analysis and/or sequence determination comprises detecting a polymer generated by a hybridization chain reaction (HCR) reaction, see e.g., US 2017/0009278, which is incorporated herein by reference, for exemplary probes and HCR reaction components. In some embodiments, the detection or determination comprises hybridizing to the amplification product a detection oligonucleotide labeled with a fluorophore, an isotope, a mass tag, or a combination thereof. In some embodiments, the detection or determination comprises imaging the amplification product. In some embodiments, the target nucleic acid is an mRNA in a tissue sample, and the detection or determination is performed when the target nucleic acid and/or the amplification product is in situ in the tissue sample.

In some aspects, the provided methods comprise imaging the amplification product (e.g., amplicon) and/or one or more portions of the polynucleotides, for example, via binding of the detection probe and detecting the detectable label. In some embodiments, the detection probe comprises a detectable label that can be measured and quantitated. The terms "label" and "detectable label" comprise a directly or indirectly detectable moiety that is associated with (e.g., conjugated to) a molecule to be detected, e.g., a detectable probe, comprising, but not limited to, fluorophores, radioactive isotopes, fluorescers, chemiluminescers, enzymes, enzyme substrates, enzyme cofactors, enzyme inhibitors, chromophores, dyes, metal ions, metal sols, ligands (e.g., biotin or haptens) and the like.

The term "fluorophore" comprises a substance or a portion thereof that is capable of exhibiting fluorescence in the detectable range. Particular examples of labels that may be used in accordance with the provided embodiments comprise, but are not limited to phycoerythrin, Alexa dyes, fluorescein, YPet, CyPet, Cascade blue, allophycocyanin, Cy3, Cy5, Cy7, rhodamine, dansyl, umbelliferone, Texas red, luminol, acradimum esters, biotin, green fluorescent protein (GFP), enhanced green fluorescent protein (EGFP), yellow fluorescent protein (YFP), enhanced yellow fluorescent protein (EYFP), blue fluorescent protein (BFP), red fluorescent protein (RFP), firefly luciferase, Renilla luciferase, NADPH, beta-galactosidase, horseradish peroxidase, glucose oxidase, alkaline phosphatase, chloramphenical acetyl transferase, and urease.

Fluorescence detection in tissue samples can often be hindered by the presence of strong background fluorescence. "Autofluorescence" is the general term used to distinguish background fluorescence (that can arise from a variety of sources, including aldehyde fixation, extracellular matrix components, red blood cells, lipofuscin, and the like) from the desired immunofluorescence from the fluorescently labeled antibodies or probes. Tissue autofluorescence can lead to difficulties in distinguishing the signals due to fluorescent antibodies or probes from the general background. In some embodiments, a method disclosed herein utilizes one or more agents to reduce tissue autofluorescence, for example, Autofluorescence Eliminator (Sigma/EMD Millipore), TrueBlack Lipofuscin Autofluorescence Quencher (Biotium), MaxBlock Autofluorescence Reducing Reagent Kit (MaxVision Biosciences), and/or a very intense black dye (e.g., Sudan Black, or comparable dark chromophore).

In some embodiments, a detectable probe containing a detectable label can be used to detect one or more polynucleotide(s) and/or amplification products (e.g., amplicon) described herein. In some embodiments, the methods involve incubating the detectable probe containing the detectable label with the sample, washing unbound detectable probe, and detecting the label, e.g., by imaging.

Examples of detectable labels comprise but are not limited to various radioactive moieties, enzymes, prosthetic groups, fluorescent markers, luminescent markers, bioluminescent markers, metal particles, protein-protein binding pairs and protein-antibody binding pairs. Examples of fluorescent proteins comprise, but are not limited to, yellow fluorescent protein (YFP), green fluorescence protein (GFP), cyan fluorescence protein (CFP), umbelliferone, fluorescein, fluorescein isothiocyanate, rhodamine, dichlorotriazinylamine fluorescein, dansyl chloride and phycoerythrin.

Examples of bioluminescent markers comprise, but are not limited to, luciferase (e.g., bacterial, firefly and click beetle), luciferin, aequorin and the like. Examples of enzyme systems having visually detectable signals comprise, but are not limited to, galactosidases, glucorimidases, phosphatases, peroxidases and cholinesterases. Identifiable markers also comprise radioactive compounds such as $^{125}$I, $^{35}$S, $^{14}$C, or $^{3}$H. Identifiable markers are commercially available from a variety of sources.

Examples of fluorescent labels and nucleotides and/or polynucleotides conjugated to such fluorescent labels comprise those described in, for example, Hoagland, Handbook of Fluorescent Probes and Research Chemicals, Ninth Edition (Molecular Probes, Inc., Eugene, 2002); Keller and Manak, DNA Probes, 2nd Edition (Stockton Press, New York, 1993); Eckstein, editor, Oligonucleotides and Analogues: A Practical Approach (IRL Press, Oxford, 1991); and Wetmur, Critical Reviews in Biochemistry and Molecular Biology, 26:227-259 (1991). In some embodiments, exemplary techniques and methods methodologies applicable to the provided embodiments comprise those described in, for example, U.S. Pat. Nos. 4,757,141, 5,151,507 and 5,091,519. In some embodiments, one or more fluorescent dyes are used as labels for labeled target sequences, for example, as described in U.S. Pat. No. 5,188,934 (4,7-dichlorofluorescein dyes); U.S. Pat. No. 5,366,860 (spectrally resolvable rhodamine dyes); U.S. Pat. No. 5,847,162 (4,7-dichlororhodamine dyes); U.S. Pat. No. 4,318,846 (ether-substituted fluorescein dyes); U.S. Pat. No. 5,800,996 (energy transfer dyes); U.S. Pat. No. 5,066,580 (xanthine dyes); and U.S. Pat. No. 5,688,648 (energy transfer dyes). Labelling can also be carried out with quantum dots, as described in U.S. Pat. Nos. 6,322,901, 6,576,291, 6,423,551, 6,251,303, 6,319,426, 6,426,513, 6,444,143, 5,990,479, 6,207,392, US 2002/0045045 and US 2003/0017264. As used herein, the term "fluorescent label" comprises a signaling moiety that conveys information through the fluorescent absorption and/or emission properties of one or more molecules. Exemplary fluorescent properties comprise fluorescence intensity, fluorescence lifetime, emission spectrum characteristics and energy transfer.

Examples of commercially available fluorescent nucleotide analogues readily incorporated into nucleotide and/or polynucleotide sequences comprise, but are not limited to, Cy3-dCTP, Cy3-dUTP, Cy5-dCTP, Cy5-dUTP (Amersham Biosciences, Piscataway, N.J.), fluorescein-! 2-dUTP, tetramethylrhodamine-6-dUTP, TEXAS RED™-5-dUTP, CASCADE BLUE™-7-dUTP, BODIPY TMFL-14-dUTP, BODIPY TMR-14-dUTP, BODIPY TMTR-14-dUTP, RHOD AMINE GREEN™-5-dUTP, OREGON GREENR™ 488-5-dUTP, TEXAS RED™-12-dUTP, BODIPY™ 630/650-14-dUTP, BODIPY™ 650/665-14-dUTP, ALEXA FLUOR™ 488-5-dUTP, ALEXA FLUOR™ 532-5-dUTP, ALEXA FLUOR™ 568-5-dUTP, ALEXA FLUOR™ 594-5-dUTP, ALEXA FLUOR™ 546-14-dUTP, fluorescein-12-UTP, tetramethylrhodamine-6-UTP, TEXAS RED™-5-UTP, mCherry, CASCADE BLUE™-7-UTP, BODIPY™ FL-14-UTP, BODIPY TMR-14-UTP, BODIPY™ TR-14-UTP, RHOD AMINE GREEN™-5-UTP, ALEXA FLUOR™ 488-5-UTP, and ALEXA FLUOR™ 546-14-UTP (Molecular Probes, Inc. Eugene, Oreg.). Methods are known for custom synthesis of nucleotides having other fluorophores (See, Henegariu et al. (2000) Nature Biotechnol. 18:345).

Other fluorophores available for post-synthetic attachment comprise, but are not limited to, ALEXA FLUOR™ 350, ALEXA FLUOR™ 532, ALEXA FLUOR™ 546, ALEXA FLUOR™ 568, ALEXA FLUOR™ 594, ALEXA FLUOR™ 647, BODIPY 493/503, BODIPY FL, BODIPY R6G, BODIPY 530/550, BODIPY TMR, BODIPY 558/568, BODIPY 558/568, BODIPY 564/570, BODIPY 576/589, BODIPY 581/591, BODIPY 630/650, BODIPY 650/665, Cascade Blue, Cascade Yellow, Dansyl, lissamine rhodamine B, Marina Blue, Oregon Green 488, Oregon Green 514, Pacific Blue, rhodamine 6G, rhodamine green, rhodamine red, tetramethyl rhodamine, Texas Red (available from Molecular Probes, Inc., Eugene, Oreg.), Cy2, Cy3.5, Cy5.5, and Cy7 (Amersham Biosciences, Piscataway, N.J.). FRET tandem fluorophores may also be used, comprising, but not limited to, PerCP-Cy5.5, PE-Cy5, PE-Cy5.5, PE-Cy7, PE-Texas Red, APC-Cy7, PE-Alexa dyes (610, 647, 680), and APC-Alexa dyes.

In some cases, metallic silver or gold particles may be used to enhance signal from fluorescently labeled nucleotide and/or polynucleotide sequences (Lakowicz et al. (2003) Bio Techniques 34:62).

Biotin, or a derivative thereof, may also be used as a label on a nucleotide and/or a polynucleotide sequence, and subsequently bound by a detectably labeled avidin/streptavidin derivative (e.g., phycoerythrin-conjugated streptavidin), or a detectably labeled anti-biotin antibody. Digoxigenin may be incorporated as a label and subsequently bound by a detectably labeled anti-digoxigenin antibody (e.g., fluoresceinated anti-digoxigenin). An aminoallyl-dUTP residue may be incorporated into a polynucleotide sequence and subsequently coupled to an N-hydroxy succinimide (NHS) derivatized fluorescent dye. In general, any member of a conjugate pair may be incorporated into a detection polynucleotide provided that a detectably labeled conjugate partner can be bound to permit detection. As used herein, the term antibody refers to an antibody molecule of any class, or any sub-fragment thereof, such as a Fab.

Other suitable labels for a polynucleotide sequence may comprise fluorescein (FAM), digoxigenin, dinitrophenol (DNP), dansyl, biotin, bromodeoxyuridine (BrdU), hexahistidine (6×His), and phosphor-amino acids (e.g., P-tyr, P-ser, P-thr). In some embodiments the following hapten/antibody pairs are used for detection, in which each of the antibodies is derivatized with a detectable label: biotin/a-biotin, digoxigenin/a-digoxigenin, dinitrophenol (DNP)/a-DNP, 5-Carboxyfluorescein (FAM)/a-FAM.

In some embodiments, a nucleotide and/or an polynucleotide sequence can be indirectly labeled, especially with a hapten that is then bound by a capture agent, e.g., as disclosed in U.S. Pat. Nos. 5,344,757, 5,702,888, 5,354,657, 5,198,537 and 4,849,336, and PCT publication WO 91/17160. Many different hapten-capture agent pairs are available for use. Exemplary haptens comprise, but are not limited to, biotin, des-biotin and other derivatives, dinitrophenol, dansyl, fluorescein, Cy5, and digoxigenin. For biotin, a capture agent may be avidin, streptavidin, or antibodies. Antibodies may be used as capture agents for the other haptens (many dye-antibody pairs being commercially available, e.g., Molecular Probes, Eugene, Oreg.).

In some aspects, the detecting involves using detection methods such as flow cytometry; sequencing; probe binding and electrochemical detection; pH alteration; catalysis induced by enzymes bound to DNA tags; quantum entanglement; Raman spectroscopy; terahertz wave technology; and/or scanning electron microscopy. In some aspects, the flow cytometry is mass cytometry or fluorescence-activated flow cytometry. In some aspects, the detecting comprises performing microscopy, scanning mass spectrometry or other imaging techniques described herein. In such aspects, the detecting comprises determining a signal, e.g., a fluorescent signal.

In some aspects, the detection (comprising imaging) is carried out using any of a number of different types of microscopy, e.g., confocal microscopy, two-photon microscopy, light-field microscopy, intact tissue expansion microscopy, and/or CLARITY™-optimized light sheet microscopy (COLM).

In some embodiments, fluorescence microscopy is used for detection and imaging of the detection probe. In some aspects, a fluorescence microscope is an optical microscope that uses fluorescence and phosphorescence instead of, or in addition to, reflection and absorption to study properties of organic or inorganic substances. In fluorescence microscopy, a sample is illuminated with light of a wavelength which excites fluorescence in the sample. The fluoresced light, which is usually at a longer wavelength than the illumination, is then imaged through a microscope objective. Two filters may be used in this technique; an illumination (or excitation) filter which ensures the illumination is near monochromatic and at the correct wavelength, and a second emission (or barrier) filter which ensures none of the excitation light source reaches the detector. Alternatively, these functions may both be accomplished by a single dichroic filter. The "fluorescence microscope" comprises any microscope that uses fluorescence to generate an image, whether it is a more simple set up like an epifluorescence microscope, or a more complicated design such as a confocal microscope, which uses optical sectioning to get better resolution of the fluorescent image.

In some embodiments, confocal microscopy is used for detection and imaging of the detection probe. Confocal microscopy uses point illumination and a pinhole in an optically conjugate plane in front of the detector to eliminate out-of-focus signal. As only light produced by fluorescence very close to the focal plane can be detected, the image's optical resolution, particularly in the sample depth direction, is much better than that of wide-field microscopes. However, as much of the light from sample fluorescence is blocked at the pinhole, this increased resolution is at the cost of decreased signal intensity-so long exposures are often required. As only one point in the sample is illuminated at a time, 2D or 3D imaging requires scanning over a regular raster (i.e., a rectangular pattern of parallel scanning lines) in the specimen. The achievable thickness of the focal plane is defined mostly by the wavelength of the used light divided by the numerical aperture of the objective lens, but also by the optical properties of the specimen. The thin optical sectioning possible makes these types of microscopes particularly good at 3D imaging and surface profiling of samples. CLARITY™-optimized light sheet microscopy (COLM) provides an alternative microscopy for fast 3D imaging of large clarified samples. COLM interrogates large immunostained tissues, permits increased speed of acquisition and results in a higher quality of generated data.

Other types of microscopy that can be employed comprise bright field microscopy, oblique illumination microscopy, dark field microscopy, phase contrast, differential interference contrast (DIC) microscopy, interference reflection microscopy (also known as reflected interference contrast, or RIC), single plane illumination microscopy (SPIM), super-resolution microscopy, laser microscopy, electron microscopy (EM), Transmission electron microscopy (TEM), Scanning electron microscopy (SEM), reflection electron microscopy (REM), Scanning transmission electron microscopy (STEM) and low-voltage electron microscopy (LVEM), scanning probe microscopy (SPM), atomic force microscopy (ATM), ballistic electron emission microscopy (BEEM), chemical force microscopy (CFM), conductive atomic force microscopy (C-AFM), electrochemical scanning tunneling microscope (ECS™), electrostatic force microscopy (EFM), fluidic force microscope (FluidFM), force modulation microscopy (FMM), feature-oriented scanning probe microscopy (FOSPM), kelvin probe force microscopy (KPFM), magnetic force microscopy (MFM), magnetic resonance force microscopy (MRFM), near-field scanning optical microscopy (NSOM) (or SNOM, scanning near-field optical microscopy, SNOM, Piezoresponse Force Microscopy (PFM), PS™, photon scanning tunneling microscopy (PS™), PTMS, photothermal microspectroscopy/microscopy (PTMS), SCM, scanning capacitance microscopy (SCM), SECM, scanning electrochemical microscopy (SECM), SGM, scanning gate microscopy (SGM), SHPM, scanning Hall probe microscopy (SHPM), SICM, scanning ion-conductance microscopy (SICM), SPSM spin polarized scanning tunneling microscopy (SPSM), SSRM, scanning spreading resistance microscopy (SSRM), SThM, scanning thermal microscopy (SThM), STM, scanning tunneling microscopy (STM), STP, scanning tunneling potentiometry (STP), SVM, scanning voltage microscopy (SVM), and synchrotron x-ray scanning tunneling microscopy (SXS™), and intact tissue expansion microscopy (exM).

In some embodiments, sequencing can be performed in situ. In situ sequencing typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (i.e., nucleotide sequence) of the incorporated nucleotides or labeled primer extension products can be determined, and consequently, the nucleotide sequence of the corresponding template nucleic acid. Aspects of in situ sequencing are described, for example, in Mitra et al., (2003) *Anal. Biochem.* 320, 55-65, and Lee et al., (2014) *Science,* 343 (6177), 1360-1363. In addition, examples of methods and systems for performing in situ sequencing are described in US 2016/0024555, US 2019/0194709, and in U.S. Pat. Nos. 10,138,509, 10,494,662 and 10,179,932. Exemplary techniques for in situ sequencing comprise, but are not limited to, STARmap (described for example in Wang et al., (2018) *Science,* 361 (6499) 5691), MERFISH (described for example in Moffitt, (2016) *Methods in Enzymology,* 572, 1-49), hybridization-based in situ sequencing (HybISS) (described for example in Gyllborg et al., Nucleic Acids Res (2020) 48 (19): e112, and FISSEQ (described for example in US 2019/0032121). In some cases, sequencing can be performed after the analytes are released from the biological sample.

In some embodiments, sequencing can be performed by sequencing-by-synthesis (SBS). In some embodiments, a sequencing primer is complementary to sequences at or near the one or more barcode(s). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/005986, US 2005/0100900, U.S. Pat. No. 9,217,178, US 2009/0118128, US 2012/0270305, US 2013/0260372, and US 2013/0079232.

In some embodiments, sequencing can be performed by sequential fluorescence hybridization (e.g., sequencing by hybridization). Sequential fluorescence hybridization can involve sequential hybridization of detection probes comprising an oligonucleotide and a detectable label.

In some embodiments, sequencing can be performed using single molecule sequencing by ligation. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al. Science (2005), 309:1728-1732, and in U.S. Pat. Nos. 5,599,675; 5,750,341; 6,969,488; 6,172,218; and 6,306,597.

In some embodiments, the barcodes of the probes (e.g., encoding probe or probe set; circular probe or circularizable probe or probe set) or complements or products thereof are targeted by detectably labeled detection oligonucleotides, such as fluorescently labeled oligonucleotides. In some embodiments, one or more decoding schemes are used to decode the signals, such as fluorescence, for sequence determination. In any of the embodiments herein, barcodes (e.g., primary and/or secondary barcode sequences) can be analyzed (e.g., detected or sequenced) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), hybridization-based in situ sequencing (HybISS), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides or detectable probes). Exemplary decoding schemes are described in Eng et al., "Transcriptome-scale Super-Resolved Imaging in Tissues by RNA SeqFISH+," *Nature* 568 (7751): 235-239 (2019); Chen et al., *Science;* 348 (6233): aaa6090 (2015); Gyllborg et al., *Nucleic Acids Res* (2020) 48 (19): e112; U.S. Pat. No. 10,457,980 B2; US 2016/0369329 A1; WO 2018/026873 A1; and US 2017/0220733 A1, all of which are incorporated by reference in their entirety. In some embodiments, these assays enable signal amplification, combinatorial decoding, and error correction schemes at the same time.

In some embodiments, nucleic acid hybridization can be used for sequencing. These methods utilize labeled nucleic acid decoder probes that are complementary to at least a portion of a barcode sequence. Multiplex decoding can be performed with pools of many different probes with distinguishable labels. Non-limiting examples of nucleic acid hybridization sequencing are described for example in U.S. Pat. No. 8,460,865, and in Gunderson et al., *Genome Research* 14:870-877 (2004).

In some embodiments, real-time monitoring of DNA polymerase activity can be used during sequencing. For example, nucleotide incorporations can be detected through fluorescence resonance energy transfer (FRET), as described for example in Levene et al., *Science* (2003), 299, 682-686, Lundquist et al., *Opt. Lett.* (2008), 33, 1026-1028, and Korlach et al., *Proc. Natl. Acad. Sci. USA* (2008), 105, 1176-1181.

In some aspects, the analysis and/or sequence determination can be carried out at room temperature for best preservation of tissue morphology with low background noise and error reduction. In some embodiments, the analysis and/or sequence determination comprises eliminating error accumulation as sequencing proceeds.

In some embodiments, the analysis and/or sequence determination involves washing to remove unbound polynucleotides, thereafter revealing a fluorescent product for imaging.

VI. COMPOSITIONS AND KITS

Also provided herein are kits, for example comprising one or more nucleic acid probes disclosed herein, for example in Section III. In some embodiments, the kit comprises a plurality of encoding probes or probe sets and a plurality of circular or circularizable probes or probe sets, and reagents for performing the methods provided herein, for example reagents required for one or more steps comprising hybridization, ligation, amplification, detection (e.g., a plurality of first and/or second detectable probes), and/or sample preparation as described herein. In some embodiments, the kit further comprises a target nucleic acid. In some embodiments, any or all of the polynucleotides are DNA molecules. In some embodiments, the target nucleic acid is a messenger RNA molecule.

The various components of the kit may be present in separate containers or certain compatible components may be pre-combined into a single container. In some embodiments, the kits further contain instructions for using the components of the kit to practice the provided methods.

In some embodiments, the kits can contain reagents and/or consumables required for performing one or more steps of the provided methods. In some embodiments, the kits contain reagents for fixing, embedding, and/or permeabilizing the biological sample. In some embodiments, the kits contain reagents, such as enzymes and buffers for ligation and/or amplification, such as ligases and/or polymerases. In some aspects, the kit can also comprise any of the reagents described herein, e.g., wash buffer and ligation buffer. In some embodiments, the kits contain reagents for detection and/or sequencing, such as detectable probes or detectable labels. In some embodiments, the kits optionally contain other components, for example nucleic acid primers, enzymes and reagents, buffers, nucleotides, reagents for additional assays.

In some aspects, the provided embodiments can be applied in an in situ method of analyzing nucleic acid sequences, such as an in situ transcriptomic analysis, for example from intact tissues or samples in which the spatial information has been preserved. In some aspects, the embodiments can be applied in an imaging or detection method for multiplexed nucleic acid analysis. In some aspects, the provided embodiments can be used to identify or detect regions of interest in target nucleic acids.

In some aspects, the embodiments can be applied in investigative and/or diagnostic applications, for example, for characterization or assessment of particular cell or a tissue from a subject. Applications of the provided method can comprise biomedical research and clinical diagnostics. For example, in biomedical research, applications comprise, but are not limited to, spatially resolved gene expression analysis for biological investigation or drug screening. In clinical diagnostics, applications comprise, but are not limited to, detecting gene markers such as disease, immune responses, bacterial or viral DNA/RNA for patient samples.

VI. TERMINOLOGY

Specific terminology is used throughout this disclosure to explain various aspects of the apparatus, systems, methods, and compositions that are described.

Having described some illustrative embodiments of the present disclosure, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the present disclosure. In particular, although many of the examples presented herein involve specific combinations of method acts or system elements, it should be understood that those acts and those elements may be combined in other ways to accomplish the same objectives.

As used herein, the singular forms "a," "an," and "the" include plural referents unless the context clearly dictates otherwise. For example, "a" or "an" means "at least one" or "one or more."

The term "about" as used herein refers to the usual error range for the respective value readily known to the skilled person in this technical field. Reference to "about" a value or parameter herein includes (and describes) embodiments that are directed to that value or parameter per se.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

(i) Barcode

A "barcode" is a label, or identifier, that conveys or is capable of conveying information (e.g., information about an analyte in a sample). A barcode can be part of an analyte, or independent of an analyte. A barcode can be attached to an analyte. A particular barcode can be unique relative to other barcodes.

Barcodes can have a variety of different formats. For example, barcodes can include polynucleotide barcodes, random nucleic acid and/or amino acid sequences, and synthetic nucleic acid and/or amino acid sequences. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI").

Barcodes can spatially-resolve molecular components found in biological samples, for example, at single-cell resolution (e.g., a barcode can be or can include a "spatial barcode"). In some embodiments, a barcode includes both a UMI and a spatial barcode. In some embodiments, a barcode includes two or more sub-barcodes that together function as a single barcode. For example, a polynucleotide barcode can include two or more polynucleotide sequences (e.g., sub-barcodes) that are separated by one or more non-barcode sequences.

(ii) Nucleic Acid and Nucleotide

The terms "nucleic acid" and "nucleotide" are intended to be consistent with their use in the art and to include naturally-occurring species or functional analogs thereof. Particularly useful functional analogs of nucleic acids are capable of hybridizing to a nucleic acid in a sequence-specific fashion (e.g., capable of hybridizing to two nucleic acids such that ligation can occur between the two hybridized nucleic acids) or are capable of being used as a template for replication of a particular nucleotide sequence. Naturally-occurring nucleic acids generally have a backbone containing phosphodiester bonds. An analog structure can have an alternate backbone linkage including any of a variety of those known in the art. Naturally-occurring nucleic acids generally have a deoxyribose sugar (e.g., found in deoxyribonucleic acid (DNA)) or a ribose sugar (e.g. found in ribonucleic acid (RNA)).

A nucleic acid can contain nucleotides having any of a variety of analogs of these sugar moieties that are known in the art. A nucleic acid can include native or non-native nucleotides. In this regard, a native deoxyribonucleic acid can have one or more bases selected from the group consisting of adenine (A), thymine (T), cytosine (C), or guanine (G), and a ribonucleic acid can have one or more bases selected from the group consisting of uracil (U), adenine (A), cytosine (C), or guanine (G). Useful non-native bases that can be included in a nucleic acid or nucleotide are known in the art.

(iii) Probe and Target

A "probe" or a "target," when used in reference to a nucleic acid or sequence of a nucleic acids, is intended as a semantic identifier for the nucleic acid or sequence in the context of a method or composition, and does not limit the structure or function of the nucleic acid or sequence beyond what is expressly indicated.

(iv) Oligonucleotide and Polynucleotide

The terms "oligonucleotide" and "polynucleotide" are used interchangeably to refer to a single-stranded multimer of nucleotides from about 2 to about 500 nucleotides in length. Oligonucleotides can be synthetic, made enzymatically (e.g., via polymerization), or using a "split-pool" method. Oligonucleotides can include ribonucleotide monomers (e.g., can be oligoribonucleotides) and/or deoxyribonucleotide monomers (e.g., oligodeoxyribonucleotides). In some examples, oligonucleotides can include a combination of both deoxyribonucleotide monomers and ribonucleotide monomers in the oligonucleotide (e.g., random or ordered combination of deoxyribonucleotide monomers and ribonucleotide monomers). An oligonucleotide can be 4 to 10, 10 to 20, 21 to 30, 31 to 40, 41 to 50, 51 to 60, 61 to 70, 71 to 80, 80 to 100, 100 to 150, 150 to 200, 200 to 250, 250 to 300, 300 to 350, 350 to 400, or 400-500 nucleotides in length, for example. Oligonucleotides can include one or more functional moieties that are attached (e.g., covalently or non-covalently) to the multimer structure. For example, an oligonucleotide can include one or more detectable labels (e.g., a radioisotope or fluorophore).

(v) Hybridizing, Hybridize, Annealing, and Anneal

The terms "hybridizing," "hybridize," "annealing," and "anneal" are used interchangeably in this disclosure, and refer to the pairing of substantially complementary or complementary nucleic acid sequences within two different molecules. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

(vi) Primer

A "primer" is a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence.

(vii) Primer Extension

A "primer extension" refers to any method where two nucleic acid sequences become linked (e.g., hybridized) by an overlap of their respective terminal complementary nucleic acid sequences (e.g., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

(viii) Nucleic Acid Extension

A "nucleic acid extension" generally involves incorporation of one or more nucleic acids (e.g., A, G, C, T, U, nucleotide analogs, or derivatives thereof) into a molecule (such as, but not limited to, a nucleic acid sequence) in a template-dependent manner, such that consecutive nucleic acids are incorporated by an enzyme (such as a polymerase or reverse transcriptase), thereby generating a newly synthesized nucleic acid molecule. For example, a primer that hybridizes to a complementary nucleic acid sequence can be used to synthesize a new nucleic acid molecule by using the complementary nucleic acid sequence as a template for nucleic acid synthesis. Similarly, a 3' polyadenylated tail of an mRNA transcript that hybridizes to a poly (dT) sequence can be used as a template for single-strand synthesis of a corresponding cDNA molecule.

(ix) PCR Amplification

A "PCR amplification" refers to the use of a polymerase chain reaction (PCR) to generate copies of genetic material, including DNA and RNA sequences. Suitable reagents and conditions for implementing PCR are described, for example, in U.S. Pat. Nos. 4,683,202, 4,683,195, 4,800,159, 4,965,188, and 5,512,462, the entire contents of each of which are incorporated herein by reference. In a typical PCR amplification, the reaction mixture includes the genetic material to be amplified, an enzyme, one or more primers that are employed in a primer extension reaction, and reagents for the reaction. The oligonucleotide primers are of sufficient length to provide for hybridization to complementary genetic material under annealing conditions. The length of the primers generally depends on the length of the amplification domains, but will typically be at least 4 bases, at least 5 bases, at least 6 bases, at least 8 bases, at least 9 bases, at least 10 base pairs (bp), at least 11 bp, at least 12 bp, at least 13 bp, at least 14 bp, at least 15 bp, at least 16 bp, at least 17 bp, at least 18 bp, at least 19 bp, at least 20 bp, at least 25 bp, at least 30 bp, at least 35 bp, and can be as long as 40 bp or longer, where the length of the primers will generally range from 18 to 50 bp. The genetic material can be contacted with a single primer or a set of two primers (forward and reverse primers), depending upon whether primer extension, linear or exponential amplification of the genetic material is desired.

In some embodiments, the PCR amplification process uses a DNA polymerase enzyme. The DNA polymerase activity can be provided by one or more distinct DNA polymerase enzymes. In certain embodiments, the DNA polymerase enzyme is from a bacterium, e.g., the DNA polymerase enzyme is a bacterial DNA polymerase enzyme. For instance, the DNA polymerase can be from a bacterium of the genus *Escherichia, Bacillus, Thermophilus*, or *Pyrococcus*.

Suitable examples of DNA polymerases that can be used include, but are not limited to: *E. coli* DNA polymerase I, Bsu DNA polymerase, Bst DNA polymerase, Taq DNA polymerase, VENT™ DNA polymerase, DEEPVENT™ DNA polymerase, LongAmp® Taq DNA polymerase, LongAmp® Hot Start Taq DNA polymerase, Crimson LongAmp® Taq DNA polymerase, Crimson Taq DNA polymerase, OneTaq® DNA polymerase, OneTaq® QuickLoad® DNA polymerase, Hemo KlenTaq® DNA polymerase, REDTaq® DNA polymerase, Phusion® DNA polymerase, Phusion® High-Fidelity DNA polymerase, Platinum Pfx DNA polymerase, AccuPrime Pfx DNA polymerase, Phi29 DNA polymerase, Klenow fragment, Pwo DNA polymerase, Pfu DNA polymerase, T4 DNA polymerase and T7 DNA polymerase enzymes.

The term "DNA polymerase" includes not only naturally-occurring enzymes but also all modified derivatives thereof, including also derivatives of naturally-occurring DNA polymerase enzymes. For instance, in some embodiments, the DNA polymerase can have been modified to remove 5'-3' exonuclease activity. Sequence-modified derivatives or mutants of DNA polymerase enzymes that can be used include, but are not limited to, mutants that retain at least some of the functional, e.g. DNA polymerase activity of the wild-type sequence. Mutations can affect the activity profile of the enzymes, e.g. enhance or reduce the rate of polymerization, under different reaction conditions, e.g. temperature, template concentration, primer concentration, etc. Mutations or sequence-modifications can also affect the exonuclease activity and/or thermostability of the enzyme.

In some embodiments, PCR amplification can include reactions such as, but not limited to, a strand-displacement amplification reaction, a rolling circle amplification reaction, a ligase chain reaction, a transcription-mediated amplification reaction, an isothermal amplification reaction, and/or a loop-mediated amplification reaction.

In some embodiments, PCR amplification uses a single primer that is complementary to the 3' tag of target DNA fragments. In some embodiments, PCR amplification uses a first and a second primer, where at least a 3' end portion of the first primer is complementary to at least a portion of the 3' tag of the target nucleic acid fragments, and where at least a 3' end portion of the second primer exhibits the sequence of at least a portion of the 5' tag of the target nucleic acid fragments. In some embodiments, a 5' end portion of the first primer is non-complementary to the 3' tag of the target nucleic acid fragments, and a 5' end portion of the second primer does not exhibit the sequence of at least a portion of the 5' tag of the target nucleic acid fragments. In some embodiments, the first primer includes a first universal sequence and/or the second primer includes a second universal sequence.

In some embodiments, the PCR amplification products can be ligated to additional sequences using a DNA ligase enzyme. The DNA ligase activity can be provided by one or more distinct DNA ligase enzymes. In some embodiments, the DNA ligase enzyme is from a bacterium, e.g., the DNA ligase enzyme is a bacterial DNA ligase enzyme. In some embodiments, the DNA ligase enzyme is from a virus (e.g., a bacteriophage). For instance, the DNA ligase can be T4 DNA ligase. Other enzymes appropriate for the ligation step include, but are not limited to, Tth DNA ligase, Taq DNA ligase, *Thermococcus* sp. (strain 90N) DNA ligase (90NTM DNA ligase, available from New England Biolabs, Ipswich, MA), and Ampligase™ (available from Epicentre Biotechnologies, Madison, WI). Derivatives, e.g. sequence-modified derivatives, and/or mutants thereof, can also be used.

In some embodiments, genetic material is amplified by reverse transcription polymerase chain reaction (RT-PCR). The desired reverse transcriptase activity can be provided by one or more distinct reverse transcriptase enzymes, suitable examples of which include, but are not limited to: M-MLV, MuLV, AMV, HIV, ArrayScript™, MultiScribe™, ThermoScript™, and SuperScript® I, II, III, and IV enzymes. "Reverse transcriptase" includes not only naturally occurring enzymes, but all such modified derivatives thereof, including also derivatives of naturally-occurring reverse transcriptase enzymes.

In addition, reverse transcription can be performed using sequence-modified derivatives or mutants of M-MLV, MuLV, AMV, and HIV reverse transcriptase enzymes, including mutants that retain at least some of the functional, e.g. reverse transcriptase, activity of the wild-type sequence. The reverse transcriptase enzyme can be provided as part of a composition that includes other components, e.g. stabilizing components that enhance or improve the activity of the reverse transcriptase enzyme, such as RNase inhibitor(s), inhibitors of DNA-dependent DNA synthesis, e.g. actinomycin D. Many sequence-modified derivative or mutants of reverse transcriptase enzymes, e.g. M-MLV, and compositions including unmodified and modified enzymes are commercially available, e.g. ArrayScript™, MultiScribe™, ThermoScript™, and SuperScript® I, II, III, and IV enzymes.

Certain reverse transcriptase enzymes (e.g. Avian Myeloblastosis Virus (AMV) Reverse Transcriptase and Moloney Murine Leukemia Virus (M-MuLV, MMLV) Reverse Transcriptase) can synthesize a complementary DNA strand using both RNA (cDNA synthesis) and single-stranded DNA (ssDNA) as a template. Thus, in some embodiments, the reverse transcription reaction can use an enzyme (reverse transcriptase) that is capable of using both RNA and ssDNA as the template for an extension reaction, e.g. an AMV or MMLV reverse transcriptase.

In some embodiments, the quantification of RNA and/or DNA is carried out by real-time PCR (also known as quantitative PCR or qPCR), using techniques well known in the art, such as but not limited to "TAQMAN™" or "SYBR®", or on capillaries ("LightCycler® Capillaries"). In some embodiments, the quantification of genetic material is determined by optical absorbance and with real-time PCR. In some embodiments, the quantification of genetic material is determined by digital PCR. In some embodiments, the genes analyzed can be compared to a reference nucleic acid extract (DNA and RNA) corresponding to the expression (mRNA) and quantity (DNA) in order to compare expression levels of the target nucleic acids.

(x) Antibody

An "antibody" is a polypeptide molecule that recognizes and binds to a complementary target antigen. Antibodies typically have a molecular structure shape that resembles a Y shape. Naturally-occurring antibodies, referred to as immunoglobulins, belong to one of the immunoglobulin classes IgG, IgM, IgA, IgD, and IgE. Antibodies can also be produced synthetically. For example, recombinant antibodies, which are monoclonal antibodies, can be synthesized using synthetic genes by recovering the antibody genes from source cells, amplifying into an appropriate vector, and introducing the vector into a host to cause the host to express the recombinant antibody. In general, recombinant antibodies can be cloned from any species of antibody-producing animal using suitable oligonucleotide primers and/or hybridization probes. Recombinant techniques can be used to generate antibodies and antibody fragments, including non-endogenous species.

Synthetic antibodies can be derived from non-immunoglobulin sources. For example, antibodies can be generated from nucleic acids (e.g., aptamers), and from non-immunoglobulin protein scaffolds (such as peptide aptamers) into which hypervariable loops are inserted to form antigen binding sites. Synthetic antibodies based on nucleic acids or peptide structures can be smaller than immunoglobulin-derived antibodies, leading to greater tissue penetration.

Antibodies can also include affimer proteins, which are affinity reagents that typically have a molecular weight of about 12-14 kDa. Affimer proteins generally bind to a target (e.g., a target protein) with both high affinity and specificity. Examples of such targets include, but are not limited to, ubiquitin chains, immunoglobulins, and C-reactive protein. In some embodiments, affimer proteins are derived from cysteine protease inhibitors, and include peptide loops and a variable N-terminal sequence that provides the binding site.

Antibodies can also refer to an "epitope binding fragment" or "antibody fragment," which as used herein, generally refers to a portion of a complete antibody capable of binding the same epitope as the complete antibody, albeit not necessarily to the same extent. Although multiple types of epitope binding fragments are possible, an epitope binding fragment typically comprises at least one pair of heavy and light chain variable regions (VH and VL, respectively) held together (e.g., by disulfide bonds) to preserve the antigen binding site, and does not contain all or a portion of the Fc region. Epitope binding fragments of an antibody can be obtained from a given antibody by any suitable technique (e.g., recombinant DNA technology or enzymatic or chemical cleavage of a complete antibody), and typically can be screened for specificity in the same manner in which complete antibodies are screened. In some embodiments, an epitope binding fragment comprises an $F(ab')_2$ fragment, Fab' fragment, Fab fragment, Fd fragment, or Fv fragment. In some embodiments, the term "antibody" includes antibody-derived polypeptides, such as single chain variable fragments (scFv), diabodies or other multimeric scFvs, heavy chain antibodies, single domain antibodies, or other polypeptides comprising a sufficient portion of an antibody (e.g., one or more complementarity determining regions (CDRs)) to confer specific antigen binding ability to the polypeptide.

(xi) Label, Detectable Label, and Optical Label

The terms "detectable label," "optical label," and "label" are used interchangeably herein to refer to a directly or indirectly detectable moiety that is associated with (e.g., conjugated to) a molecule to be detected, e.g., a probe for in situ assay or analyte. The detectable label can be directly detectable by itself (e.g., radioisotope labels or fluorescent labels) or, in the case of an enzymatic label, can be indirectly detectable, e.g., by catalyzing chemical alterations of a substrate compound or composition, which substrate compound or composition is directly detectable. Detectable labels can be suitable for small scale detection and/or suitable for high-throughput screening. As such, suitable detectable labels include, but are not limited to, radioisotopes, fluorophores, chemiluminescent compounds, bioluminescent compounds, and dyes.

The detectable label can be qualitatively detected (e.g., optically or spectrally), or it can be quantified. Qualitative detection generally includes a detection method in which the existence or presence of the detectable label is confirmed, whereas quantifiable detection generally includes a detection method having a quantifiable (e.g., numerically reportable) value such as an intensity, duration, polarization, and/or other properties.

In some embodiments, a plurality of detectable labels can be attached to a composition (e.g., a probe) to be detected. For example, detectable labels can be incorporated during nucleic acid polymerization or amplification (e.g., Cy5®-labelled nucleotides, such as Cy5®-dCTP). Any suitable detectable label can be used. In some embodiments, the detectable label is a fluorophore. For example, the fluorophore can be from a group that includes: 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPYR FL, BODIPY R TMR, BODIPY® TR-X, BODIPY® 530/550, BODIPY® 558/568, BODIPY® 564/570, BODIPYR 581/591, BODIPYR 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, CI-NERF (low pH), CPM, 6-CR 6G, CTC Formazan, Cy2®, Cy3R, Cy3.5R, Cy5R, Cy5.5R, Cy7®, Cychrome (PE-Cy5), Dansylamine, Dansyl cadaverine, Dansylchloride, DAPI, Dapoxyl, DCFH, DHR, DiA (4-Di-16-ASP), DiD (DiIC18 (5)), DIDS, DiI (DiIC18 (3)), DiO (DiOC18 (3)), DiR (DiIC18 (7)), Di-4 ANEPPS, Di-8 ANEPPS, DM-NERF (4.5-6.5 pH), DsRed (Red Fluorescent Protein), EBFP, ECFP, EGFP, ELFR-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), Lyso Tracker® Green, LysoTracker® Red, Lyso Tracker® Yellow, Mag-Fura-2, Mag-Indo-1, Magnesium Green™, Marina Blue®, 4-Methylumbelliferone, Mithramycin, Mito Tracker® Green, Mito Tracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARF®-1 (high pH), SNARFR-1 (low pH), Sodium Green™, SpectrumAquaR, SpectrumGreenR #1, SpectrumGreen® #2, SpectrumOrange®, Spectrum Red®, SYTOR 11, SYTOR 13, SYTOR 17, SYTOR 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTOR-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66W, YFP (Yellow Fluorescent Protein), YOYOR-1/YO-PRO®-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, ATTO 647N, TYE 563, TYE 665, TYE 705, 5' IRDye® 700, 5' IRDye® 800, 5' IRDye® 800CW (NHS Ester), WellRED D4 Dye, WellRED D3 Dye, WellRED D2 Dye, Lightcycler® 640 (NHS Ester), and Dy 750 (NHS Ester).

As mentioned above, in some embodiments, a detectable label is or includes a luminescent or chemiluminescent moiety. Common luminescent/chemiluminescent moieties include, but are not limited to, peroxidases such as horseradish peroxidase (HRP), soybean peroxidase (SP), alkaline phosphatase, and luciferase. These protein moieties can catalyze chemiluminescent reactions given the appropriate substrates (e.g., an oxidizing reagent plus a chemiluminescent compound. A number of compound families are known to provide chemiluminescence under a variety of conditions. Non-limiting examples of chemiluminescent compound families include 2,3-dihydro-1,4-phthalazinedione luminol, 5-amino-6,7,8-trimethoxy- and the dimethylamino [ca] benz analog. These compounds can luminesce in the presence of alkaline hydrogen peroxide or calcium hypochlorite and base. Other examples of chemiluminescent compound families include, e.g., 2,4,5-triphenylimidazoles, para-dimethylamino and-methoxy substituents, oxalates such as oxalyl active esters, p-nitrophenyl, N-alkyl acridinum esters, luciferins, lucigenins, or acridinium esters. In some embodiments, a detectable label is or includes a metal-based or mass-based label. For example, small cluster metal ions, metals, or semiconductors may act as a mass code. In some examples, the metals can be selected from Groups 3-15 of the periodic table, e.g., Y, La, Ag, Au, Pt, Ni, Pd, Rh, Ir, Co, Cu, Bi, or a combination thereof.

EXEMPLARY EMBODIMENTS

Embodiment 1: A method for analyzing a biological sample, comprising:
  (a) contacting the biological sample with an encoding probe or probe set comprising: (i) a first hybridization region complementary to a first target sequence in the biological sample, (ii) one or more first barcode regions;
  (b) contacting the biological sample with a circular probe or circularizable probe or probe set comprising: (i) a second hybridization region complementary to a second target sequence in the biological sample, (ii) one or more second barcode regions;
  (c) contacting the biological sample with a first detectable probe that directly or indirectly binds to a sequence in the one or more first barcode regions;
  (d) detecting a first signal associated with the first detectable probe;
  (e) generating a rolling circle amplification (RCA) product in the biological sample using the circular probe or a circularized probe generated from the circularizable probe or probe set as a template;
  (f) contacting the biological sample with a second detectable probe that hybridizes to the RCA product at a sequence in the one or more second barcode regions or a complement thereof; and
  (g) detecting a second signal associated with the second detectable probe,
  thereby detecting the first target sequence or a portion thereof and the second target sequence or a portion thereof in the biological sample.
Embodiment 2: The method of embodiment 1, wherein the contacting in steps (a) and (b) is performed simultaneously or in either order, optionally wherein the remaining steps (c), (d), (e), (f), and (g) are performed in that order.
Embodiment 3: The method of embodiment 1, wherein the contacting in steps (a) and (b) are performed simultaneously or in either order, followed by generating the RCA product in step (e), optionally wherein the remaining steps (c), (d), (f), and (g) are performed in that order.
Embodiment 4: The method of embodiment 3, wherein the remaining steps (c), (d), (f), and (g) are performed in that order.
Embodiment 5: The method of embodiment 3, wherein the remaining steps (f), (g), (c), and (d) are performed in that order.
Embodiment 6: The method of any of embodiments 3-5, wherein the encoding probe or probe set is not amplified and/or processed by a polymerase for RCA, optionally wherein the polymerase for RCA is phi29.
Embodiment 7: The method of any of embodiments 3-5, wherein the encoding probe or probe set is modified to be resistant to a 5'→3' polymerase activity and/or a 3'→5' exonuclease activity, optionally wherein the modification comprises an irreversible terminating group (optionally ddNTP), a reversible terminating group (optionally a 3'-O-blocked reversible terminating group and/or 3'-unblocked reversible terminating group optionally linked to the base), a 3' thiophosphate protection, a phosphorothioate bond, a 2'-modified nucleoside, an inverted deoxythymidine base, and/or a 2'-O-methyl ribonucleotide, optionally wherein the 2'-O-methyl ribonucleotide is a 3' terminal nucleotide of the encoding probe or probe set.
Embodiment 8: The method of any of embodiments 1-7, wherein the contacting in steps (c) and (f) is performed simultaneously or in either order.
Embodiment 9: The method of any of embodiments 1-8, wherein the detecting in steps (d) and (g) is performed simultaneously or in either order.
Embodiment 10: The method of embodiment 1, comprising steps (a), (c), (d), (b), (e), (f), and (g) in that order.
Embodiment 11: The method of embodiment 1, comprising steps (b), (e), (f), (g), (a), (c), and (d) in that order.
Embodiment 12: The method of any of embodiments 1-11, wherein the encoding probe or probe set comprises only linear probe(s).
Embodiment 13: The method of any of embodiments 1-12, wherein the encoding probe or probe set is not circularized within the probe or probe set or with one or more other probes.
Embodiment 14: The method of any of embodiments 1-12, wherein the encoding probe or probe set is circularized to generate a circularized encoding probe, optionally within the probe or probe set or with one or more other probes, and wherein the circularized encoding probe is not used as a template to generate an RCA product.
Embodiment 15: The method of any of embodiments 1-14, wherein the encoding probe or probe set comprises a 3' overhang and/or a 5' overhang.
Embodiment 16: The method of embodiment 15, wherein the encoding probe or probe set comprises a 3' overhang comprising the one or more first barcode regions, optionally wherein the 3' overhang is resistant to a 3'→5' exonuclease activity.
Embodiment 17: The method of embodiment 15, wherein the encoding probe or probe set comprises a 5' overhang comprising the one or more first barcode regions and optionally a 3' end that is resistant to a 5'→3' polymerase activity.
Embodiment 18: The method of embodiment 15, wherein the encoding probe or probe set comprises a 3' overhang and a 5' overhang, optionally wherein each overhang comprises one or more first barcode regions.
Embodiment 19: The method of any of embodiments 1-18, wherein the first target sequence is in a DNA or RNA molecule, optionally wherein the DNA molecule is a genomic DNA, a cDNA, or a synthetic oligonucleotide probe, and optionally wherein the RNA molecule is an mRNA, a viral RNA, or a non-coding RNA.
Embodiment 20: The method of any of embodiments 1-19, wherein the first target sequence is a contiguous sequence.
Embodiment 21: The method of any of embodiments 1-19, wherein the first target sequence is a split sequence comprising two or more subsequences, optionally wherein the first target sequence is in one or more molecules.
Embodiment 22: The method of embodiment 21, wherein the two or more subsequences are in multiple oligonucleotide probes that hybridize to a genomic DNA, a cDNA, an mRNA, a viral RNA, or a non-coding RNA.

Embodiment 23: The method of any of embodiments 1-22, wherein in step (a), the biological sample is contacted with a plurality of encoding probes each (i) hybridizing to one of multiple first target sequences in a DNA or RNA molecule and (ii) comprising one or more first barcode sequences in the one or more first barcode regions.

Embodiment 24: The method of embodiment 23, comprising using at least about 2, about 5, about 10, about 15, about 20, about 25, about 30, or about 35 distinct encoding probes for the DNA or RNA molecule.

Embodiment 25: The method of any of embodiments 1-24, wherein in step (c), the biological sample is contacted with a plurality of first detectable probes each (i) hybridizing to one of a plurality of first barcode sequences in the one or more first barcode regions and (ii) comprising a fluorescent moiety.

Embodiment 26: The method of embodiment 25, wherein the contacting in step (c) is performed in sequential cycles and/or the detecting in step (d) is performed in sequential cycles.

Embodiment 27: The method of any of embodiments 1-26, wherein the first detectable probe comprises a fluorescent moiety and is not circularized upon hybridization to the encoding probe or probe set, optionally wherein the fluorescent moiety is cleavable or degradable.

Embodiment 28: The method of embodiment 27, further comprising extinguishing a fluorescent signal of the fluorescent moiety after the detecting in step (d),
optionally wherein the method comprises unhybridizing the first detectable probe, and optionally removing the unhybridized first detectable probe without unhybridizing the encoding probe or probe set,
optionally wherein the method comprises removing the fluorescent moiety by enzymatically cleaving, modifying, or degrading the first detectable probe or a portion thereof,
optionally wherein the method comprises inactivating the first detectable probe by masking, removing, or modifying the fluorescent moiety,
optionally wherein the method comprises cleaving a linker linking the fluorescent moiety to the first detectable probe, optionally wherein the linker comprises a disulfide bond,
optionally wherein the method comprises chemically or photochemically modifying the fluorescent moiety,
optionally wherein the method comprises bleaching the fluorescent moiety by a chemical agent,
optionally wherein the method comprises photobleaching the fluorescent moiety,
optionally wherein the method comprises permanently and irreversibly extinguishing the fluorescent moiety, and/or
optionally wherein the first probe comprises quenching the fluorescent moiety.

Embodiment 29: The method of any of embodiments 1-26, wherein the first detectable probe is circularized upon hybridization to the encoding probe or probe set, optionally wherein the circularized first detectable probe is used as a template to generate an RCA product for detection.

Embodiment 30: The method of any of embodiments 1-29, comprising contacting the biological sample with a plurality of the encoding probes or probe sets for a plurality of distinct first target sequences, optionally wherein each distinct first target sequence is in a genomic DNA, a cDNA, an mRNA, a viral RNA, or a non-coding RNA.

Embodiment 31: The method of any of embodiments 1-30, wherein the first target sequence has an average copy number of no more than about 5, no more than about 10, no more than about 15, no more than about 20, no more than about 25, no more than about 30, no more than about 35, no more than about 40, no more than about 45, no more than about 50, no more than about 100, no more than about 200, no more than about 300, or no more than about 400 per cell in the biological sample.

Embodiment 32: The method of any of embodiments 1-31, wherein two ends of the circularizable probe or probe set are ligated using DNA-templated ligation, RNA-templated ligation, and/or click chemistry ligation, optionally wherein the circularizable probe is a padlock probe.

Embodiment 33: The method of any of embodiments 1-32, wherein two ends of the circularizable probe or probe set are ligated using the second target sequence as a template, with or without cleaving a 5' flap and/or with or without gap filling prior to ligation.

Embodiment 34: The method of any of embodiments 1-33, wherein the circularizable probe or probe set is composed primarily of DNA and the circularized probe comprises no more than four consecutive ribonucleotides, optionally wherein prior to ligation the circularizable probe or probe set comprises a ribonucleotide at a 3' ligatable end.

Embodiment 35: The method of any of embodiments 1-34, wherein two ends of the circularizable probe or probe set are ligated using a splint as a template, with or without cleaving a 5' flap and/or with or without gap filling prior to ligation, and wherein the splint is distinct from the second target sequence.

Embodiment 36: The method of embodiment 35, wherein the splint hybridizes to a sequence adjacent to the second target sequence, in addition to hybridizing to the two ends of the circularizable probe or probe set.

Embodiment 37: The method of embodiment 35 or 36, wherein the splint or a portion thereof is used to prime the RCA.

Embodiment 38: The method of any of embodiments 1-37, comprising contacting the circularized probe with a primer that hybridizes to the circularized probe to prime the RCA.

Embodiment 39: The method of any of embodiments 1-38, wherein the second target sequence is in a DNA molecule, optionally wherein the DNA molecule is a genomic DNA, a cDNA, or a synthetic oligonucleotide probe.

Embodiment 40: The method of any of embodiments 1-38, wherein the second target sequence is in an RNA molecule, optionally wherein the RNA molecule is an mRNA, a viral RNA, or a non-coding RNA.

Embodiment 41: The method of any of embodiments 1-40, wherein the second target sequence is a contiguous sequence.

Embodiment 42: The method of any of embodiments 1-40, wherein the second target sequence is a split sequence comprising two or more subsequences.

Embodiment 43: The method of embodiment 42, wherein the two or more subsequences are in multiple oligonucleotide probes that hybridize to a genomic DNA, a cDNA, an mRNA, a viral RNA, or a non-coding RNA.

Embodiment 44: The method of any of embodiments 1-43, comprising using no more than 4 distinct circular probes or circularizable probes or probe sets for a DNA or RNA molecule in the biological sample, optionally wherein the DNA or RNA molecule is targeted by only one distinct circular probe or circularizable probe or probe set.

Embodiment 45: The method of any of embodiments 1-44, wherein the RCA product is a nanoball having a diameter of between about 0.1 µm and about 3 µm, optionally between about 0.1 µm and about 0.5 µm (optionally between about 0.2 µm and about 0.3 µm, or between about 0.3 µm and about 0.4 µm), between about 0.5 µm and about 1 µm, between about 0.8 µm and about 1.3 µm, or between about 1 µm and about 1.5 µm.

Embodiment 46: The method of any of embodiments 1-45, wherein the RCA product is between about 1 and about 15 kilobases, between about 15 and about 25 kilobases, between about 25 and about 35 kilobases, between about 35 and about 45 kilobases, between about 45 and about 55 kilobases, between about 55 and about 65 kilobases, between about 65 and about 75 kilobases, or more than 75 kilobases in length, optionally between about 45 and about 70 kilobases.

Embodiment 47: The method of any of embodiments 1-46, wherein the RCA product comprises between about 10 and about 100, between about 100 and about 1,000, between about 1,000 and about 5,000, between about 5,000 and about 10,000, or more than 10,000 copies of a unit sequence corresponding to the circularized probe.

Embodiment 48: The method of any of embodiments 1-47, wherein the RCA is performed in situ in the biological sample for no more than 3 hours, no more than 2 hours, no more than 1 hour, no more than 30 minutes, or no more than 15 minutes.

Embodiment 49: The method of any of embodiments 1-48, wherein in step (f), the biological sample is contacted with a plurality of second detectable probes each comprising (i) a second barcode sequence in the one or more second barcode regions and (ii) a fluorescent moiety.

Embodiment 50: The method of any of embodiments 1-48, wherein in step (f), the biological sample is contacted with a plurality of second detectable probes each comprising (i) a second barcode sequence in the one or more second barcode regions and (ii) a 3' overhang and/or a 5' overhang comprising a binding sequence for a detection probe comprising a fluorescent moiety.

Embodiment 51: The method of embodiment 49 or 50, wherein the contacting in step (f) and the detecting in step (g) are performed in sequential cycles.

Embodiment 52: The method of any of embodiments 49-51, further comprising extinguishing a fluorescent signal of the fluorescent moiety after the detecting in step (g),
    optionally wherein the method comprises unhybridizing the second detectable probe and/or the detection probe,
    optionally wherein the method comprises removing the fluorescent moiety by enzymatically cleaving, modifying, or degrading the second detectable probe and/or the detection probe or a portion thereof,
    optionally wherein the method comprises inactivating the second detectable probe or the detection probe by masking, removing, or modifying the fluorescent moiety,
    optionally wherein the method comprises cleaving a linker linking the fluorescent moiety to the second detectable probe or the detection probe, optionally wherein the linker comprises a disulfide bond,
    optionally wherein the method comprises chemically or photochemically modifying the fluorescent moiety,
    optionally wherein the method comprises bleaching the fluorescent moiety by a chemical agent,
    optionally wherein the method comprises photobleaching the fluorescent moiety,
    optionally wherein the method comprises permanently and irreversibly extinguishing the fluorescent moiety, and/or
    optionally wherein the first probe comprises quenching the fluorescent moiety.

Embodiment 53: The method of any of embodiments 1-52, comprising contacting the biological sample with a plurality of the circular probes or circularizable probes or probe sets for a plurality of distinct second target sequences, optionally wherein each distinct second target sequence is in a genomic DNA, a cDNA, an mRNA, a viral RNA, or a non-coding RNA.

Embodiment 54: The method of any of embodiments 1-53, wherein the second target sequence has an average copy number of at least about 50, at least about 100, at least about 200, at least about 300, at least about 400, at least about 500, at least about 1,000, at least about 2,000, at least about 3,000, at least about 4,000, at least about 5,000, at least about 6,000, at least about 7,000, at least about 8,000, at least about 9,000, or at least about 10,000 per cell in the biological sample.

Embodiment 55: The method of any of embodiments 1-54, wherein the first target sequence has an average copy number of no more than about 100 per cell in the biological sample, and the second target sequence has an average copy number of at least about 100 per cell in the biological sample.

Embodiment 56: The method of any of embodiments 1-55, wherein:
    the first target sequence and the second target sequence comprise the same sequence or different sequences; and/or
    the first target sequence and the second target sequence are in molecules corresponding to the same analyte or distinct analytes.

Embodiment 57: The method of embodiment 56, wherein the analyte or distinct analytes comprise one or more nucleic acid analytes and one or more non-nucleic acid analytes, optionally wherein the corresponding molecules each comprises a binding moiety conjugated to an reporter oligonucleotide, and optionally wherein the binding moiety is an antibody or antigen binding fragment thereof.

Embodiment 58: The method of embodiment 56, wherein the first target sequence and the second target sequence are in molecules corresponding to the same analyte, and the method further comprises comparing the detection of the first target sequence and the detection of the second target sequence.

Embodiment 59: The method of embodiment 58, wherein the comparing comprises calculating the percentage of detected molecules corresponding to the first target sequence that also correspond to the second target sequence.

Embodiment 60: The method of any of embodiments 1-59 for detecting at least a first analyte and a second analyte, wherein for each analyte:
steps (a) and (b) are the same step,
the first target sequence and the second target sequence at least partially overlap and optionally are the same sequence corresponding to the analyte, and
the encoding probe or probe set is circular or circularizable, optionally wherein the encoding probe or probe set and the circular probe or circularizable probe or probe set are the same probe or probe set.

Embodiment 61: The method of embodiment 60, wherein step (a)/(b) is followed by steps (c) and (d) without RCA of the circular probe or the circularized probe generated from the circularizable probe or probe set.

Embodiment 62: The method of embodiment 61, wherein signals associated with the first analyte are detected in step (d), and wherein the first analyte has an average copy number of no more than about 5, no more than about 10, no more than about 15, no more than about 20, no more than about 25, no more than about 30, no more than about 35, no more than about 40, no more than about 45, no more than about 50, no more than about 100, no more than about 200, no more than about 300, or no more than about 400 per cell in the biological sample in the biological sample.

Embodiment 63: The method of embodiment 62, wherein steps (c) and (d) are followed by steps (e)-(g) in that order.

Embodiment 64: The method of embodiment 63, wherein signals associated with the second analyte are detected in step (g), and wherein the second analyte has an average copy number of at least about 500, at least about 1,000, at least about 2,000, at least about 3,000, at least about 4,000, at least about 5,000, at least about 6,000, at least about 7,000, at least about 8,000, at least about 9,000, or at least about 10,000 per cell in the biological sample.

Embodiment 65: The method of any of embodiments 60-64, wherein signals associated with a third analyte are detected in both step (d) and step (g).

Embodiment 66: The method of any of embodiments 1-65, wherein the biological sample is non-homogenized and optionally selected from the group consisting of a formalin-fixed, paraffin-embedded (FFPE) sample, a frozen tissue sample, and a fresh tissue sample.

Embodiment 67: The method of any of embodiments 1-66, wherein the biological sample is fixed.

Embodiment 68: The method of any of embodiments 1-66, wherein the biological sample is not fixed.

Embodiment 69: The method of any of embodiments 1-68, wherein the biological sample is permeabilized.

Embodiment 70: The method of any of embodiments 1-69, wherein the biological sample is embedded in a matrix, optionally wherein the matrix comprises a hydrogel.

Embodiment 71: The method of any of embodiments 1-70, wherein the biological sample is treated with a proteinase, optionally wherein the proteinase is proteinase K.

Embodiment 72: The method of any of embodiments 1-71, wherein the biological sample is crosslinked, optionally to a matrix embedding the biological sample.

Embodiment 73: The method of any of embodiments 1-72, wherein the biological sample is cleared.

Embodiment 74: The method of any of embodiments 1-73, wherein the biological sample is a tissue slice between about 1 µm and about 50 µm in thickness.

Embodiment 75: The method of embodiment 74, wherein the tissue slice is between about 5 µm and about 35 µm in thickness.

Embodiment 76: A method for analyzing a biological sample, comprising:
(a) contacting the biological sample with an a circular probe or circularizable probe or probe set comprising: (i) a hybridization region complementary to a target sequence in the biological sample, (ii) one or more barcode regions;
(b) contacting the biological sample with a first detectable probe that binds to a sequence in the circular probe or circularizable probe or probe set;
(c) detecting a first signal associated with the first detectable probe;
(d) generating a rolling circle amplification (RCA) product in the biological sample using the circular probe or a circularized probe generated from the circularizable probe or probe set as a template;
(e) contacting the biological sample with a second detectable probe that hybridizes to the RCA product at a sequence in the one or more barcode regions or a complement thereof; and
(f) detecting a second signal associated with the second detectable probe.

Embodiment 77: The method of embodiment 76, further comprising comparing signals detected in (c) with signals detected in (f).

Embodiment 78: The method of embodiment 76 or embodiment 77, wherein the contacting in steps (a), (b), (c), (d), (e), and (f), are performed in that order.

EXAMPLE

The following examples are included for illustrative purposes only and are not intended to limit the scope of the present disclosure.

Example 1: Multiple Readout Signals for Analyzing a Sample

This Example discloses exemplary methods comprising multiple readout signals for analyzing a biological sample. In one aspects, encoding probes are used to detect a first nucleic acid molecule, and detection of a rolling circle amplification product generated from a circularized probe is used to detect a second nucleic acid molecule.

A biological sample (e.g., a processed or cleared biological sample, a tissue sample, a sample embedded in a hydrogel, etc.) can be contacted with sets of encoding probes, wherein each set of encoding probes targets a first nucleic acid molecule. The encoding probes of a given set can have varying target specific sequences against different regions (different first target sequences) of a given first nucleic acid molecule (e.g., an RNA transcript), and a general gene-specific barcode sequence (first barcode sequence) that does not hybridize to the nucleic acid molecule. In some cases, the method comprises contacting the biological sample with 30-50 (e.g., 48) encoding probes for a given first nucleic acid molecule. The encoding probes can be linear smFISH probes wherein the general gene-specific barcode sequence is in an overhang of the probe, or can be circular or circularizable probes comprising the general gene-specific barcode sequence.

The biological sample can also be contacted with one or more circular probes or circularizable probes or probe sets that target one or more second nucleic acid molecules. The circularizable probe or probe set can be a probe that hybridizes to the second nucleic acid molecule such that the 5' end and 3' end of the probe are juxtaposed for ligation, with or without gap filling (e.g., a padlock probe). In some examples, the circularizable probe is provided in two or more parts (e.g., as a probe set), wherein the circularizable probe set is circularized by at least two ligations.

The sample can be contacted by a ligase (e.g., T4 ligase or PBCV-1 ligase), ligase buffer, and RNase inhibitor and incubated to circularize the circularizable probe or probe set (and, optionally, to circularize circularizable encoding probes).

Generation of RCA products of the circular or circularized probes can be performed using a Phi29 polymerase and contacting the sample with detectable probes and imaging the sample to detect the encoding (smFISH) probes and the RCA product(s) can be performed in any suitable order as shown in FIGS. 1A-1E.

In some examples, the first nucleic acid molecule(s) is/are expressed at a lower level than the second nucleic acid molecule(s). In some examples, the first nucleic acid molecule(s) are longer than the second nucleic acid molecule(s). Thus, the method described herein can comprise detecting both highly expressed and lowly expressed analytes in the same sample (in simultaneous or sequential detecting steps), and/or detecting short and long nucleic acid analytes in the same sample (in simultaneous or sequential detecting steps).

Example 2: RNA Detection Using Multiple Readout Signals

This Example provides data demonstrating detection of an exemplary RNA transcript (Prox1) using linear fluorescent in situ hybridization encoding probes followed by rolling circle amplification in the same sample. Linear encoding probes were hybridized to the target Prox1 RNA, detected, and stripped. Circularizable probes were then hybridized to the target Prox1 RNA, circularized by ligation, and amplified to generate a rolling circle amplification product, which was then detected.

To test detection by RCA and smFISH in the same sample, a set of linear encoding probes and a plurality of circularizable (padlock) probes were designed to hybridize to Prox1 RNA. The Prox1 linear encoding probes each comprised a target binding region for a target sequence in the Prox1 target transcript and an overhang region for hybridizing an intermediate probe. The linear encoding probes were contacted to mouse brain tissue sections in hybridization buffer including SSC and formamide and incubated to allow for probe hybridization. The encoding probes were detected by indirectly binding detectably labeled probes (A647 fluorescently labeled) to a barcode sequence in the overhang region of the linear encoding probes (via hybridization of the fluorescently labeled probes to intermediate probes that hybridized to the linear encoding probes). The tissue sections were then imaged to detect the linear encoding probes bound to Prox1 RNA at locations in the tissue sample. In this experiment, a single round of detectable probe hybridization and imaging was performed to detect the Prox1 RNA. However, multiple sequential rounds of detectable probe hybridization and imaging could be performed to decode a barcode sequence for multiplex detection of target analytes using encoding probes.

After imaging, the linear encoding probes were removed by stripping (three washes in buffer comprising SSC and 65% formamide).

Next, the circularizable probes were contacted to the mouse brain tissue sections in hybridization buffer including SSC and formamide and incubated to allow for probe hybridization. The circularizable probes were then ligated and amplified by rolling circle amplification (RCA). The RCA product was detected by indirectly binding detectably labeled probes (A647 fluorescently labeled) to a barcode sequence in the RCA product (via hybridization of the fluorescently labeled probes to intermediate probes that hybridized to the RCA product). Like for the encoding probes, a single round of detectable probe hybridization and imaging was performed to detect the Prox1 RNA by detection of sequences in the RCA product. However, multiple sequential rounds of detectable probe hybridization and imaging could be performed to decode a barcode sequence for multiplex detection of target analytes using circularizable probes and RCA.

The results for detecting Prox1 in the dentate gyrus using smFISH (encoding probes) and by RCA were then compared. Detection by smFISH resulted in a higher density of detected objects (detected A647 spots) than by RCA, as shown in Table 1 below. RCA detection provided a higher signal intensity for detected objects, as shown in FIG. 4. RCA detection also resulted in a greater signal-to-noise ratio compared to smFISH detection.

TABLE 1

Comparison of Detected Object Density using RCA and smFISH

| Condition | Density (Prox1 Count/Area in dentate gyrus) | Density % of smFISH (encoding probe detection) |
| --- | --- | --- |
| smFISH with 20 nM encoding probes | 0.395 | N/A |
| smFISH with 10 nM encoding probes | 0.311 | N/A |
| RCA performed after smFISH (20 nM) | 0.249 | 63% (compared to smFISH 20 nM) |
| RCA performed after smFISH (10 nM) | 0.213 | 68% (compared to smFISH 10 nM) |
| RCA performed after smFISH negative control (no encoding probes) | 0.303 | 77% (compared to smFISH 20 nM) |

By determining the average relative number of detected transcripts or detected transcript density for RCA compared to smFISH, an RCA-based calibration coefficient could be calculated (e.g., 70%). Gene counts from RCA probes could thus be multiplied by a coefficient of 1.4 (1/0.7) to calibrate for the 70% sensitivity observed for RCA based detection.

The present disclosure is not intended to be limited in scope to the particular disclosed embodiments, which are provided, for example, to illustrate various aspects of the disclosure. Various modifications to the compositions and methods described will become apparent from the description and teachings herein. Such variations may be practiced without departing from the true scope and spirit of the disclosure and are intended to fall within the scope of the present disclosure.

The invention claimed is:

1. A method for analyzing a biological sample, comprising:
   (a) contacting the biological sample with an encoding probe or probe set comprising: (i) a first hybridization region complementary to a first target sequence in the biological sample, and (ii) one or more first barcode regions;
   (b) contacting the biological sample with a circular probe or circularizable probe or probe set comprising: (i) a second hybridization region complementary to a second target sequence in the biological sample, and (ii) one or more second barcode regions;
   (c) contacting the biological sample with a first detectable probe that directly or indirectly binds to a sequence in the one or more first barcode regions;
   (d) detecting a first signal associated with the first detectable probe;
   (e) generating a rolling circle amplification (RCA) product in the biological sample using the circular probe or a circularized probe generated from the circularizable probe or probe set as a template;
   (f) contacting the biological sample with a second detectable probe that directly or indirectly binds to the RCA product at a sequence in the one or more second barcode regions or a complement thereof; and
   (g) detecting a second signal associated with the second detectable probe,
   thereby detecting the first target sequence or a portion thereof and the second target sequence or a portion thereof in the biological sample.

2. The method of claim 1, wherein the contacting in steps (a) and (b) is performed simultaneously.

3. The method of claim 1, wherein the encoding probe or probe set is not amplified and/or processed by a polymerase for RCA.

4. The method of claim 1, wherein the encoding probe or probe set comprises a modification resistant to a 5'→3' polymerase activity and/or a 3'→5' exonuclease activity.

5. The method of claim 1, wherein the encoding probe or probe set is not circularized prior to generating a rolling circle amplification (RCA) product in the biological sample using the circular probe or the circularized probe.

6. The method of claim 1, wherein the first target sequence is in an mRNA molecule.

7. The method of claim 1, wherein in step (a), the biological sample is contacted with a plurality of encoding probes each (i) comprising a first hybridization region complementary to one of multiple first target sequences in a DNA or RNA molecule and (ii) comprising one or more first barcode sequences in the one or more first barcode regions.

8. The method of claim 7, comprising using at least 30 distinct encoding probes for the DNA or RNA molecule.

9. The method of claim 1, wherein in step (c), the biological sample is contacted with a plurality of first detectable probes each (i) comprising a region capable of hybridizing to one of a plurality of first barcode sequences in the one or more first barcode regions and (ii) comprising a fluorescent moiety.

10. The method of claim 1, wherein the method comprises:
    (i) unhybridizing the first detectable probe,
    (ii) removing a fluorescent moiety of the first detectable probe by enzymatically cleaving, modifying, or degrading the first detectable probe or a portion thereof,
    (iii) inactivating the first detectable probe by masking, removing, or modifying the fluorescent moiety,
    (iv) cleaving a linker linking the fluorescent moiety to the first detectable probe, optionally wherein the linker comprises a disulfide bond,
    (v) chemically or photochemically modifying the fluorescent moiety,
    (vi) bleaching the fluorescent moiety by a chemical agent,
    (vii) photobleaching the fluorescent moiety,
    (viii) permanently and irreversibly extinguishing the fluorescent moiety, and/or
    (ix) quenching the fluorescent moiety.

11. The method of claim 1, wherein the first target sequence has an average copy number of no more than 20 per cell in the biological sample.

12. The method of claim 1, wherein two ends of the circularizable probe or probe set are ligated using a splint as a template, and wherein the splint is distinct from the second target sequence.

13. The method of claim 1, wherein the second target sequence is in an mRNA molecule.

14. The method of claim 1, wherein in step (f), the biological sample is contacted with a plurality of second detectable probes each comprising (i) a second barcode sequence in the one or more second barcode regions and (ii) a fluorescent moiety.

15. The method of claim 1, wherein the second target sequence has an average copy number of at least about 300 per cell in the biological sample.

16. The method of claim 1, wherein:
    the first target sequence and the second target sequence comprise the same sequence; and/or
    the first target sequence and the second target sequence are in molecules corresponding to the same analyte.

17. The method of claim 16, wherein the method further comprises comparing the detection of the first target sequence and the detection of the second target sequence.

18. The method of claim 1 for detecting at least a first analyte and a second analyte, wherein the first target sequence corresponds to the first analyte and the second target sequence corresponds to the second analyte.

19. The method of claim 18, wherein the first nucleic acid molecule is longer than the second nucleic acid molecule.

20. The method of claim 1, wherein the biological sample is non-homogenized and selected from the group consisting of a formalin-fixed, paraffin-embedded (FFPE) sample, a frozen tissue sample, and a fresh tissue sample.

* * * * *